United States Patent
Elko et al.

(10) Patent No.: US 6,963,882 B1
(45) Date of Patent: Nov. 8, 2005

(54) METHOD AND APPARATUS FOR PROCESSING A LIST STRUCTURE

(75) Inventors: David A. Elko, Austin, TX (US); Richard Dievendorff, Bellevue, WA (US); Dermot J. Flaherty, Southampton (GB); Jeffrey M. Nick, West Park, NY (US); David H. Surman, Milton, NY (US); James H. Warnes, Poughkeepsie, NY (US); Douglas W. Westcott, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 09/677,339

(22) Filed: Oct. 2, 2000

(51) Int. Cl.[7] .............................................. G06F 17/30
(52) U.S. Cl. ...................... 707/200; 707/201; 707/202; 707/8
(58) Field of Search .............................. 707/200, 3, 10, 707/201, 202, 7

(56) References Cited

U.S. PATENT DOCUMENTS

| | | | | |
|---|---|---|---|---|
| 5,101,498 A | * | 3/1992 | Ehlig et al. ................. 710/316 |
| 5,317,739 A | | 5/1994 | Elko et al. .................. 395/650 |
| 5,331,673 A | | 7/1994 | Elko et al. .................. 395/575 |
| 5,339,405 A | | 8/1994 | Elko et al. .................. 395/575 |
| 5,339,427 A | | 8/1994 | Elko et al. .................. 395/725 |
| 5,379,387 A | * | 1/1995 | Carlstedt ..................... 712/221 |
| 5,388,266 A | | 2/1995 | Frey et al. ................... 395/700 |
| 5,390,328 A | | 2/1995 | Frey et al. ................... 395/650 |
| 5,392,397 A | | 2/1995 | Elko et al. .................. 395/200 |
| 5,394,542 A | | 2/1995 | Frey et al. ................... 395/575 |
| 5,394,554 A | | 2/1995 | Elko et al. .................. 395/800 |
| 5,410,695 A | | 4/1995 | Frey et al. ................... 395/650 |
| 5,450,590 A | | 9/1995 | Elko et al. .................. 395/700 |
| 5,457,793 A | | 10/1995 | Elko et al. .................. 395/600 |
| 5,463,736 A | | 10/1995 | Elko et al. .................. 395/848 |
| 5,465,359 A | | 11/1995 | Allen et al. ................. 395/700 |
| 5,493,668 A | | 2/1996 | Elko et al. .................. 395/457 |
| 5,515,499 A | | 5/1996 | Allen et al. ............ 395/182.03 |
| 5,537,574 A | | 7/1996 | Elko et al. .................. 395/468 |
| 5,544,345 A | | 8/1996 | Carpenter et al. .......... 395/477 |
| 5,561,809 A | | 10/1996 | Elko et al. .................. 395/800 |
| 5,581,737 A | | 12/1996 | Dahlen et al. ......... 395/497.01 |
| 5,604,863 A | | 2/1997 | Allen et al. ............ 395/182.09 |
| 5,630,050 A | | 5/1997 | Neuhard et al. ....... 395/183.03 |
| 5,634,072 A | | 5/1997 | Allen et al. ................. 395/674 |
| 5,664,155 A | | 9/1997 | Elko et al. .................. 711/170 |
| 5,737,600 A | | 4/1998 | Geiner et al. ............... 395/616 |
| 5,742,830 A | * | 4/1998 | Elko et al. .................. 707/200 |
| 5,860,115 A | | 1/1999 | Neuhard et al. ............ 711/147 |
| 5,875,484 A | | 2/1999 | Neuhard et al. ............ 711/167 |
| 5,887,135 A | * | 3/1999 | Dahlen et al. .............. 709/228 |
| 6,008,743 A | * | 12/1999 | Jaquette ........................ 710/68 |
| 6,292,889 B1 | * | 9/2001 | Fitzgerald et al. ............. 713/1 |
| 6,542,970 B1 | * | 4/2003 | Dahlen et al. .............. 711/145 |

* cited by examiner

Primary Examiner—Jean M. Corrielus
Assistant Examiner—Baoquoc N. To
(74) Attorney, Agent, or Firm—William A. Kinnaman, Jr.

(57) ABSTRACT

Various enhancements are made to the architecture of a list processor to facilitate its use in implementing a message queue that is shared by queue managers residing across a multisystem complex. A new list structure control—a program list entry identifier indicator, or PLEIDI—is defined to allow the user to specify whether user-defined entry IDs are used when the list is allocated. A new delete list (DL) command is added that sequentially processes list entries in the order in which they exist on the specified list. A new move list entries (MLES) command provides a performance-optimized means to process an input list of entries. New key comparison functions and list monitoring enhancements have also been added. A new type of key called a secondary list entry key (SLEK) allows the user to specify a secondary key value as a means to identify a list entry.

35 Claims, 8 Drawing Sheets

US 6,963,882 B1

METHOD AND APPARATUS FOR PROCESSING A LIST STRUCTURE

CROSS-REFERENCE TO RELATED APPLICATIONS

This application is related to the following commonly owned copending applications, incorporated herein by reference:

D. A. Elko et al., Ser. No. 09/677,341 filed concurrently herewith, entitled "METHOD AND APPARATUS FOR IMPLEMENTING A SHARED MESSAGE QUEUE USING A LIST STRUCTURE";

P. Kettley et al., Ser. No. 09/605,589, filed Jun. 28, 2000, entitled "METHOD AND APPARATUS FOR OPERATING A COMPUTER SYSTEM TO ENABLE A RESTART";

P. Kettley et al., Ser. No. 60/220,685, filed Jul. 25, 2000, entitled "METHOD AND APPARATUS FOR IMPROVING MESSAGE AVAILABILITY IN A SUBSYSTEM WHICH SUPPORTS SHARED MESSAGE QUEUES";

D. J. Dahlen et al., Ser. No. 60/219,889, filed Jul. 21, 2000, entitled "IMPLEMENTING MQI INDEXED QUEUE SUPPORT USING COUPLING FACILITY LIST STRUCTURES".

BACKGROUND OF THE INVENTION

1. Field of the Invention

This invention relates to a method and apparatus for managing a list structure and, more particularly, to extensions to the architecture of a list processor that render it especially suitable for processing shared message queues.

2. Description of the Related Art

IBM's MQSeries® is a set of middleware products that allow user applications to intercommunicate using messages, without having to know the complexities of the underlying hardware and software platform. Applications communicate using the MQSeries application programming interface (API), issuing such calls as MQPUT to put a message onto a queue and MQGET to get a message from a queue. MQSeries is described in such publications as *MQSeries Planning Guide*, IBM GC33-1349-07 (January 1999), incorporated herein by reference.

The IBM S/390® Parallel Sysplex® configuration is a cluster of interconnected processing nodes with attachments to shared storage devices, network controllers, and core cluster technology components, consisting of coupling facilities, coupling support facilities, and external time references (ETRs). A coupling facility (CF) enables high-performance read/write sharing of data by applications running on each node of the cluster through global locking and cache coherency management mechanisms. It also provides cluster-wide queuing mechanisms for workload distribution and message passing between nodes.

The coupling facility is described in the following patents and publications, incorporated herein by reference:

"In a Multiprocessing System Having a Coupling Facility, Communicating Messages Between the Processors and the Coupling Facility in Either a Synchronous Operation or an Asynchronous Operation", by D. A. Elko et al., Ser. No. 08/420,893, Filed Apr. 11, 1995, now U.S. Pat. No. 5,561,809;

"Sysplex Shared Data Coherency Method And Means", by D. A. Elko et al., Ser. No. 07/860,805, Filed Mar. 30, 1992, now U.S. Pat. No. 5,537,574;

"Method And Apparatus For Distributed Locking Of Shared Data, Employing A Central Coupling Facility", by D. A. Elko et al., Ser. No. 07/860,808, Filed Mar. 30, 1992, now U.S. Pat. No. 5,339,427;

"Command Quiesce Function", by D. A. Elko et al., Ser. No. 07/860,330, Filed Mar. 30, 1992, now U.S. Pat. No. 5,339,405;

"Software Cache Management Of A Shared Electronic Store In A Sysplex", by D. A. Elko et al., Ser. No. 07/860,807, Filed Mar. 30, 1992, now U.S. Pat. No. 5,457,793;

"Multiple Processor System Having Software For Selecting Shared Cache Entries Of An Associated Castout Class For Transfer To A DASD With One I/O Operation", by D. A. Elko et al, Ser. No. 07/860,806, Filed Mar. 30, 1992, now U.S. Pat. No. 5,493,668;

"Command Execution System For Using First And Second Commands To Reserve And Store Second Command Related Status Information In Memory Portion Respectively", by D. A. Elko et al., Ser. No. 07/860, 378, Filed Mar. 30, 1992, now U.S. Pat. No. 5,392,397;

"Integrity Of Data Objects Used To Maintain State Information For Shared Data At A Local Complex", by D. A. Elko et al, Ser. No. 07/860,800, Filed Mar. 30, 1992, now U.S. Pat. No. 5,331,673;

"Management Of Data Objects Used To Maintain State Information For Shared Data At A Local Complex", by J. A. Frey et al, Ser. No. 07/860,797, Filed Mar. 30, 1992, now U.S. Pat. No. 5,388,266;

"Clearing Data Objects Used To Maintain State Information For Shared Data At A Local Complex When At Least One Message Path To The Local Complex Cannot Be Recovered", by J. A. Frey et al., Ser. No. 07/860,647, Filed Mar. 30, 1992, now U.S. Pat. No. 5,394,542;

"Coupling Facility For Receiving Commands From Plurality Of Hosts For Activating Selected Connection Paths To I/O Devices And Maintaining Status Thereof", by D. A. Elko. et al., Ser. No. 08/324,447, Filed Oct. 18, 1994, now U.S. Pat. No. 5,463,736;

"Data Processing System And Method For Providing Notification In A Central Processor Of State Changes For Shared Data Structure On External Storage", by J. A. Frey et al., Ser. No. 07/860,809, Filed Mar. 30, 1992, now U.S. Pat. No. 5,390,328;

"Method And Apparatus For Performing Conditional Operations On Externally Shared Data", by J. A. Frey et al., Ser. No. 08/383,532, Filed Feb. 1, 1995, now U.S. Pat. No. 5,742,830;

"Apparatus And Method For List Management In A Coupled Data Processing System", by J. A. Frey et al., Ser. No. 07/860,633, Filed Mar. 30, 1992, now U.S. Pat. No. 5,410,695;

"Interdicting I/O And Messaging Operations In A Multi-System Complex", by D. A. Elko et al., Ser. No. 07/860,489, Filed Mar. 30, 1992, now U.S. Pat. No. 5,394,554;

"Method And Apparatus For Coupling Data Processing Systems", by D. A. Elko et al., Ser. No. 07/860,803, Filed Mar. 30, 1992, now U.S. Pat. No. 5,317,739;

"Authorization Method For Conditional Command Execution", by D. A. Elko et al., Ser. No. 08/408,446, Filed Mar. 22, 1995, now U.S. Pat. No. 5,450,590;

"Dynamically As signing a Dump Space in a Shared Data Facility to Receive Dumping Information to be Captured", by D. A. Elko et al., Ser. No. 08/471,895, Filed Jun. 7, 1995, now U.S. Pat. No. 5,664,155;

"Method And System For Capturing and Controlling Access To Information In A Coupling Facility", by D. E. Neuhard et al., Ser. No. 08/146,647, filed Nov. 1, 1993, now U.S. Pat. No. 5,630,050;

"Method and System for Determining and Overriding Information Unavailability Time at a Coupling Facility", by D. A. Neuhard et al., Serial. No. 08/779, 196, filed Jan. 6, 1997, now U.S. Pat. No. 5,875,484;

"Requesting a Dump of Information Stored within a Coupling Facility, in Which the Dump Includes Serviceability Information from an Operating System That Lost Communication with the Coupling Facility", by D. A. Neuhard et al., Serial. No. 08/779,195, filed Jan. 6, 1997, now U.S. Pat. No. 5,860,115;

"Method and Apparatus for Expansion, Contraction, and Reapportionment of Structured External Storage Structures", by D. J. Dahlen et al., Ser. No. 08/304,458, filed Sep. 12, 1994, now U.S. Pat. No. 5,581,737;

"Method of Managing Resources in One or More Coupling Facilities Coupled to One or More Operating Systems in One or More Central Programming Complexes Using a Policy", by R. A. Allen et al., Ser. No. 08/607,053, filed Feb. 26, 1996, now U.S. Pat. No. 5,634,072;

"Method and System for Managing Data and Users of Data in a Data Processing System", by R. A. Allen, Ser. No. 08/146,727, filed Nov. 1, 1993, now U.S. Pat. No. 5,465,359;

"Method and System for Reconfiguring a Storage Structure Within a Structure Processing Facility", by R. A. Allen et al., Ser. No. 08/544,941, filed Oct. 18, 1995, now U.S. Pat. No. 5,515,499;

"Method for Coordinating Executing Programs in a Data Processing System", by R. A. Allen et al., Ser. No. 08/439,269, filed May 9, 1995, now U.S. Pat. No. 5,604,863;

"Coherence Controls for Store-Multiple Shared Data Coordinated by Cache Directory Entries in a Shared Electronic Storage", by K. S. Carpenter et al., Ser. No. 08/148,707, filed Nov. 8, 1993, now U.S. Pat. No. 5,544,345;

"Method and System for Log Management in a Coupled Data Processing System", by R. V. Geiner et al., Ser. No. 08/632,683, filed Apr. 15, 1996, now U.S. Pat. No. 5,737,600; and J. M. Nick et al., "S/390 cluster technology: Parallel Sysplex", *IBM Systems Journal*, vol. 36, no. 2, 1997, pages 172–201.

It would be desirable to be able to use the list-processing capabilities of the coupling facility to implement a message queue that is shared by queue managers residing on different systems across a sysplex. To be suitable for this purpose, the CF list architecture should allow MQSeries to efficiently implement the following message-queuing semantics:

1. A message must be uniquely identified.
2. A message put cannot be visible to other units of work (UOWs) until it is committed.
    When a message is written by a UOW, it must not be visible to other units of work anywhere in the queue-sharing group (QSG) until the message is committed. The uncommitted message however is available to the unit of work that wrote it.
3. Committed messages must be maintained in proper sequence.
    Committed messages eligible to be read must be in priority sequence, from highest priority to lowest priority. If there are multiple messages with the same priority, then the set of messages must be maintained in order of arrival sequence within designated priority.
4. Messages read must be unavailable to others UOWs in the QSG.
    When a committed message is read by a unit of work, then no other unit of work anywhere in the queue-sharing group can read the same message. If the message that is read is committed, it must be deleted from the CF list structure so that it is never visible again to another unit of work.
5. Messages read that are backed out must be reinserted into their proper committed positions with respect to both priority and time of arrival.
    If the message that was read is backed out, it must again become visible to other units of work executing in the queue-sharing group. When the message is backed out, it must be reinserted into the committed portion of a list with respect to both its priority and its time of arrival (when the message was originally put).
6. Committing and aborting messages for a UOW must be efficient.

SUMMARY OF THE INVENTION

The present invention contemplates extensions to the CF list architecture that allow MQSeries to efficiently exploit the CF list model and provide for shared queues in a Parallel Sysplex emvironment. The present invention is not limited to use in a message queueing environment, however, but may be used in other applications as well.

One aspect of the present invention contemplates a program-specified unique list entry identifier (ID) in place of the list entry ID generated by the system. In a parallel implementation of MQSeries, the CF list architecture should allow user-generated list entry identifiers to be used as a direct entry-locating mechanism in order to insure that the identifier for each list entry is unique across CF list structures and consistent between MQSeries queue managers.

MQSeries could accomplish this in the existing architecture by using list entry names. However, entry names and entry keys are mutually exclusive means of specifying list entries, and MQSeries also requires the use of entry keys for identifying list entries. MQSeries requires a function that is equivalent to that provided today by entry IDs as a direct means of addressing a list entry in a list structure. Currently, however, entry IDs are generated internally by the coupling facility.

In accordance with one aspect of the invention, a new list structure control—a program list entry identifier indicator, or PLEIDI—is defined to allow the user to specify whether user-defined entry IDs are used when the list is allocated. This new option is provided as an attribute of list structure allocation.

Corresponding modifications may be made to the operating system components that exploit the CF list architecture. Thus, in the case of the OS/390 component known as Sysplex Services for Data Sharing (XES), an optional input may be added to the XES Connection Service that indicates whether the user wishes to provide unique list entry ID values or the system should generate entry ID values for each list entry created for the structure.

A connect request is rejected if the connector's requested attribute does not match the attribute in effect for the current allocated instance of the structure. In a preferred embodiment, list entry ID type is consistent for a whole list structure. Either all list entries in the structure are referenced by entry IDs generated by the system, or all list entries are referenced by entry IDs provided by the user.

Another aspect of the present invention contemplates a new delete list (DL) command. MQSeries requires an efficient means to delete entries from a given list without knowledge of the specific list entry IDs of the entries to be deleted. In accordance with this aspect of the invention, a new delete list command is added that sequentially processes list entries in the order in which they exist on the specified list. The starting point for the list entry selection is specified by the head or tail of the list, entry ID, entry name, entry key, secondary key or list cursor. The new delete list command allows specific criteria to be specified that provides a means to target only particular entries to be processed for deletion. This command scans entries on a particular list and does not involve a scan of the entire structure.

The present invention also contemplates a new move list entries (MLES) command. A new command of this type is required by MQSeries to optimize the performance of two of their critical processes: committing MQPUT list entries and backing out of MQGET list entries. This requires updating each affected list entry, either by changing the list entry key while keeping the list entry on the same physical list in the CF list structure or by moving the list entry from one list back to its original list while the list entry key for the list entry remains unchanged. In accordance with this aspect of the invention, a new move list entries command has been added that provides a performance-optimized means to process an input list of entries. Each list entry in the input list may be moved to a new position on a list in the CF list structure by updating the list entry key, or each list entry may be moved from one list to another list in the coupling facility list structure by specifying a new target list number. The new move list entries command allows both the list number and the list entry key for a list entry to be updated.

The new move list entries (MLES) command is a multiple-list entry command, which takes as input a list of specified entries to be processed. The move list entries command takes a list of entries identified by list entry ID or name. For each entry in the input list a target list number, a target list entry key and a target secondary key may be provided.

In a preferred embodiment, a new input parameter— granular version number comparison (GVNC)—is provided on the move list entries (MLES) command to allow the user to optionally perform granular version number comparison. The move list entries command also allows granular version number replacement given the granular version number comparison was successful. A specified set of compare and replace criteria may be specified for each entry in the input entry list.

In a preferred embodiment, the input operand granular version number comparison (GVNC) is also added to the delete list entries (DLES) command to allow the user to optionally perform granular version number comparisons with a specified compare value criterion specified for each entry in the input entry list. Currently, the DLES command supports nongranular comparison functions, that is, comparison is performed between a single specified compare value and each of the entries in the input entry list. By adding the granular version number comparison to both DLES and MLES, the commands are kept consistent. However, the DLES command is preferably not changed to support version number replacement because version number replacement on a delete request is not supported by the architecture; updating an entry that will be deleted does not make sense.

In a preferred embodiment, another new operand—halt on miscompare (HOM)—is added to the move list entries (MLES) and delete list entries (DLES) commands to allow the user to specify whether execution should halt when a miscompare is encountered or continue to the next entry as is done currently. Miscompares may occur on the list entry version number, list entry key, list entry secondary key or list number. Currently, these commands skip an entry if a miscompare is encountered and continue processing with the next entry in the input list. This leads to the unfortunate circumstance that when any comparisons are requested, it is not possible for the user to determine which entries in the input entry list were deleted and which were skipped due to a miscompare because, upon completion the request only tells you how many entries were deleted.

Another aspect of the present invention contemplates key comparison enhancements to the CF list architecture. MQSeries uses entry keys and entry version numbers to identify the list entries by MQSeries queue manager and priority. To accomplish this, key comparison enhancements have been added for both single- and multiple-entry commands. The key compare functions that have been added are as follows:

1. Location by keyed position has been enhanced to include operator types of range, less than or equal, and greater than or equal, for entry location of the first list entry to process on the read list (RL) and delete list (DL) commands.
2. For multiple-entry commands (i.e., commands for deleting, moving, reading and/or writing multiple list entries), the operands key request type (KRT), list entry key (LEK) and maximum list entry key (MLEK) (together with similar operands for the secondary keys described below) provide key comparison function operators of range, as well as key comparison function operators for less than or equal, and greater than or equal.
3. For single-list entry commands (i.e., commands for deleting, moving, reading and/or writing a single list entry), the operand key request type (KRT) (together with similar operands for the secondary keys described below) provides key comparison function operators of equal, less than or equal, and greater than or equal.

Yet another aspect of the present invention contemplates the following list monitoring enhancements:

1. List monitoring for a key range or a "subset of sublists".

Currently, there are two levels of list notifications in the list model: (1) whole-list notification, to determine if the list is empty or not; and (2) sublist notification, to determine if the sublist defined by a list number and an entry key value is empty or not. This is not sufficient for MQSeries, which needs to be able to monitor lists with a granularity that lies between these two functions.

As described in the related application referenced above, MQSeries uses key values to group entries on a list into two ranges: committed entries and uncommitted entries. It would be desirable to know whether the set of committed entries on a list is empty or not, without actually having to access the CF to do so. To accomplish this, in a preferred embodiment, new list controls called key range (minimum) list entry key (KRLEK) and key range maximum list entry key (KRMLEK) are defined for each list to allow list monitoring to be set up for a range of keys. These list controls may be updated using the write list controls (WLC) command or read using the read list controls (RLC) command. Suitable means allow a user to start or stop monitoring the key range.

2. List and key range threshold notification.

In a preferred embodiment, new list controls are added that allow the user to modify the list and key range empty-to-not-empty or not-empty-to-empty notification thresholds. These list controls, described below, may be updated using the write list controls (WLC) command.

The list empty notification threshold (LENT) is the number of list entries that must remain in the list to suppress a not-empty to empty list notification. The key range empty notification threshold (KRENT) is the number of list entries that must remain in the key range to suppress a not-empty to empty list notification A list or key range is considered empty when there are no entries on the list or when the list contains fewer list entries than the list or key range empty threshold. The list or key range may be considered empty even though there are still entries on the list or in the key range if the number of entries have not exceeded the list or key range empty threshold.

Similarly, the list not-empty notification threshold (LNENT) is the number of list entries that must be included in the list before an empty to not-empty list notification is generated, while the key range not-empty notification threshold (KRNENT) is the number of list entries that must be included in the key range before an empty to not-empty list notification is generated. A list or key range is considered not-empty when the number of list entries on the list is greater than the list or key range not-empty threshold. The list or key range may still be considered empty even there are entries on the list or in the key range, if the number of entries have not exceeded the list or key range not-empty count.

The initial value of the list and key range empty and not-empty thresholds is zero.

3. Aggressive sublist notification.

In a preferred embodiment, a new event monitor control called an aggressive not-empty notification indicator (ANENI) is added to allow the user to specify whether, when monitoring a sublist, event monitor controls (EMCs) should be queued to the user's event queue for only the first entry added to the sublist or for each entry that is added to the sublist.

Yet another aspect of the present invention relates to keys. A new type of key, called a secondary key or, more particularly, a secondary list entry key (SLEK), is introduced that allows the user to specify a secondary key value as a means to identify a list entry. Secondary keys are associated with respective list entries and represent a second key ordering for each list in a CF list structure. A secondary key for an entry may be initialized, or set to null, when the entry is created. Secondary keys exist in parallel with primary keys and may be used and updated in a similar manner, as described below. In a preferred embodiment, a new list structure control called a secondary key indicator (SKI) is defined to allow for creation of secondary key control structures when the list is allocated. This allows the user to specify whether the keyed list structure should be allocated with only primary entry keys or with both primary and secondary entry keys.

DESCRIPTION OF THE PREFERRED EMBODIMENTS

Figure 1:
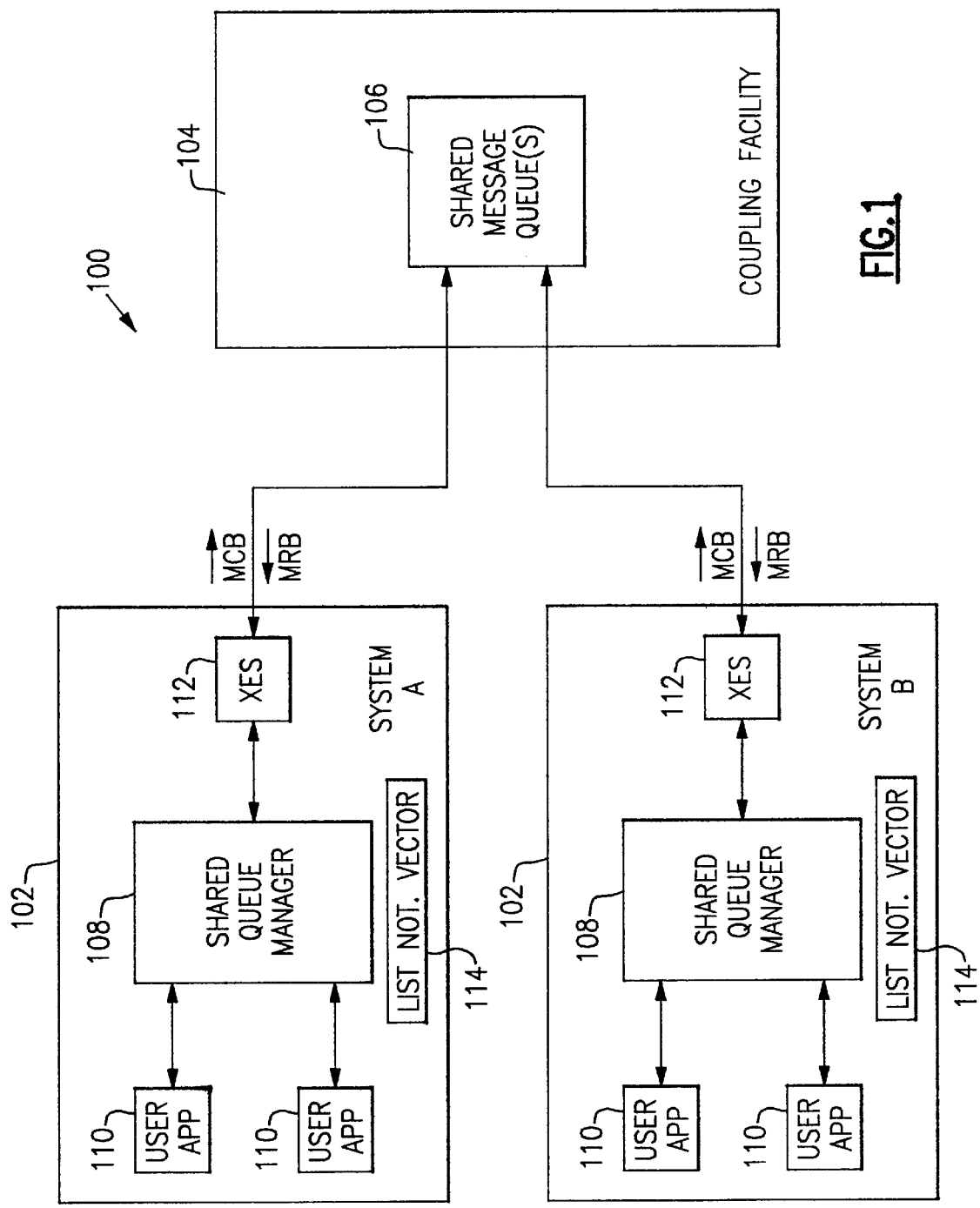
FIG. 1 shows a multiple-system complex (sysplex) incorporating the present invention.

FIG. 1 shows the general configuration of a system complex (sysplex) 100 incorporating the present invention. Sysplex 100 comprises a plurality of systems 102 (an exemplary two of which, System A and System B, are shown), each of which is connected to a coupling facility (CF) 104 within which one or more shared message queues 106 are maintained. As is conventional, each system 102 comprises one or more processors and an operating system (not separately shown) and may constitute either a separate physical machine or a logical partition of a logically partitioned machine. Similarly, coupling facility 104 may constitute either a separate physical machine or a logical partition of a logically partitioned machine. Although the invention is not so limited, in a preferred embodiment the physical machines are IBM S/390 Parallel Enterprise Server® processors, while the operating system is the IBM OS/390® operating system.

Within each system 102, user applications 110 perform sequences of operations, referred to herein as units of work (UOWs), on shared message queues 106 via a shared queue manager (SQM) 108 resident on that system. Shared queue managers 108 on different systems 102 that share the same message queue 106 are referred to herein as a queue-sharing group (QSG). In the preferred embodiment, each shared queue manager 108 in turn interacts with the coupling facility via a component 112 of the OS/390 operating system known as Sysplex Services for Data Sharing (XES). Sysplex Services for Data Sharing (XES) is described more fully in the IBM publication *MVS/ESA Programming: Sysplex Services Guide*, GC28-1495-02 (June 1995), incorporated herein by reference.

User applications 110 on a system 102 interact with the shared queue manager 108 on that system via a series of Message Queue Interface (MQI) calls, the most important of which are MQPUT (to put a message onto a message queue 106) and MQGET (to get a message from a message queue 106). In response to such a call, shared queue manager 108 issues a call to XES 112 to invoke a requested system service (e.g., IXLLIST, IXLLSTC, IXLLSTE and IXLLSTM, as described below) to communicate with the coupling facility 104. In response to receiving a call from shared queue manager 108, XES 112 sends an appropriate message command block (MCB) containing data and other operands to the coupling facility 104 to perform the requested operation. XES 112 receives back from the coupling facility 104 a message response block (MRB) containing data and/or a response code.

Figure 10:
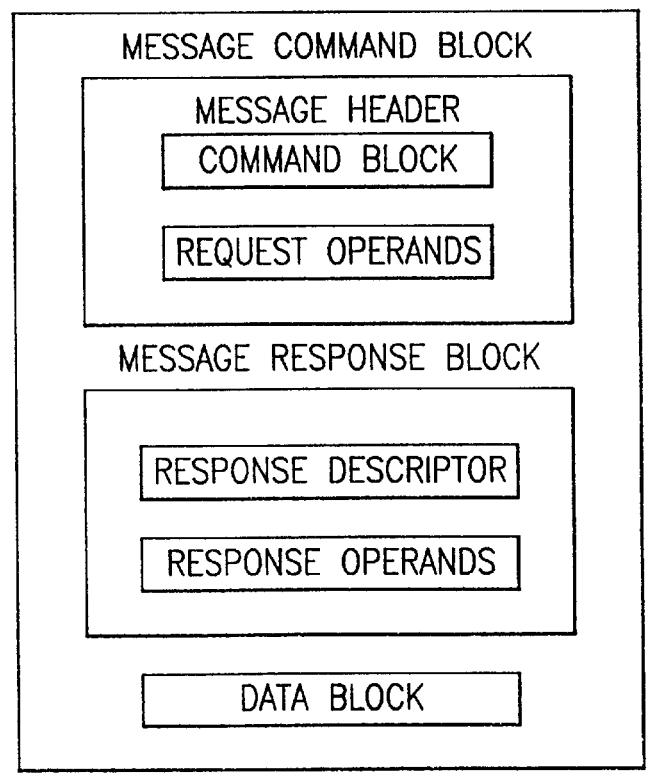
FIG. 10 shows a message command/response block.

FIG. 10 shows the format of a message command/response block 1000 used for communications between the coupling facility 104 and a particular system 102. Message command/response block 1000 comprises a message command block (MCB) 1002, a message response block (MRB) 1004, and an optional data block 1006. Message command block 1002 contains a command block 1008 and request operands 1010. Similarly, message response block 1004 contains a response descriptor 1012 and response operands 1014. Command block 1008 contains a command code (CC) specifying the type of operation to be performed by coupling facility 104, while request operands 1010 constitute input parameters, as described below.

Figure 2:
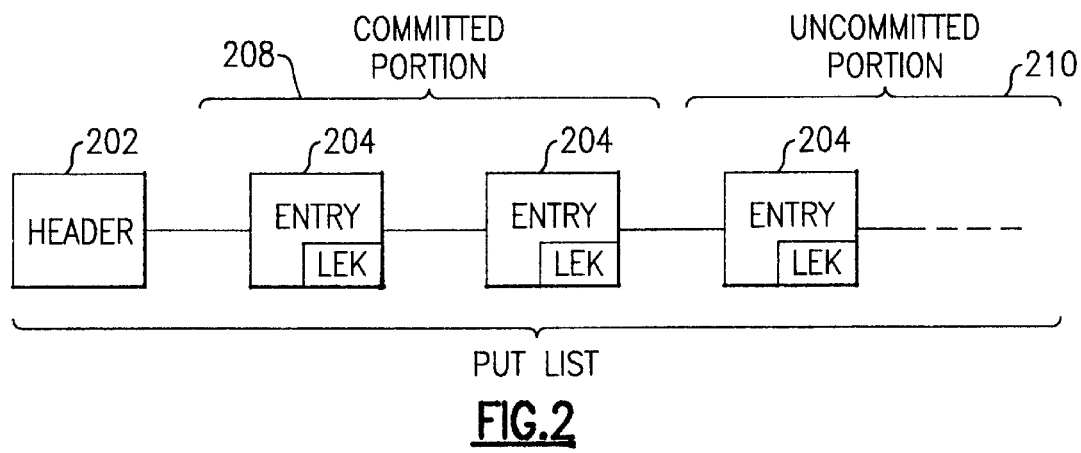
FIG. 2 shows a put list associated with a particular shared queue, with committed and uncommitted portions.
Figure 3:
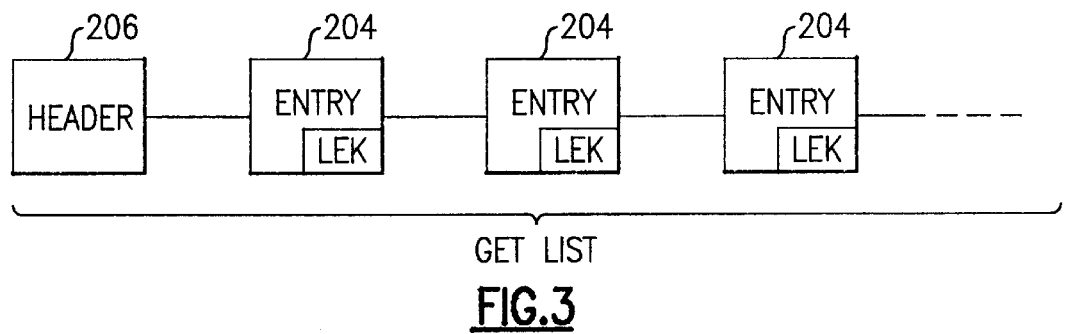
FIG. 3 shows a get list associated with a particular shared queue manager.

As part of its list-processing capability, coupling facility 104 performs requested operations on lists composed of one or more entries. Referring now to FIGS. 2 and 3, in accordance with one aspect of the present invention, each logical message queue 106 is implemented as a set of lists: a put list 202, comprising a put list header (PLH) and optionally one or more list entries 204, and one or more get lists 206, each comprising a get list header (GLH) and optionally one or more list entries 204. (The terms "list" and "list header" are used interchangeably herein in view of their one-to-one correspondence.) Each put list 202 is associated with a particular shared queue 106 and is shared by the shared queue managers 108 in the queue-sharing group. Each get list 206, on the other hand, is associated with a particular shared queue manager 108 and may be used for multiple shared queues 106. Each list entry 204 corresponds to a message. (The terms "list entry" and "message" are used interchangeably herein.) Associated with each list entry 204, along with a message and other data, is a list entry key LEK that may be used to determine the order of the entry 204 in the list 202 or 206. Keys LEK form the basis for partitioning the put list 202 into a committed portion 208, in which the keys LEK fall within a committed key range, and an uncommitted portion 210, in which the keys LEK fall within an uncommitted key range that does not overlap the committed key range.

Lists 202 and 206 and key ranges 208 and 210 supply the mechanism for writing, reading and committing messages 204 in accordance with the present invention. More particularly, the process of 'hiding' uncommitted messages 204, hiding messages 204 that have been read and making committed puts globally visible is done simply by movement between list headers 202 and 206 and/or key assignment changes without the use of any explicit locking protocols.

Figure 4:
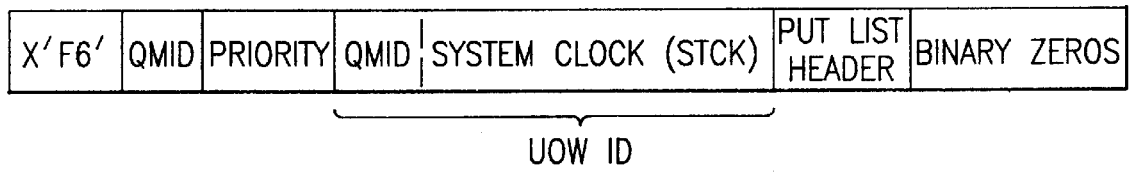
FIG. 4 shows the format of a list entry key falling within the uncommitted key range.
Figure 8A:
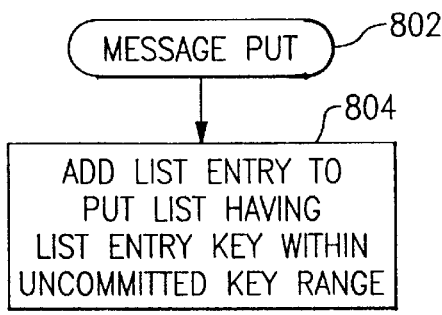
FIG. 8A shows the procedure for writing a message to a queue.

The keys LEK that a list entry (message) 204 can be assigned are defined by the shared queue manager 108, as described below. Referring to FIGS. 4 and 8A, when a message 204 is initially put (step 802), it is first assigned the following 16-byte key LEK in the uncommitted key range (step 804):

1 byte—value is X'F6'

1 byte—queue manager ID (QMID) of the shared queue manager 108 that wrote the message 204

1 byte—priority of the message 204

8 bytes—UOW ID: 1-byte queue manager ID (QMID) concatenated with a 7-byte store clock (STCK) value 2 bytes—put list header (PLH): the list header 202 to which the message 204 was put 3 bytes—binary zeroes.

The set of list entries 204 whose key LEK begins with X'F6' define the uncommitted portion 210 of the (put) list header 202.

Figure 5:
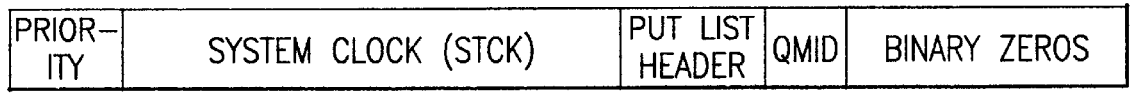
FIG. 5 shows the format of a list entry key falling within the committed key range.
Figure 6:
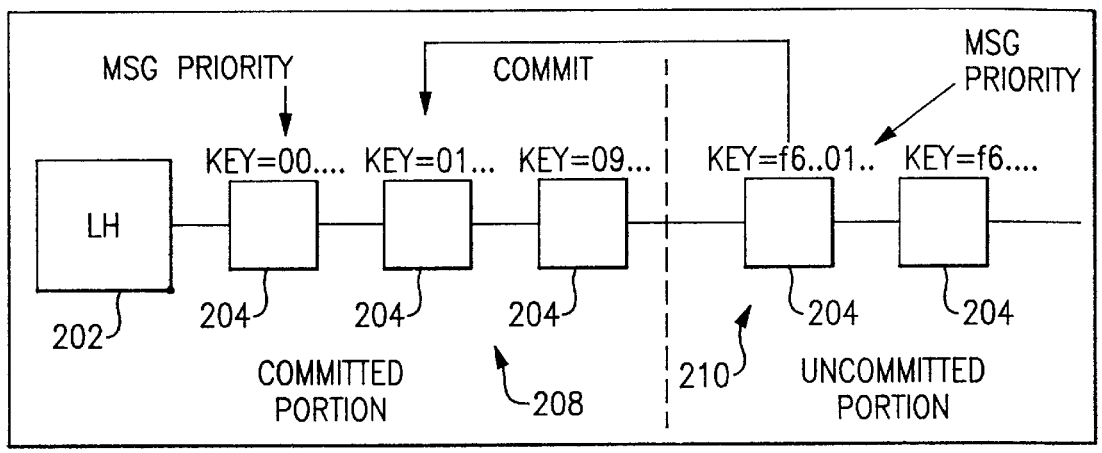
FIG. 6 shows the movement of list entries between the uncommitted and committed portions of a put list.
Figure 8B:
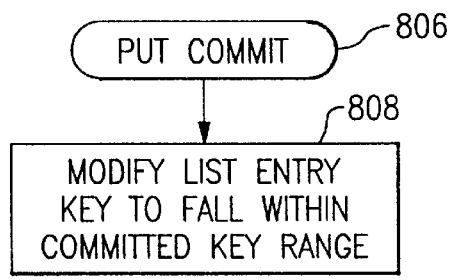
FIG. 8B shows the procedure for committing a write of a message to a queue.

Referring to FIGS. 6 and 8B, when an uncommitted message 204 (first byte of key LEK is X'F6') is committed (step 806), it is moved from the uncommitted portion 210 of the list header 202 to the committed portion 208 of the same list header 202. In this case, the list entry 204 moves from one position on the list header 202 to another position on the same list header 202. The movement is accomplished by changing the list entry's key LEK so that it falls within the committed key range (step 808). Referring to FIG. 5, the uncommitted put key LEK is changed to the following:

1 byte—priority in the inclusive range (0, 9)

8 byte—STCK value (from the uncommitted key, see above)

2 byte—put list header 202 (from the uncommitted key)

1 byte—queue manager ID (QMID) of the shared queue manager 108 that wrote the message 204

4 bytes—binary zeroes.

The set of list entries 204 whose keys begin with (00, 09) inclusive defines the committed portion 208 of the put list header 202.

Figure 8C:
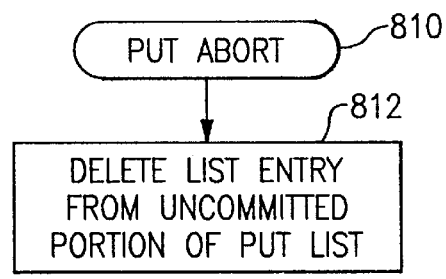
FIG. 8C shows the procedure for aborting a write of a message to a queue.

Referring to FIG. 8C, if a unit of work decides to abort a write of a message 204 (step 810), it deletes the message 204 from the uncommitted portion 210 of the put list 202 (step 812). This portion 210 of the put list is available only to the unit of work that originally wrote the message 204 and is invisible to other units of work.

Figure 7:
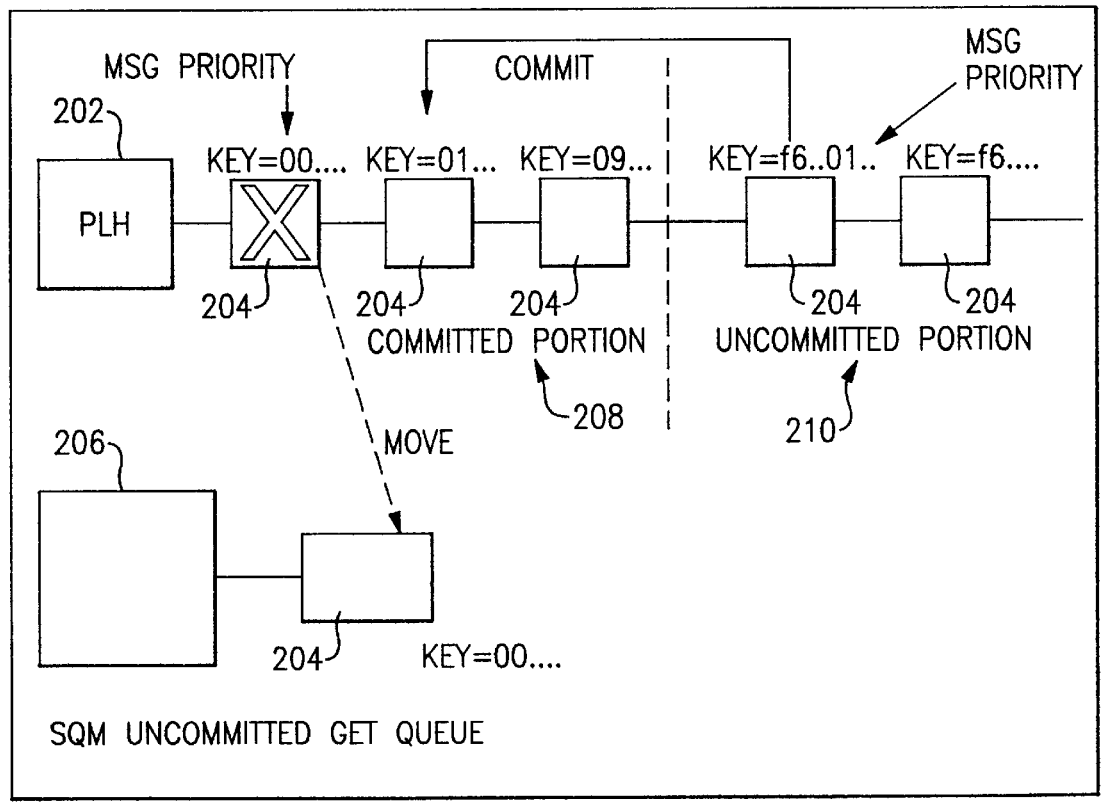
FIG. 7 shows the movement of list entries between a put list and a get list.
Figure 8E:
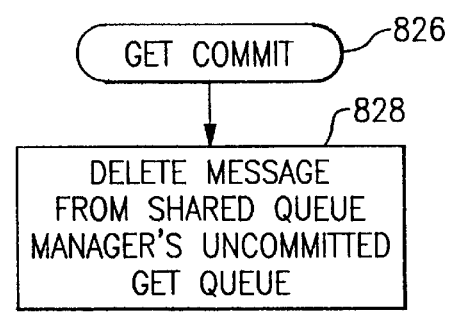
FIG. 8E shows the procedure for committing a read (get) of a message from a queue.
Figure 8D:
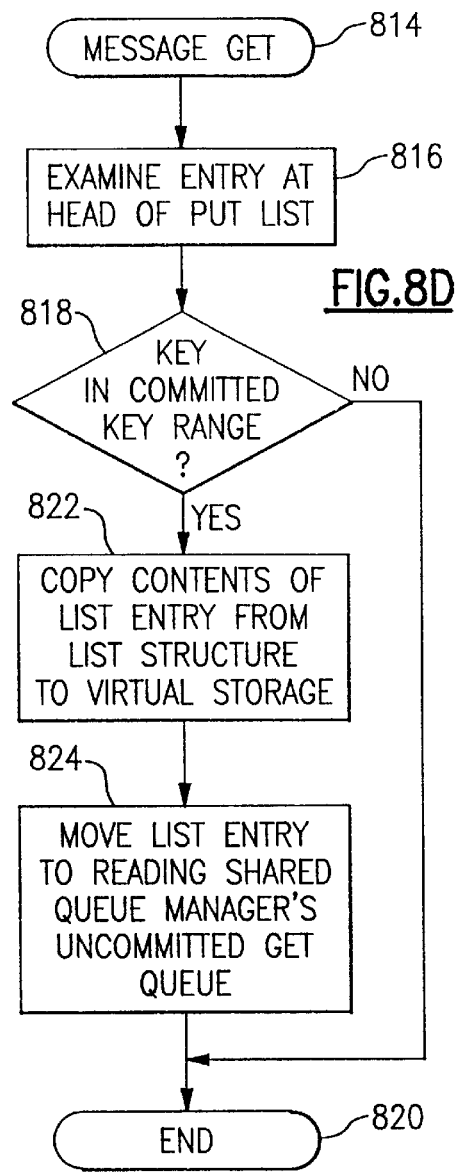
FIG. 8D shows the procedure for reading (getting) a message from a queue.

Referring to FIGS. 7 and 8D, when a unit of work requests the highest committed message 204 on a get request (step 814), only the committed portion 208 of the list header 202 is eligible to be scanned, that is, list entries 202 whose keys begin with (00, 09) inclusive. Entries 204 that begin with X'F6' do not participate in the scan.

This is accomplished by using an IXLLSTE invocation (as described below) that examines the entry 204 at the head of the list 202 (step 816) and returns it only if the first byte of its key is in the inclusive range (00, 09). (This is referred to herein as key range checking on read.) If there are no messages 204 on the list header 202 or if the key of the message at the head of the list header begins with a value greater than or equal to X'F6' (step 818), then no message is returned (step 820).

If there are committed messages 204, then the message 204 that is returned is the message at the head of the list header 202, since the messages 202 are in priority order and within priority by time of arrival. Thus, if the message 204 at the head of the list 202 is a committed message (step 818), then two things happen in an atomic fashion:

1. The contents of the list entry 204 are copied from the list structure into virtual storage (step 822).
2. The selected list entry 204 is moved to the 'reading' shared queue manager 108's uncommitted get queue 206 (step 824). This move operation makes the message 204 invisible to all other shared queue managers 108 in the queue-sharing group who issue a get request to the corresponding PLH 202. As noted earlier, in a list structure, each shared queue manager 108 is assigned its own uncommitted get list header 206.

Once the message 204 is moved to the shared queue manager 108's uncommitted get queue 206, it is no longer visible to other get requests because all get requests for the shared queue 106 reference the shared queue's put list header 202.

Figure 8F:
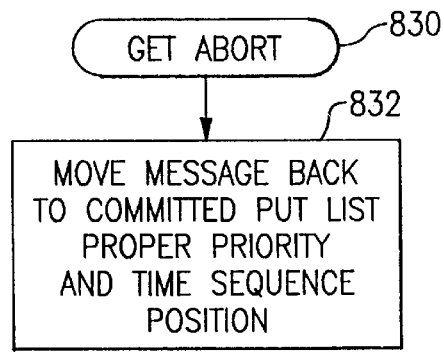
FIG. 8F shows the procedure for aborting a read (get) of a message from a queue.

The final disposition of the message read will be either commit or abort. Referring to FIG. 8E, if the disposition is commit (step 826), the message 204 is deleted from the shared queue manager 108's uncommitted get queue 206 (step 828). Referring to FIG. 8F, if the disposition is abort (step 830), then the message 204 is moved back to the committed put list header 202 from whence it came into its proper priority/time sequence position (step 832).

The list architecture of coupling facility 104, insofar as it is pertinent to the present application, will now be described.

Figure 9:
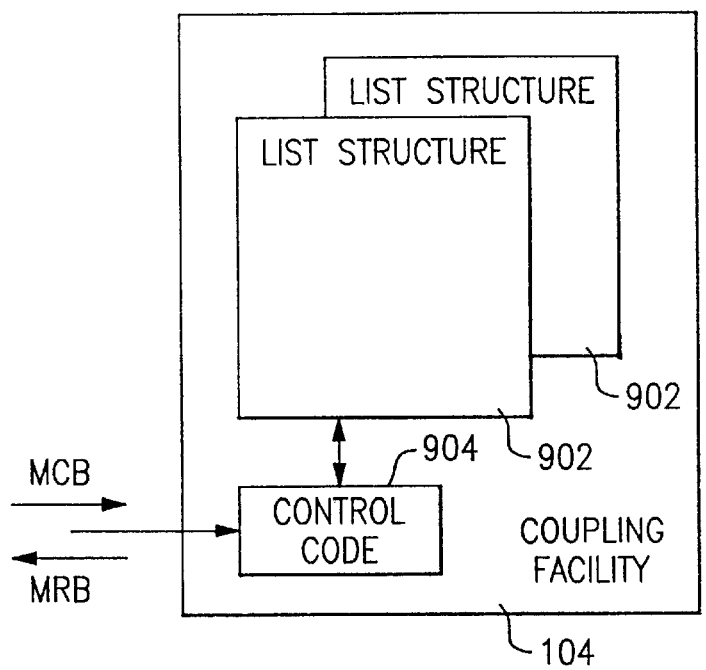
FIG. 9 shows the coupling facility and the list structures that it contains.
Figure 11:
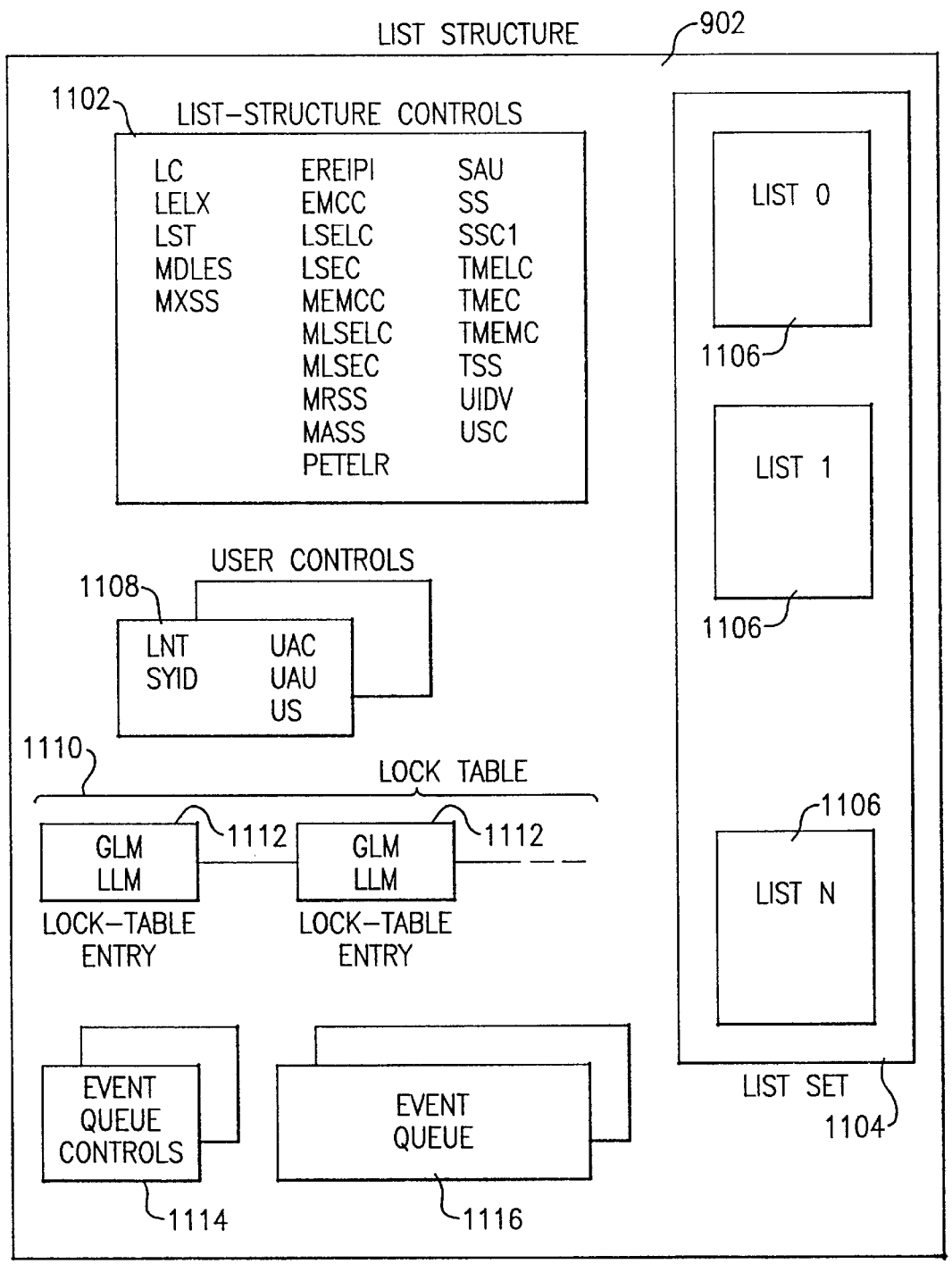
FIG. 11 shows a list structure.

Referring to FIG. 9, coupling facility 104 contains microcode 904, also referred to as coupling facility control code (CFCC), for managing one or more list structures 902. Referring to FIG. 11, each list structure 902 contains a set of list structure controls 1102, a list set 1104 comprising one or more lists 1106, user controls 1108, a lock table 1110 comprising one or more lock table entries (LTEs) 1112, and one or more event queue controls 1114 and corresponding event queues 1116.

Figure 12:
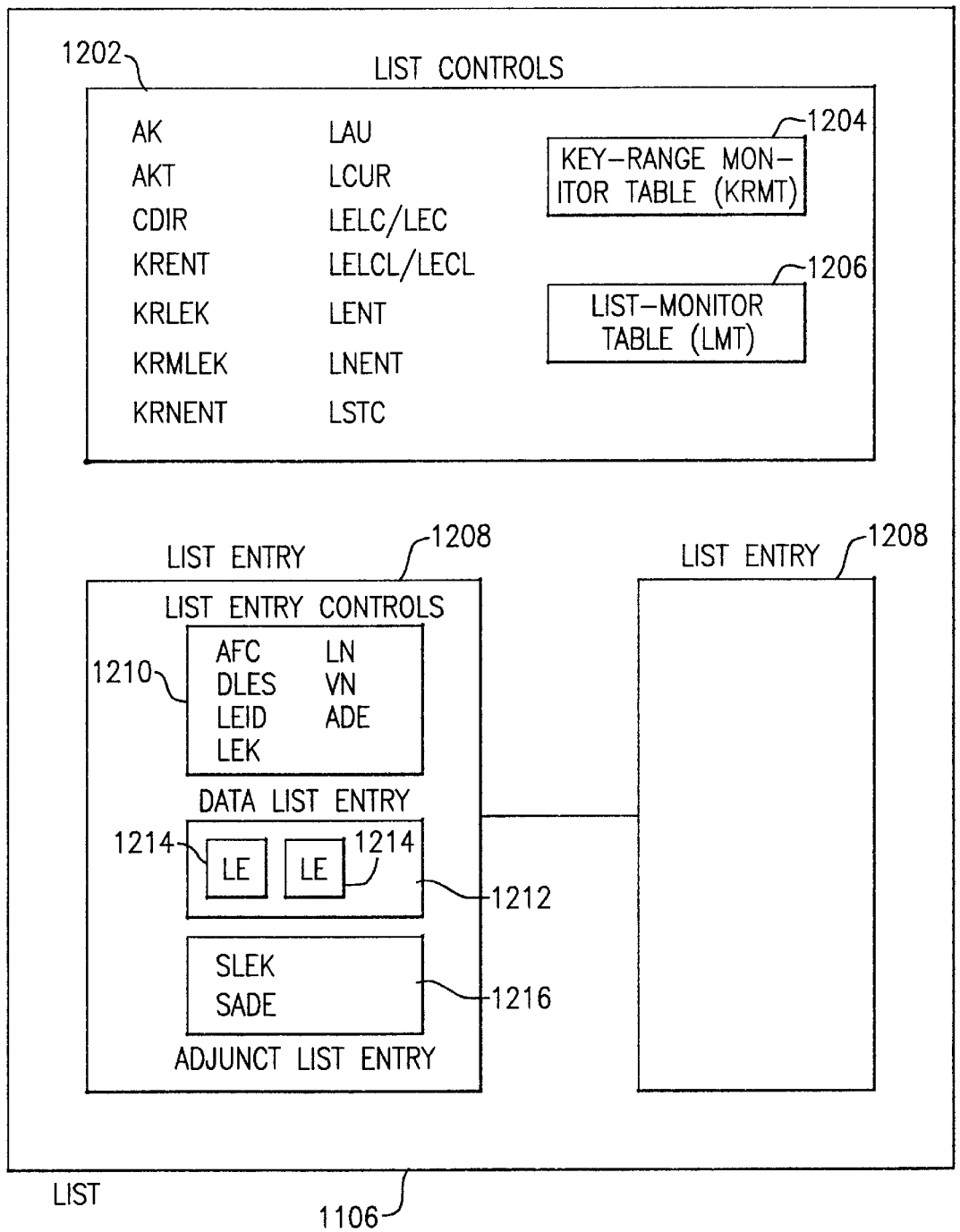
FIG. 12 shows a list.

Referring to FIG. 12, each list 1106 contains list controls 1202 (including a a key range monitor 110 table 1204 and a list monitor table 1206) and, optionally, one or more list entries 1208. Each list entry 1208 in turn contains a set of list entry controls 1210 (including a list entry ID LEID and a list entry key LEK), a data list entry 1212 comprising one or more list elements (LEs) 1214, and an adjunct list entry 1216 (including a secondary list entry key SLEK if defined).

List Structure Controls 1102

The fixed list structure controls 1102 are initialized when the list structure 902 is created and remain unchanged until it is deallocated.

The program-modifiable list structure controls 1102 are initialized when the list structure 902 is created. The program-modifiable control values may be changed by commands or CF processes.

The fixed list structure controls 1102 are summarized in the following table.

| Fixed List Structure Controls | Acronym |
| --- | --- |
| List count | LC |
| List element characteristic | LELX |
| List structure type | LST |
| Maximum data list entry size | MDLES |
| Maximum structure size | MXSS |

The program-modifiable list structure controls 1102 are summarized in the following table.

| Program-Modifiable List Structure Controls | Acronym |
| --- | --- |
| Entry reapportionment-in-progress indicator | EREIPI |
| Event monitor controls count | EMCC |
| List set element count | LSELC |
| List set entry count | LSEC |
| Maximum event monitor controls count | MEMCC |
| Maximum list set element count | MLSELC |
| Maximum list set entry count | MLSEC |
| Marginal structure size | MRSS |
| Minimum apportionable structure size | MASS |
| Pending entry-to-element ratio | PETELR |
| Structure authority | SAU |
| Structure size | SS |
| Structure size change indicator | SSCI |
| Target maximum element count | TMELC |
| Target maximum entry count | TMEC |
| Target maximum event monitor count | TMEMC |
| Target structure size | TSS |
| User identifier vector | UIDV |
| User structure control | USC |

Entry Reapportionment-in-Progress Indicator (EREIPI): Indicates whether an entry-to-element reapportionment process is currently active for the list structure 902.

Event Monitor Controls Count (EMCC): Specifies the number of event monitor controls objects 1306 currently in a list set 1104.

Extended User Structure Control (EUSC): An extension to the user structure control.

List Count (LC): Specifies the number of lists 1106 created.

List Element Characteristic (LELX): Specifies the number of bytes in each list element 1214.

List Set Cursor (LSCUR): An integer that is either zero or contains the value of the current list number in the list set scan process.

List Set Element Count (LSELC): Specifies the number of list elements 1214 that have been assigned to list entries 1208 or retry-data blocks, or both, in the list set 1104.

List Set Entry Count (LSEC): Specifies the number of existing list entries 1208 in the list set 1104.

List Structure Type (LST): Indicates the list objects 1106 created on allocation. The first flag is a secondary key indicator (SKI), the second flag is a program list entry identifier indicator (PLEIDI), the third flag is a element count indicator (ECI), The fourth flag is a lock indicator (LI), the fifth flag is a data indicator (DI), the sixth flag is an adjunct indicator (AI), the seventh flag is a name indicator (NI), and the eighth flag is a key indicator (KI).

The secondary key indicator indicates whether secondary keys are supported.

The program list entry identifier indicator indicates whether the structure uses a coupling facility-assigned LEID value or a program-assigned LEID value.

The element count indicator indicates whether (1) list entry count and list entry count limit are defined or, alternatively, (2) list element count and list element count limit are defined.

The lock indicator indicates whether a lock table is created.

The data and adjunct indicators indicate respectively whether list entries have data entries and adjunct entries.

The name indicator indicates whether list entries are named.

The key indicator indicates whether list entries are keyed.

At least one of the lock, data or adjunct indicators is active (i.e., indicates that the condition is true). The name indicator and the key indicator are never both active. For the dequeue event monitor controls (DEMC), read event monitor controls (REMC), read event queue controls (REQC), and register event monitors (REMS) commands, the key indicator must be active; otherwise, the list structure type is invalid and a request exception is recognized.

Marginal Structure Size (MRSS): Specifies the minimum number of 4K-byte units of CF storage that are required for the creation of the requested lock table entries 1112, lists 1106, and associated controls for the list structure 902, independent of either the storage increment size or the requested target entry-to-element ratio.

Maximum Data List Entry Size (MDLES): Specifies the maximum size of the data list entry 1212 as an integral multiple of the list element size.

Maximum Event Monitor Controls Count (MEMCC): Specifies the maximum number of possible event monitor controls objects 1306 in a list set 1104.

Maximum List Set Element Count (MLSELC): Specifies the maximum number of list elements 1214 that are available for assignment to list entries 1208 or retry-data blocks, or both, in the list set 1104.

Maximum List Set Entry Count (MLSEC): Specifies the maximum number of possible list entries 1208 in a list set 1104.

Maximum Structure Size (MXSS): Specifies the maximum number of 4K-byte units of CF storage that can be allocated for the list 1106.

Minimum Apportionable Structure Size (MASS): Specifies the minimum number of 4K-byte units of CF storage that can be allocated for the list 1106, in integral multiples of the CF storage increment, that are sufficient for creating the requested lock table entries 1112, lists 1106, associated controls, enough event monitor controls 1306 and list entries 1208 with their associated controls to substantially satisfy the target monitor-to-entry storage ratio, and enough entries and elements to substantially satisfy the target entry-to-element ratio.

Monitor Reapportionment-in-Progress Indicator (MREIPI): Indicates whether a monitor-to-entry storage reapportionment process is currently active for the list structure 902.

Pending Entry-to-Element Ratio (PETELR): Contains the last requested target entry-to-element ratio on an allocate list structure command. The PETELR object is updated when the list structure 902 is initially allocated and when a reapportionment process is initiated.

Pending Monitor-to-Entry Storage Ratio (PMTESR): Contains the last requested target monitor-to-entry storage ratio on an allocate list structure command. The PMTESR object is updated when the list structure 902 has been initially allocated and a monitor-to-entry storage reapportionment process is requested.

Reapportionment-in-Progress Indicator (REIPI): Indicates whether a reapportionment process is currently active for the list structure 902.

Structure Authority (SAU): A value associated with each bit in the SID vector.

Structure Size (SS): Specifies the number of 4K-byte units allocated.

Structure Size Change Indicator (SSCI): Indicates whether an expansion or contraction process is currently active for the list structure 902.

Target Maximum Element Count (TMELC): Specifies the target for the maximum number of list elements 1214 that are available for assignment to list entries 1208 or retry-data blocks, or both, in the list set 1104.

Target Maximum Entry Count (TMEC): Specifies the target for the maximum number of possible list entries 1208 in a list set 1104.

Target Maximum Event Monitor Count (TMEMC): Specifies the target for the maximum number of event monitor controls objects 1306 that are available for registration of interest in subsidiary lists within the list set 1104.

Target Structure Size (TSS): Specifies the target number of 4K-byte units to be allocated.

User Identifier Vector (UIDV): A bit string with an initial value of zero. The bit positions start at zero and increase sequentially to the user identifier limit. The bit at position (i) in the string is set to one when a user is assigned with a UID value of (i). The bit at position (i) is reset to zero when a user is unassigned.

User Structure Control (USC): A field per structure defined by the user.

User Controls 1108

The user controls 1108 are created and initialized when a list structure user (such as a CF Manager component of shared queue manager 108, as described below) is assigned and are deleted when the list structure user is unassigned.

The user controls 1108 are summarized in the following table.

| User Controls | Acronym |
| --- | --- |
| List notification token | LNT |
| System identifier | SYID |
| User attachment control | UAC |
| User authority | UAU |
| User state | US |

List Notification Token (LNT): Specifies a list notification vector to the system.

System Identifier (SYID): A value specified by the program when a message path is activated. The system identifier is maintained in the message path status vector and copied into the user controls 1108 when an attach list structure user command is communicated over the message path.

User Attachment Control (UAC): A field per attached user defined by the user.

User Authority (UAU): A value that is compared and conditionally updated.

User State (US): Specifies whether the user is attached.

Lock Table 1110

The lock table 1110 is a sequence of objects 1112, called lock table entries. The number of lock table entries 1112 is determined when the table is created. The lock table entries 1112 are numbered from zero to the lock table entry count less one.

Each lock table entry 1112 has a global lock manager (GLM) object and an optional local lock managers (LLM) object. A lock table entry 1112 whose size is one byte has only a global lock manager object. When a lock table entry size is greater than one byte, the leftmost byte is the global lock manager object, and the remaining bytes form the local lock managers object. Lock tables 1110 with an entry size of one byte do not support local lock managers. Lock tables 1110 with an entry size of at least two bytes do support local lock managers.

The global lock manager object of a lock table entry 1112 contains an unsigned binary number called a user identifier.

The local lock managers object of a lock table entry 1112 contains a string of local lock bits, where each bit represents a user identifier. The bits in the object are numbered from left to right, starting at the value zero and proceeding upward to the bit for the highest valid user identifier.

The lock table objects have a value of zero when the table is allocated and may be modified by subsequent commands.

Event Queue Controls 1114

There is an event queue controls object 1114 for each event queue 1116 in a list structure 902. All of the event queue controls of an event queue 1116 with the exception of the key type, are initialized to zero when the event queue 1116 is created or when the associated list structure user is detached. The key type is initialized to primary for the primary event queue controls and is initialized to secondary for the secondary event queue controls.

The event queue controls are summarized in the following table.

| Event Queue Controls | Acronym |
|---|---|
| Event monitor controls queued count | EMCQC |
| Event notification entry number | ENEN |
| Event notification request type | ENRT |
| Event queue monitoring active bit | EQMAB |
| Event queue transition count | EQTC |
| Key type | KT |

Event Monitor Controls Queued Count (EMCQC): Specifies the number of event monitor controls 1306 currently queued to the event queue 1116.

Event Notification Entry Number (ENEN): Specifies a list notification vector entry associated with an event queue 1116.

Event Notification Request Type (ENRT): Indicates whether the list notification vector summaries are to be updated when an empty to not-empty state transition occurs on an event queue 1116. When active, this flag causes a user to be notified of empty-to-not empty transitions.

Event Queue Monitoring Active Bit (EQMAB): Specifies whether the user associated with the event queue 1116 is monitoring the event queue 1116.

Event Queue Transition Count (EQTC): Specifies the number of empty to not-empty event queue transitions that have occurred.

Key Type (KT): Indicates the key type (primary or secondary) of the event monitor controls 1306 that are queued on the event queue 1116. If the key type is primary, EMCs are queued for primary subsidiary lists; if the key type is secondary, EMCs are queued for secondary subsidiary lists.

Event Queue 1116

Figure 13A:
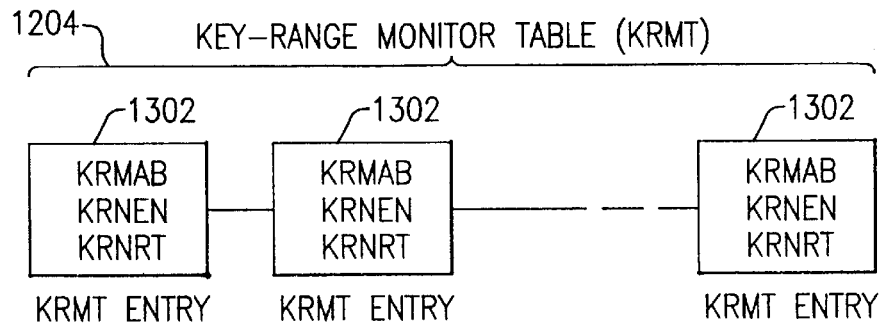
FIG. 13A shows a key range monitor table.
Figure 13B:
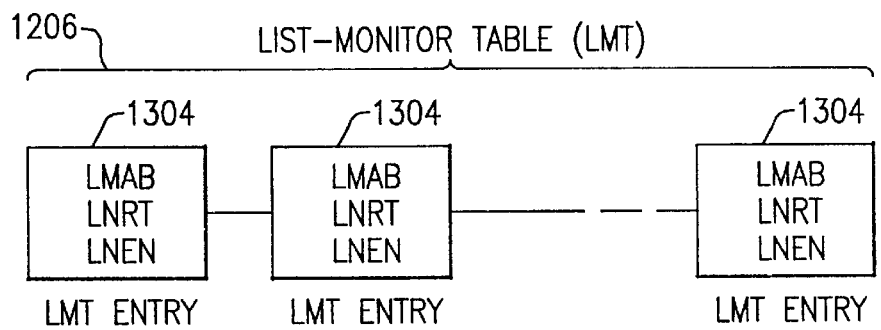
FIG. 13B shows a list monitor table.
Figure 13C:
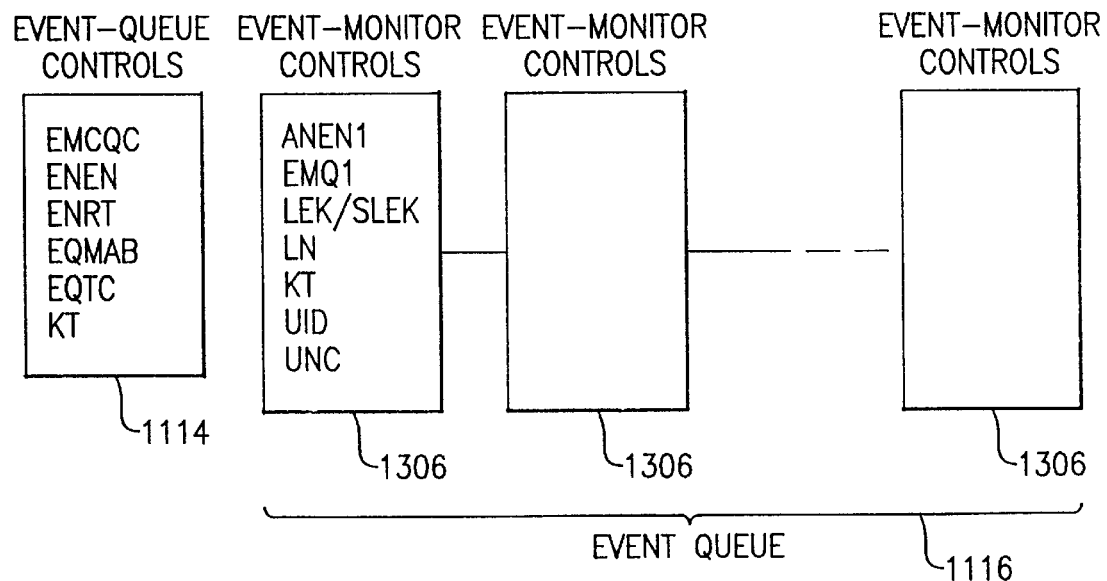
FIG. 13C shows an event queue.

An event queue 1116 is a sequence of objects called event monitor controls 1306 (FIG. 13C). There are zero, one, or two event queues 1116 created for each list structure user when the list structure 902 is allocated, depending on the list structure type. When the list structure 902 does not have keys, no event queues 1116 are created. When the list structure 902 has keys but not secondary keys, a single event queue 1116 is created for each user. This is referred to either as the event queue 1116 or the primary event queue 1116 When the list structure 902 has both keys and secondary keys, two event queues 1116 are created, a primary event queue 1116 that contains EMCs with list entry keys, and a secondary event queue 1116 that contains EMCs with secondary list entry keys. The event queues 1116 are deleted when the list structure 902 is deallocated.

An event monitor controls object 1306 is always queued to the rightmost position and dequeued from the leftmost position of the queue.

An event monitor controls object 1306 may be queued when (1) an empty to not-empty state transition occurs for a monitored subsidiary list, (2) notification of the initial subsidiary list state is requested on registration, or (3) a not-empty to not-empty state transition occurs for a monitored subsidiary list. An event monitor controls object 1306 may be withdrawn when a not-empty to empty state transition occurs for a monitored subsidiary list or when notification of the initial subsidiary list state is requested on registration, may be dequeued by means of the dequeue event monitor controls command, and may be deleted when a user deregisters interest in the subsidiary list or detaches from the list structure 902.

List 1106

A list 1106 is a sequence of objects 1208, called list entries. The number of possible entries 1208, from one to $2^{32}$, is determined when the list structure 902 is created.

The relative position of a list entry 1208 in the sequence is determined when the entry is created and may be changed when any list entry 1208 is created, deleted, or moved.

A list entry 1208 is located by means of a list entry identifier, list entry name, or by position. List positions may be ordered by the time sequence of when list entries 1208 are created on or moved to a list 1106 or list positions may be in key order. There may be one or two key orderings for a list 1106. If there is only one key ordering then list positions are ordered by increasing values of the list entry key. If two key orderings exist, then the primary key ordering is by increasing values of the list entry key and the secondary key ordering is by increasing values of the secondary list entry key.

The size of the largest list 1106 is limited by the free space and the size of all the controls required to support the list structure 902.

A list entry 1208 has up to two objects: a data list entry 1212 and an adjunct list entry 1216, depending on the list structure type.

A data list entry consists of from one to MDLES list elements 1214. The data list entry size is determined when the data list entry is written. The list element size is a power of 2 that is at least 256 bytes. The adjunct list entry size is 64 bytes.

A list entry 1208 exists when it is created and ceases to exist when it is deleted.

Subsidiary List

A subsidiary list is a list within a list 1106 where all list entries 1208 have the same key. There are two types, depending on the type of key. Primary subsidiary lists consist of list entries 1208 on the same list 1106 with the same list entry key. Secondary subsidiary lists consist of all list entries 1208 on the same list 1106 with the same secondary list entry key.

A primary subsidiary list may only exist when a list set 1104 is created and the list entries 1208 are keyed. A secondary subsidiary list may only exist when a list set 1104 is created and secondary keys are supported in the structure.

Adjunct Data Entry

The adjunct data entry is a 64-byte storage object containing unformatted data. When the structure contains adjuncts and the adjunct format control bits in the list entry controls are inactive, the adjunct list entry is an adjunct data entry.

Adjunct Secondary Key Entry: The adjunct secondary key entry is a storage object containing the secondary list entry key and a secondary adjunct data area. When the structure contains secondary keys and the adjunct secondary key entry indicator in the adjunct format control is active, the adjunct list entry is an adjunct secondary key entry.

The adjunct secondary key entry objects are summarized in the following table.

| Adjunct Secondary Key Entry | Acronym |
| --- | --- |
| Secondary list entry key | SLEK |
| Secondary adjunct data entry | SADE |

Secondary List Entry Key (SLEK): Partially designates the position of the list entry 1208 in the list 1106 in secondary key order.

Secondary Adjunct Data Entry (SADE): A storage object containing unformatted data.

List Controls 1202

There is a list controls object 1202 for every list 1106 created in a list structure 902. All the list controls 1202 except the list entry count limit and the list element count limit are initialized to zero when the list structure 902 is created.

The list controls 1202 are summarized in the following table.

| List Controls | Acronym |
| --- | --- |
| Assignment key | AK |
| Assignment key threshold | AKT |
| Cursor direction | CDIR |
| Key range empty notification threshold | KRENT |
| Key range list entry key | KRLEK |
| Key range maximum list entry key | KRMLEK |
| Key range monitor table | KRMT |
| Key range not-empty notification threshold | KRNENT |
| List authority | LAU |
| List cursor | LCUR |
| List element/list entry count | LELC/LEC |
| List element count/list entry count limit | LELCL/LECL |
| List empty notification threshold | LENT |
| List monitor table | LMT |
| List not-empty notification threshold | LNENT |
| List state transition count | LSTC |

Assignment Key (AK): Specifies the value assigned to a list entry key when a key assignment operation is executed for a list entry 1208 that is moved or created on the list 1106.

Assignment Key Threshold (AKT): Specifies the maximum value of an assignment key.

Cursor Direction (CDIR): Indicates how the list cursor is updated (left to right or right to left) when the list cursor is maintained or initialized by a write list controls command.

Key Range Empty Notification Threshold (KRENT): Specifies a number which is one less than the number of list entries 1208 that must remain in the key range to suppress a not-empty-to-empty list notification.

Key Range List Entry Key (KRLEK): Specifies the lower value of the key range.

Key Range Maximum List Entry Key (KRMLEK): Specifies the upper value of the key range.

Key Range Not-empty Notification Threshold (KRNENT): Specifies one less than the number of list entries 1208 required in the key range in order to generate an empty-to-not-empty list notification.

List Authority (LAU): A value that is compared and conditionally updated.

List Cursor (LCUR): A list entry identifier that identifies a list cursor position.

List Element Count (LELC): Specifies the number of list elements 1214 currently in the list 1106.

List Element Count Limit (LELCL): Specifies the maximum number of possible list elements 1214 in a list 1106.

List Empty Notification Threshold (LENT): Specifies a number which is one less than the number of list entries 1208 that must remain in the list 1106 to suppress a not-empty-to-empty list notification.

List Not-empty Notification Threshold (LNENT): Specifies one less than the number of list entries 1208 required on the list 1106 in order to generate an empty-to-not-empty list notification.

List Entry Count (LEC): Specifies the number of list entries 1208 currently in the list 1106.

List Entry Count Limit (LECL): Specifies the maximum number of possible list entries 1208 in a list 1106.

Key Range Monitor Table 1204

The key range monitor table 1204 contains information used to process the list notification vector of each user who has registered interest in key range state transitions.

The key range monitor table 1204 is a sequence of objects 1302 (FIG. 13A), called key range monitor table entries. The number of key range monitor table entries 1302 is determined when the table is created and is equal to the maximum number of list structure users plus one. The key range monitor table entries 1302 are numbered from zero to the user identifier limit.

Each key range monitor table entry 1302 has a key range monitoring active bit object, a key range notification request type object and key range notification entry number object.

Key Range Monitoring Active Bit (KRMAB): Specifies whether the user associated with the key range monitor table entry 1302 is monitoring the key range.

Key Range Notification Entry Number (KRNEN): Specifies a list notification vector entry associated with a monitored key range.

Key Range Notification Request Type (KRNRT): Indicates whether the list notification vector summaries are to be updated when an empty to not-empty state transition occurs on a monitored key range. When active, this flag causes the user to be notified of empty-to-not empty transitions.

Key range monitor table entry 1302

| Key Range Monitor Table Entry Object | Acronym |
| --- | --- |
| Key range monitor active bit | KRMAB |
| Key range notification request type | KRNRT |
| Key range notification entry number | KRNEN |

List Monitor Table 1206

The list monitor table 1206 contains information used to process the list notification vector of each user who has registered interest in the state transitions of the list 1106.

The list monitor table 1206 is a sequence of objects 1304 (FIG. 13B), called list monitor table entries. The number of list monitor table entries 1304 is determined when the table is created and is equal to the maximum number of list structure users plus one.

The list monitor table entries 1304 are numbered from zero to the user identifier limit.

Each list monitor table entry 1304 has a list monitoring active bit object, a list notification request type object and a list notification entry number object.

List Monitoring Active Bit (LMAB): Specifies whether the user associated with the list monitor table entry 1304 is monitoring the list.

List Notification Entry Number (LNEN): Specifies a list notification vector entry associated with a monitored list 1106.

List Notification Request Type (LNRT): Indicates whether the list notification vector summaries are to be updated when an empty to not-empty state transition occurs on a monitored list 1106.

List Monitor Table Entry

| List Monitor Table Entry Object | Acronym |
| --- | --- |
| List monitor active bit | LMAB |
| List notification request type | LNRT |
| List notification entry number | LNEN |

List Entry Controls 1210

There is a list entry controls object 1210 for every list entry 1208 within a structure. The list entry controls 1210 are initialized when a list entry 1208 is created and are deleted when a list entry 1208 is deleted. The list entry controls 1210 are summarized in the following table.

| List Entry Controls | Acronym |
| --- | --- |
| Adjunct format control | AFC |
| Data-list-entry size | DLES |
| List entry identifier | LEID |
| List entry key | LEK |
| List number | LN |
| Version number | VN |
| Adjunct data entry | ADE |

Adjunct Format Control (AFC): A bit string consisting of adjunct format bits. Each bit is associated with a particular adjunct format. The adjunct format control bits include an adjunct secondary key entry indicator and (2) an adjunct lock entry indicator. The bits are mutually exclusive; at most one bit is active. When all the bits are inactive, the adjunct list entry 1216 is unformatted and contains the adjunct data entry.

Data List Entry Size (DLES): Specifies the size of the data list entry 1212 as an integral multiple of the list element size.

List Entry Identifier (LEID): Designates the list entry 1208.

List Entry Key (LEK): Partially designates the position of the list entry 1208 in the list 1106.

List Number (LN): Designates the list 1106 that the list entry 1208 is in.

Event Monitor Controls 1306

There is an event monitor controls object 1306 for every user and subsidiary list combination for which a user has currently registered interest. The number of possible event monitor controls 1306, from one to $2^{32}-1$, is determined when the list structure 902 is created and may be changed when structure storage is expanded or contracted or the monitor-to-entry storage ratio is reapportioned.

An event monitor controls object 1306 is created when a user initially registers interest and is deleted when a user deregisters interest in a subsidiary list or detaches from the list structure 902.

All the event monitor controls 1306 except the event monitor queued indicator are initialized to the values provided as request operands 1010 during registration.

The event monitor controls 1306 are summarized in the following table.

| Event Monitor Controls | Acronym |
| --- | --- |
| Aggressive not-empty notification indicator | ANENI |
| Event monitor queued indicator | EMQI |
| List entry key/Secondary list entry key | LEK/SLEK |
| List number | LN |
| Key type | KT |
| User identifier | UID |
| User notification control | UNC |

Aggressive Not-empty Notification Indicator (ANENI): When inactive, indicates that the event monitor controls 1306 should be queued to the event queue 1116 for only the first list entry 1208 added to a subsidiary list. When active, indicates that the event monitor controls 1306 should be queued to the event queue for every list entry 1208 that is added.

Event Monitor Queued Indicator (EMQI): Indicates whether the event monitor controls object 1306 is queued to the event queue 1116 associated with the user ID contained within the object.

List Entry Key (LEK): Partially designates the primary subsidiary list.

List Number (LN): Partially designates the subsidiary list.

Key Type (KT): Indicates the key type (primary or secondary) in the event monitor controls 1306. When the key type is primary, the key is a (primary) list entry key and the event monitor controls 1306 are associated with a primary subsidiary list. When the key type is secondary, the key is a secondary list entry key and the event monitor controls 1306 are associated with a secondary subsidiary list.

Secondary List Entry Key (SLEK): Partially designates the secondary subsidiary list.

User Identifier (UID): Identifies the user.

User Notification Control (UNC): A field per event monitor controls 1306 defined by the user.

List Structure Object States

List States

A list 1106 is either in the empty or the not-empty state.

Empty State: A list 1106 is in the empty state when the number of list entries 1208 on the list 1106 is less than or equal to the list empty notification threshold.

Not-empty State: A list 1106 is in the not-empty state when the number of entries on the list 1106 is greater than the list not-empty notification threshold.

When the empty and not-empty notification thresholds for the list 1106 are not equal and the number of entries on the list 1106 falls between the list empty notification threshold and the list not-empty notification threshold, inclusive of the latter, the state of the list 1106 is determined as follows:

1. If an empty-to-not-empty list notification has not been generated since the list 1106 was created, the list 1106 is in the empty state.
2. If an empty-to-not-empty list notification has been generated since the list 1106 was created, the state of the list 1106 depends on the last generated list notification; if the last generated list notification is an empty-to-not-empty transition, the state of the list 1106 is not empty, otherwise the list 1106 is empty.

List State Transitions

A user may register interest in the state transitions of a list 1106 by means of the register list monitor command. A list 1106 may change either from the not-empty to the empty state or from the empty to the not-empty state.

Empty to Not-empty List State Transition: A list 1106 that is in the empty state changes from the empty to the not-empty state when an entry is created on or moved to the list 1106 and the number of list entries 1208 on the list 1106 becomes one greater than the list not-empty notification threshold.

Not-empty to Empty List State Transition: A list 1106 that is in the not empty state changes from the not-empty to the empty state when an entry is deleted from the list 1106 or moved to another list 1106 and the number of list entries 1208 on the list 1106 becomes equal to the list empty notification threshold.

Key Range States

A key range is either in the empty or the not-empty state. A user may request a notification of the initial state of a key range by means of the initial notification request type on the register list monitor command.

Empty State: A key range is in the empty state when the number of list entries 1208 in the key range is less than or equal to the key range empty notification threshold.

Not-empty State: A key range is in the not-empty state when the number of entries in the key range is greater than the key range not-empty notification threshold.

When the empty and not-empty notification thresholds for the key range are not equal and the number of entries in the key range falls between the key range empty notification threshold and the key range not-empty notification threshold, inclusive of the latter, the state of the key range is determined as follows:

1. If an empty-to-not-empty list notification has not been generated since the key range was initialized, the key range is in the empty state.
2. If an empty-to-not-empty list notification has been generated since the key range was initialized, the state of the key range depends on the last generated list notification; if the last generated list notification is an empty-to-not-empty transition, the state of the key range is not empty, otherwise the key range is empty.

Key Range State Transitions

A user may register interest in the state transitions of a key range by means of the register list monitor command. A key range may change either from the not-empty to the empty state or from the empty to the not-empty state.

Empty to Not-empty Key Range State Transition: A key range that is in the empty state changes from the empty to the not-empty state when (1) an entry is created in the key range, (2) an entry is moved to the key range, or (3) key range initialization completes, and the number of list entries 1208 in the key range becomes greater than the key range not-empty notification threshold when the number had previously been less than or equal to the threshold.

Not-empty to Empty Key Range State Transition: A key range that is in the not empty state changes from the not-empty to the empty state when an entry is (1) deleted from the key range, (2) moved to another list 1106, (3) moved to the same list 1106 with a new list entry key that is outside of the key range, or (4) key range initialization completes, and the number of list entries 1208 in the key range becomes less than or equal to the key range empty notification threshold when the number had previously been greater than the threshold.

Subsidiary List States

A subsidiary list is either in the empty or the not-empty state. A user may request to queue or withdraw the event monitor controls object 1306 to reflect the initial state of a subsidiary list by means of the initial notification request type on the register list monitor or register event monitors command.

Empty State: A subsidiary list is in the empty state when there are no entries in the subsidiary list.

Not-empty State: A subsidiary list is in the not-empty state when there are one or more entries in the subsidiary list.

Subsidiary List State Transitions

A user may register interest in the state transitions of a subsidiary list by means of the register list monitor or register event monitors command.

A subsidiary list may change either from the not-empty to the empty state, from the empty to the not empty state, or from the not-empty to the not-empty state.

Empty to Not-empty Subsidiary List State Transition: A subsidiary list changes from the empty to the not-empty state when the subsidiary list has no entries and an entry is created or moved to the subsidiary list.

Not-empty to Empty Subsidiary List State Transition: A subsidiary list changes from the not-empty to the empty state when the subsidiary list has one entry and the entry is deleted or moved to another subsidiary list.

Not-empty to Not-empty Subsidiary List State Transition: A subsidiary list changes from the not-empty to the not-empty state when (1) the subsidiary list is not empty, (2) an entry is created or moved to the subsidiary list, (3) the event monitor queued indicator is active and the aggressive not-empty notification indicator is active in the associated EMC.

Event Queue States

An event queue 1116 is either in the empty or the not-empty state. A user may request a notification of the initial state of an event queue 1116 by means of the initial notification request type on the register list monitor command.

Empty State: An event queue 1116 is in the empty state when there is no event monitor controls object 1306 queued to the event queue 1116.

Not-empty State: An event queue 1116 is in the not-empty state when there are one or more event monitor controls objects 1306 queued to the event queue 1116.

Event Queue State Transitions

A user may register interest in the state transitions of an event queue 1116 by means of the register list monitor command. An event queue 1116 may change either from the not-empty to the empty state or from the empty to the not-empty state.

Empty to Not-empty Event Queue State Transition: An event queue 1116 changes from the empty to the not-empty state when the event queue 1116 has no queued object and an event monitor controls object 1306 is queued to the event queue 1116.

Not-empty to Empty Event Queue State Transition: An event queue 1116 changes from the not-empty to the empty state when the event queue 1116 has one event monitor controls object 1306 queued and the object is dequeued, withdrawn, or deleted.

Creating a List Structure

When a list structure 902 is created, the list structure type determines the attributes of the created structure. The list structure type has indicators for each of the following: program list entry identifier indicator, counters, locks, data, adjunct, name, key, and secondary key.

When the program list entry identifier indicator in the list structure type specified is inactive and allocation is successful, the list structure 902 uses list entry identifier values that are generated by the coupling facility.

When the program list entry identifier indicator in the list structure type specified is active and allocation is successful, the list structure 902 uses list entry identifier values that ate program assigned.

When the element count indicator in the list structure type specified is inactive and allocation is successful, the list controls 1202 for each list 1106 contain a list entry count and a list entry count limit. When the count indicator in the list structure type specified is active and allocation is successful, the list controls 1202 for each list 1106 contain a list element count and a list element count limit.

When the lock indicator in the list structure type specified is active and allocation is successful, a lock table 1110 is created with a width as specified by the lock table entry characteristic and a length as specified by the lock table entry count.

When the data indicator in the list structure type specified is active and allocation is successful, storage is allocated for the creation of list elements 1214. The size of the list elements 1214 is specified by the list element characteristic.

When the adjunct indicator in the list structure type specified is active and allocation is successful, each list entry 1208 created in the structure has an adjunct list entry 1216 with a size of 64 bytes.

When the name indicator in the list structure type specified is active and allocation is successful, each list entry 1208 created in the structure has a list entry name associated with it.

When the key indicator in the list structure type specified is active and allocation is successful, every user identifier has primary event queue controls associated with it, each list entry 1208 created in the structure has a list entry key associated with it, and each list 1106 has a key range associated with it. The key range list entry key and maximum key range list entry key are both set to zero, and the key range is placed in the empty state.

When the secondary key indicator in the list structure type specified is active and allocation is successful, every user identifier has secondary event queue controls associated with it and each list entry 1208 created in the structure has a secondary list entry key associated with it stored in the adjunct list entry 1216.

When a list structure 902 is created, (1) the free space and free control space global controls are updated, (2) the appropriate created bit in the structure identifier vector is set to one, and (3) the list structure and list controls 1202 are initialized, including the update of the target structure size and target count objects.

When a list structure 902 is created and the maximum structure size request operand 1010 is nonzero, the maximum structure size object is initialized to the largest storage size that the model can support given the structure size and is equal to or smaller than the maximum structure size request operand 1010 rounded up to the nearest integral multiple of the CF storage increment.

When a list structure 902 is created, target structure size request operand 1010 is zero, and the maximum structure size request operand 1010 is zero, the maximum structure size object is set equal to the computed target structure size.

Specifying a nonzero target structure size which is smaller than the marginal structure size or larger than the maximum structure size will cause the allocation to complete with an appropriate response code.

Comparing List Authorities

The list authorities are always compared when the write list controls command is executed. Otherwise, the comparison of list authorities is controlled by the list authority comparison type operand. When the value of the list authority comparison type is do not compare, the list authorities are not compared and list authority comparison is successful.

When the value of the list authority comparison type is compare for being equal or compare for being less than or equal or when a write list controls command is executed, the CLAU operand is compared with the value of the list authority control in the specified list 1106.

The specified list 1106 is designated by the LN operand 1010 in the MCB 1002. The only exception is that when the write and move list entry command results in the creation of a list entry 1208, the specified list 1106 is designated by the TLN operand 1010 in the MCB 1002.

When the value of the list authority comparison type is compare for being equal and they are equal, the list authority comparison succeeds, and the command continues.

When the value of the list authority comparison type is compare for being less than or equal and the list authority control is less than or equal to the CLAU operand, the list authority comparison succeeds and the command continues.

When the list authority comparison fails, command execution is completed with an appropriate response code.

Replacing List Authorities

The list authority control may be replaced when the write list controls command is executed. Otherwise, the replacement of list authorities is controlled by the list authority replacement type and list authority comparison type operands. When the value of the list authority replacement type is active, the value of the LAU operand is stored in the list authority control provided one of the following conditions exists:

The command is write list controls and list authority comparison is successful, and (1) The value of the LAUCT operand is do not compare, or (2) The value of the LAUCT operand is compare for being equal or compare for being less than or equal and list authority comparison is successful.

List authority comparison always occurs before any list objects are updated.

Comparing Keys

When the key comparison type is active, the list entry key object is compared with the list entry key request operand 1010 and optionally the maximum list entry key operand. The key request type operand specifies how the keys are compared.

When the secondary key comparison type is active, the secondary list entry key object is compared with the secondary list entry key request operand 1010 and optionally the maximum secondary list entry key operand. The secondary key request type operand specifies how the keys are compared.

When both the key comparison type and the secondary key comparison type are active, both key comparisons are performed and both must succeed in order for the key comparison to be successful.

For multiple list entry commands, the key comparison is on an entry basis, the key is compared for the entry and the delete, read, or move for the entry occurs if the key comparison is successful for the entry. When the comparison is successful, the list entry 1208 is selectable by a multiple list entry command. When the comparison is unsuccessful, the list entry 1208 is not selectable.

Initializing a Key Range

A key range is initialized when a write list controls command is executed and the key range list entry key and key range maximum list entry key are updated or when a list 1106 is created and the list 1106 is keyed. A key range is initialized by calculating the number of list entries 1208 in the key range, comparing the count to the key range threshold values, and setting the key range state to either the empty state or the not-empty state. Initialization of the key range can be continued or completed by either continued executions of the write list controls command with bit 7 of the LCT active or by continued execution of the register list monitor command with a monitor request type of key range monitor. If key range initialization is not complete, the WLC or RLM commands complete with appropriate response codes.

If key range initialization is not complete, and a WLC command is executed with bit 7 of the LCT inactive or a RLM command is executed and the monitor request type is not key range monitor, then the WLC and RLM commands are executed independently from key range initialization.

If the WLC command is executed with bit 7 of the LCT active, key range initialization is in progress, and the specified key range list entry key or key range maximum list entry key are different from the values associated with the key range, initialization of the prior key range is stopped and initialization of the new key range is started.

Comparing Global Lock Managers

Generally, a global lock manager comparison is performed before a lock table entry 1112 is written, and a global lock manager comparison may be performed before the next nonzero lock table entry 1112 is read, or before a list entry 1208 is created, replaced, read, moved, or deleted, or before an adjunct lock entry is updated by an adjunct locking operation.

The global lock manager object is compared with the comparative global lock manager specified. When they match, the global lock manager comparison succeeds. When they do not match, the global lock manager comparison fails.

Except for the reset lock managers command and the read next lock table entry command, when a lock table write is to be performed, when a list entry creation, replacement, read, movement, or deletion is to be performed, or when an adjunct lock entry is to be updated by an adjunct locking operation, if the global lock manager comparison is requested and succeeds, the command continues; if the global lock manager comparison is requested and fails, command execution is completed with an appropriate response code.

For the reset lock managers command with the unlock type operand set to either B'10' or B'11', if the global lock manager comparison succeeds, the command continues. If the global lock manager comparison fails and if the report mismatch type operand is B'0', then a lock manager mismatch response code is returned. If the global lock manager comparison fails and if the report mismatch type operand is B'1', then the current request block is skipped and the command continues to process the next request block.

For the reset lock managers command with the unlock type operand set to B'01', if the global lock manager comparison succeeds and the report mismatch type operand is B'1', or both global and local lock manager comparisons are successful, the command continues. If the global lock manager comparison or local lock manager comparison fails, and the report mismatch type operand is B'0', then a lock manager mismatch response code is returned. If the global lock manager comparison fails and if the report mismatch type operand is B'1', then the current request block is skipped and the command continues to process the next request block.

For the read next lock table entry command with the lock request type operand set to compare global lock managers, if the global lock manager comparison succeeds on a nonzero lock table entry 1112, the entry is returned; if the global lock manager comparison fails, the entry is skipped and the scan of the lock table 1110 continues.

For the read next lock table entry command with the lock request type operand set to compare global lock or local lock managers, if either global lock manager or local lock manager comparison succeeds on a nonzero lock table entry 1112, the entry is returned; if neither comparison succeeds, the entry is skipped and the scan of the lock table 1110 continues.

Comparing Local Lock Managers

Generally, local lock manager comparison may occur before a lock table entry 1112 is written, before an adjunct lock entry is updated by an adjunct locking operation, before the next nonzero lock table entry 1112 is read, or before a list entry 1208 is created, replaced, read, moved, or deleted.

Local lock manager comparison is also performed as part of the global lock manager replacement process, and may also be performed as part of the local lock manager replacement process.

When a local lock manager object exists and a global lock manager replacement is requested, the local lock manager object value is ANDed with a mask of all ones except for the local lock bit corresponding to the user identifier specified. This ANDed value is then compared with zero. When they match, the local lock manager comparison succeeds. When they do not match, the local lock manager comparison fails.

When a local lock manager object exists and a local lock manager comparison is requested, or when a local lock manager object exists and a local lock manager replacement that requires the local lock manager comparison to be performed, is requested, the local lock bit corresponding to the user identifier specified is compared with the local lock bit value specified. When (1) they match and local lock manager comparison is requested or (2) they do not match and local lock manager replacement is requested, the local lock manager comparison succeeds. When (1) they do not match and local lock manager comparison is requested or (2) they match and local lock manager replacement is requested, the local lock manager comparison fails.

Except for the reset lock managers command and the read next lock table entry command, when a lock table write is to be performed, when a list entry creation, replacement, read, movement, or deletion is to be performed, or when an adjunct lock entry is to be updated by an adjunct locking operation, if the local lock manager comparison is requested and succeeds, the command continues; if the local lock manager comparison is requested and fails, command execution is completed with an appropriate response code.

For the reset lock managers command, local lock manager comparison may be performed when the unlock type operand is B'01'. In this case, if the global lock manager comparison succeeds and the report mismatch type operand is B'1', or both global and local lock manager comparisons are successful, the command continues. If the global lock manager comparison or local lock manager comparison fails, and the report mismatch type operand is B'0', then a lock manager mismatch response code is returned.

For the read next lock table entry command with the lock request type operand set to compare local lock managers, if the local lock manager comparison succeeds on a nonzero lock table entry 1112, the entry is returned; if the local lock manager comparison fails, the entry is skipped and the scan of the lock table 1110 continues.

For the read next lock table entry command with the lock request type operand set to compare global lock or local lock managers, if either global lock manager or local lock manager comparison succeeds on a nonzero lock table entry 1112, the entry is returned; if neither comparison succeeds, the entry is skipped and the scan of the lock table 1110 continues.

Locating a List Entry or List Entry Position

A list entry 1208 is located by unkeyed position. when an entry locator type of locate by unkeyed position is specified or an unkeyed list entry 1208 is created or moved; that is, the designated position or designated target position is specified by means of a list number and a direction.

A list entry 1208 is located by keyed position when the list entries 1208 are keyed and an entry locator type of locate by keyed position is specified or a keyed list entry 1208 is created or moved; that is, the designated position or designated target position is specified by means of a list number, direction, and a list entry key.

A list entry 1208 is located by list entry identifier when an entry locator type of locate by list entry identifier is specified; that is, the designated position is the position of the identified list entry 1208.

A list entry 1208 is located by list entry name when the list entries 1208 are named and an entry locator type of locate by list entry name is specified; that is, the designated position is the position of the named list entry 1208.

A list entry 1208 is located by list cursor position when an entry locator type of locate by list cursor position is specified; that is the designated position is the position of the identified list entry 1208 as specified by the list cursor.

A list entry 1208 has a position relative to the designated position or the designated target position. When a list entry 1208 is created, moved, or deleted, the relative positions of the successive list entries 1208 are changed. In these cases, the first entry is the designated list entry 1208 and successive entries are determined by the direction specified.

Regardless of how a list entry 1208 is located, when a left-to-right direction is specified, the last entry is the rightmost entry in the list 1106, and when a right-to-left direction is specified, the last entry is the leftmost entry in the list 1106.

Designated List Entry

The designated list entry 1208 is (1) the first entry relative to the designated position before an entry is deleted, moved, read, replaced, replaced and moved, moved and read, or read and deleted, or is (2) the first entry relative to the designated target position after an entry is created.

When a list entry 1208 is located by list entry identifier, the designated list entry 1208 is the identified list entry 1208.

When a list entry 1208 is located by list entry name, the designated list entry 1208 is the named list entry 1208.

When a list entry 1208 is located by list cursor position, the designated list entry 1208 is the identified list entry 1208 as specified by the list cursor.

When a list entry 1208 is located by unkeyed position and a left-to-right direction is specified, the designated list entry 1208 is the leftmost entry in the list 1106. When a list entry 1208 is located by unkeyed position and a right-to-left direction is specified, the designated list entry 1208 is the rightmost entry in the list 1106.

When (1) a list entry 1208 is located by keyed position the entry locator key type is primary, and the KRT does not indicate key range, (2) entry deletion, read, replacement, or movement is requested, (3) a list entry 1208 with an equal key, a less than or equal key, or a greater than or equal key, exists on the list 1106, depending on the key request type, and (4) a left-to-right direction is specified, then the designated list entry 1208 is the leftmost entry with a key equal, with the largest key less than or equal, or with the smallest key greater than or equal to the specified list entry key request operand 1010.

When (1) a list entry 1208 is located by keyed position, the entry locator key type is primary, and the KRT does not indicate key range, (2) entry deletion, read, replacement, or movement is requested, (3) a list entry 1208 with an equal key, a less than or equal key, or a greater than or equal key, exists on the list 1106, depending on the key request type, and (4) a right-to-left direction is specified, then the designated list entry 1208 is the rightmost entry with a key equal, with the largest key less than or equal, or with the smallest key greater than or equal to the specified list entry key request operand 1010.

When (1) a list entry 1208 is located by keyed position, the entry locator key type is secondary, and the SKRT does not indicate key range, (2) entry deletion, read, replacement, or movement is requested, (3) a list entry 1208 with an equal secondary key, a less than or equal secondary key, or a greater than or equal secondary key, exists on the list 1106, depending on the secondary key request type, and (4) a left-to-right direction is specified, then the designated list entry 1208 is the leftmost entry with a secondary key equal, with the largest secondary key less than or equal, or with the smallest secondary key greater than or equal to the specified secondary list entry key request operand 1010.

When (1) a list entry 1208 is located by keyed position, the entry locator key type is secondary, and the SKRT does not indicate key range, (2) entry deletion, read, replacement, or movement is requested, (3) a list entry 1208 with an equal secondary key, a less than or equal secondary key, or a greater than or equal secondary key, exists on the list 1106, depending on the secondary key request type, and (4) a right-to-left direction is specified, then the designated list entry 1208 is the rightmost entry with a secondary key equal, with the largest secondary key less than or equal, or with the smallest secondary key greater than or equal to the specified secondary list entry key request operand 1010.

When (1) a list entry 1208 is located by keyed position, the entry locator key type is primary, and the KRT indicates key range, (2) entry deletion, read, replacement, or movement is requested, (3) a list entry 1208 with a key within range exists on the list 1106, and (4) a left-to-right direction is specified, then the designated list entry 1208 is the leftmost entry with a key value greater than or equal to the specified list entry key request operand 1010.

When (1) a list entry 1208 is located by keyed position, the entry locator key type is primary, and the KRT indicates key range, (2) entry deletion, read, replacement, or movement is requested, (3) a list entry 1208 with a key within range exists on the list 1106, and (4) a right-to-left direction is specified, then the designated list entry 1208 is the rightmost entry with a key value less than or equal to the specified maximum list entry key request operand 1010.

When (1) a list entry 1208 is located by keyed position, the entry locator key type is secondary, and the SKRT indicates key range, (2) entry deletion, read, replacement, or movement is requested, (3) a list entry 1208 with a secondary key within range exists on the list 1106, and (4) a left-to-right direction is specified, then the designated list entry 1208 is the leftmost entry with a secondary key value greater than or equal to the specified secondary list entry key request operand 1010.

When (1) a list entry 1208 is located by keyed position, the entry locator key type is secondary, and the SKRT indicates key range, (2) entry deletion, read, replacement, or movement is requested, (3) a list entry 1208 with a secondary key within range exists on the list 1106, and (4) a right-to-left direction is specified, then the designated list entry 1208 is the rightmost entry with a key value less than or equal to the specified maximum secondary list entry key request operand 1010.

Designated Position

The designated position is the position of the designated list entry 1208 before an entry is moved, deleted, read, replaced, replaced and moved, moved and read, or read and deleted.

The designated position is specified (1) by an unkeyed position, (2) by a keyed position, (3) by a list entry identifier, (4) by a list entry name, or (5) by a list cursor, depending on the entry locator type and the entry locator key type specified and the type of structure allocated.

When a list entry 1208 is located by list entry identifier or by list entry name, the designated position exists when the list entry 1208 exists.

When a list entry 1208 is located by list cursor, the designated position exists when the identified list entry 1208 exists as specified by the list cursor.

When a list entry 1208 is located by unkeyed position, the designated position exists when the list 1106 exists and there is at least one entry on the list 1106.

When a list entry 1208 is located by keyed position and entry creation is not requested, the designated position exists when a list entry 1208 in the list 1106 has a key that is equal, greater than or equal, or less than or equal to the specified list entry key in the list 1106, depending on the key request type.

When a list entry 1208 is located by keyed position, the entry locator key type is primary, and entry creation is not requested, the designated position exists when a list entry 1208 in the list 1106 has a key that is equal to, greater than or equal to, less than or equal to, or within the range specified by the list entry key and the maximum list entry operands, depending on the key request type.

When a list entry 1208 is located by keyed position, the entry locator key type is secondary, and entry creation is not requested, the designated position exists when a list entry 1208 in the list 1106 has a secondary key that is equal to, greater than or equal to, less than or equal to, or within the range specified by the secondary list entry key and the maximum secondary list entry operands, depending on the secondary key request type.

When the designated position does not exist, an appropriate response code is returned.

Designated Target Position

The designated target position is the position of the designated list entry 1208 after an entry is created or moved.

The designated target position is specified (1) by an unkeyed position or (2) by a keyed position, depending on the type of structure allocated.

When a list entry 1208 is located by unkeyed position and a left-to-right direction is specified, then the designated target position is the leftmost position in the list 1106. When a list entry 1208 is located by unkeyed position and a right-to-left direction is specified, then the designated target position is the rightmost position in the list 1106.

When (1) a list entry 1208 is located by keyed position, (2) entry creation or movement is requested, (3) a list entry 1208 with an equal key of the specified entry locator key type exists on the list 1106, (4) a left-to-right direction is specified, then the designated target position is the position of the leftmost entry with the same key.

When (1) a list entry 1208 is located by keyed position, (2) entry creation or movement is requested, (3) a list entry 1208 with an equal key of the specified entry locator key type exists on the list 1106, (4) a right-to-left direction is specified, then the designated target position is the position of the rightmost entry with the same key.

When (1) a list entry 1208 is located by keyed position, (2) entry creation or movement is requested, and (3) all entries on the list 1106 have a key of the specified entry locator key type greater than the specified key, the designated target position is the leftmost position in the list 1106.

When (1) a list entry 1208 is located by keyed position, (2) entry creation or movement is requested, (3) at least one list entry 1208 on the list 1106 has a key of the specified entry locator key type less than the specified key, and (4) there is no list entry 1208 in the list 1106 that matches the specified key, then the designated target position is the first position after the rightmost entry with a key less than the specified list entry key in the list 1106.

When a list entry 1208 is located by keyed position and entry creation or movement is requested, the designated target position exists when the list 1106 exists.

Comparing List Numbers

When the list number comparison type is active and a list entry 1208 is not created, a list number comparison is requested.

When list number comparison is requested, the list number object is compared with the list number specified. If they do not match, the list number comparison fails, command execution is completed with an appropriate response code or command execution continues by skipping the current list entry 1208, depending on the command.

Comparing Counts

There are four sets of counts that are compared, depending on the process requested: the list set entry counts, the list set element counts, the event monitor controls counts, and the list entry counts or list element counts, depending on the element count indicator.

Comparing Event Monitor Controls Counts

The maximum event monitor controls count object is compared with the event monitor controls count object whenever an event monitor is registered and event monitor controls creation is requested. The event monitor controls object space is full when the maximum event monitor controls object equals the event monitor controls object.

Comparing List Element Counts

The list element count limit object is compared with the list element count object whenever a list entry 1208 is written or moved, the suppress list limit comparison control is inactive, and the element count indicator in the list structure type is active. If the sum of the list element count and the number of additional list elements 1214 required exceeds the list element count limit, the list 1106 is full. When the list 1106 is full and a write or move operation is requested, an appropriate response code is returned.

The list element count limit or list entry count limit is updated on a write list controls command, depending on the list control type.

Comparing List Entry Counts

The list entry count limit object is compared with the list entry count object whenever a list entry 1208 is created or moved, the suppress list limit comparison control is inactive, and the element count indicator in the list structure type is inactive. A list 1106 is full when the number of list entries 1208 created matches or exceeds the list entry count limit. When the list 1106 is full and a create or move operation is requested, an appropriate response code, depending on the command, is returned.

The record global lock manager command is an exception to list entry count limit comparison.

Comparing List Set Element Counts

The maximum list set element count object is compared with the list set element count object whenever a data list entry 1212 is written. If the sum of the list set element count and the number of additional list elements 1214 required exceeds the maximum list set element count, the list set 1104 is full. When the list set 1104 is full, and list entry creation or replacement, or retry data block creation is requested, an appropriate response code is returned.

Comparing List Set Entry Counts

The maximum list set entry count object is compared with the list set entry count object whenever a list entry 1208 is created. A list set 1104 is full when the number of list entries 1208 created and not deleted matches the maximum list set entry count. When a list set 1104 is full and list entry creation is requested, an appropriate response code, depending on the command, is returned.

Updating Counts

There are three types of counts that are updated, depending on the process requested: the list set entry count, the list set element count, and the list entry count or list element count, depending on the count indicator.

Updating the List Element Counts

The list element counts are updated when the element count indicator in the list structure type is active and a list entry 1208 is created, deleted, moved to another list 1106, or replaced and the number of list elements 1214 associated with the list entry 1208 is changed or a retry data block is created or deleted. When the list entry 1208 is also the retry data block, the count is at most incremented or decremented by the number of list elements 1214 associated with the list entry 1208.

Updating the List Entry Counts

The list entry counts are updated when the element count indicator in the list structure type is inactive and a list entry 1208 is created, deleted, or moved to another list 1106.

Updating the List Set Element Count

The list set element count is updated whenever a list entry 1208 is created, deleted, or replaced and the number of list elements 1214 associated with the list entry 1208 is changed.

Updating the List Set Entry Count

The list set entry count is updated whenever a list entry 1208 created or deleted.

Comparing Version Numbers

Version numbers may be compared when an entry is replaced, read, moved, or deleted, or when an adjunct lock entry is updated by an adjunct locking operation, depending on the version request type and the version comparison request type specified. When the first bit of the version request type is B'1', the version number object is compared with the CVN request operand 1010. When the VCRT is B'0' and they are equal or when the VCRT is B'1' and the version number object is less than or equal to the CVN operand, the comparison is successful and the command continues. If the comparison fails, command execution is completed with an appropriate response code or command execution continues by skipping the current list entry 1208, depending on the command.

Updating a Version Number

When an entry is created, replaced, read, or moved, or when an adjunct lock entry is updated by an adjunct locking operation, a version number may be updated depending on the version request type specified.

When a version request type of B'001' is specified, or a version request type of B'101' is specified and version number comparison is successful, the version number is decremented by one.

When a version request type of B'010' is specified, or a version request type of B'110' is specified and version number comparison is successful, the version number is incremented by one.

When a version request type of B'011' is specified, or a version request type of B'111' is specified and version number comparison is successful, the version number object is set to the version number request operand 1010.

Updating the List Assignment Key

The assignment key for the target list 1106 may be updated on a move list entry, a move list entries, a move and read list entry, a write and move list entry, or a write list entry command.

When the assignment key request type indicates that the key is assigned, the conditions for key assignment for the designated list entry 1208 are satisfied as specified by the AKRT operand, and the assignment key update type is increment the value of the assignment key increment is added to the assignment key and the resultant is compared with the assignment key threshold. If the resultant is less than or equal to the assignment key threshold, the resultant is stored in the assignment key. If the resultant is greater than the assignment key threshold, the assignment key is not updated and an appropriate response code is returned.

Writing a List Entry

A list entry 1208 may be written on a write list entry or a write and move list entry command. A list entry 1208 is written when an entry is created or replaced.

When a list entry 1208 is created, the data and adjunct indicators within the list structure type object are used to determine whether or not to write the data or adjunct list entry, or both. When a list entry 1208 is replaced, the data and adjunct indicators within the list entry type operand are used to determine whether or not to write the data or adjunct list entry, or both.

When the data indicator is active, the data list entry 1212 is written from the data block 1006. When the adjunct indicator is active, the adjunct list entry 1216 is written from the adjunct list entry value request operand 1010.

When the data list entry 1212 is replaced and the data list entry size operand is smaller than the data list entry size object, the data list entry is contracted to the new size, the data block 1006 is stored in the data list entry, and the data list entry size object in the list entry controls 1210 is updated with the value of the data list entry size operand. When the data list entry 1212 is replaced and the data list entry size operand is larger than the data list entry size object, the data list entry is expanded to the new size, the data block 1006 is stored in the data list entry, and the data list entry size object in the list entry controls 1210 is updated with the value of the data list entry size operand.

When an adjunct list entry 1216 is replaced and secondary keys are supported in the structure, bytes 0 to 31 in the adjunct list entry value request operand 1010 are not stored and bytes 32 to 63 in the adjunct list entry value request operand 1010 are stored in the secondary adjunct data entry. The secondary list entry key is not changed when the adjunct list entry 1216 is replaced.

Creating a List Entry

List entry creation is requested on a write list entry or write and move list entry command, depending on the write request type specified. List entry creation is also requested on a record global lock manager command or may be also requested by an adjunct lock request process.

When a write request type of create list entry is specified, list entry creation is unconditionally requested. When a write request type of replace or create list entry is specified, list entry creation is conditionally requested; that is, the list entry creation is requested when the designated list entry 1208 does not exist.

When the list set 1104 and the target list 1106 is not full and list entry creation is requested, a list entry 1208 may be created. When a list entry 1208 is created on the target list 1106, (1) the list set entry count and when it exists, the associated list entry count are each incremented by one, (2) the list set element count and when it exists, the associated list element count are each increased by the value of the data list entry size, and (3) the write result response operand (WRES) 1014 is set to "a new list entry was created".

A list entry 1208 is created at the first entry position relative to the designated target position, and the relative position of all succeeding entries is increased by one.

When a keyed entry is created by executing the write list entry command, if the AKRT operand is either assigned on create or assigned on create or move, and if the assignment key object in the target list 1106 is less than or equal to the assignment key threshold object, then the target key is set to the value of the assignment key object in the target list 1106 prior to updating the list assignment key. If the AKRT operand is either assigned on create or assigned on create or move, and if the assignment key object in the target list 1106 is greater than the assignment key threshold object, the command is completed without creating the list entry 1208, and an appropriate response code is returned.

When a keyed entry is created by executing the write and move list entry command and if the AKRT operand is either not assigned or assigned on move, the MELT operand specifies which key value the target key is set to: zero means the LEK in MCB and one means the TLEK in MCB. If the AKRT operand is either assigned on create or assigned on create or move, and if the assignment key object in the target list 1106 is less than or equal to the assignment key threshold object, then the target key is set to the value of the assignment key object in the target list 1106 prior to updating the list assignment key. If the AKRT operand is either assigned on create or assigned on create or move, and if the assignment key object in the target list 1106 is greater than the assignment key threshold object, the command is completed without creating the list entry 1208, and an appropriate response code is returned.

When a write request type of create list entry is specified and the list entry name already exists, an appropriate response code is returned.

When a list entry 1208 is created with a program list entry identifier indicator value of inactive, the coupling facility generates the list entry identifier value.

When a list entry 1208 is created with a program list entry identifier indicator value of active, the list entry identifier value for the entry is the value provided by the program in the list entry identifier operand in the MCB for the command. The LEID value stored in the list entry 1208 is the LEID operand. The LEID value is checked to ensure that it is unique in the structure. There is no requirement for the LEID value to be unique for any specific length of time and may be reused once the entry which has that LEID assigned to it is deleted.

Replacing a List Entry

A list entry 1208 may be replaced on a write list entry or write and move list entry command.

When a write request type of replace list entry or replace or create list entry is specified and the designated list entry 1208 exists, the list entry 1208 may be replaced.

When a list entry 1208 is replaced, the list set element count and when it exists, the associated list element count are each increased or decreased by the change in the data list entry size, and the write result response operand (WRES) 1014 is set to existing list entry replaced.

When a write request type of replace list entry is specified and the designated list entry 1208 does not exist, an appropriate response code is returned.

The position of an entry is not affected when it is replaced.

Reading a List Entry

A list entry 1208 may be read on a read list entry, move and read list entry, or read and delete list entry command, and one or more list entries 1208 may be read on a read list or read list set command.

When the data indicator in the list entry type specified is active, one or more data list entries 1212 may be read into the data area, depending on the command executed. When the adjunct indicator in the list entry type specified is active, one adjunct list entry 1216 may be read into the adjunct list entry value response operand 1014, or one or more adjunct list entries are read into the data area, depending on the command executed.

When a read list or read list set command is executed, the adjunct or data list entries are always read into the data area. Otherwise, when any other command that does a read operation is executed, the adjunct list entry 1216 is read into the response operand 1014.

The position of an entry is not affected by a read operation.

Moving a List Entry

A list entry 1208 may be moved on a move list entry, move list entries, write and move list entry, or a move and read list entry command. List entries 1208 may be moved between lists 1106 or to the same list 1106 within a list set 1104.

The source list 1106 is the list 1106 associated with the designated list entry 1208. The target list 1106 is the list 1106 associated with the designated target position.

When a list entry 1208 is moved from one list 1106 to another and the list entry count exists, the list entry count of the source list 1106 is decremented by one and the list entry count of the target list 1106 is incremented by one.

When a list entry 1208 is moved from one list 1106 to another and the list element count exists, the list element count of the source list 1106 is decreased by the value of the data list entry size and the list element count of the target list 1106 is increased by the same amount.

A list entry 1208 is moved from the first entry position relative to the designated position, and the relative position of all succeeding entries is decreased by one.

A list entry 1208 is moved to the first entry position relative to the designated target position, and the relative position of all succeeding entries is increased by one.

When a keyed entry is moved and if the AKRT operand is either not assigned or assigned on create, the MELT operand specifies which key value the target key is set to zero means the LEK in the list entry 1208 and one means the TLEK in MCB.

If the AKRT operand is either assigned on move or assigned on create or move, and if the assignment key object in the target list 1106 is less than or equal to the assignment key threshold object, then the target key is set to the value of the assignment key object in the target list 1106 prior to updating the list assignment key.

If the AKRT operand is either assigned on move or assigned on create or move, and if the assignment key object in the target list 1106 is greater than the assignment key threshold object, the command is completed without creating the list entry 1208, and an appropriate response code 10 is returned.

A list entry key is updated by the move process if the target key is set to either the TLEK request operand 1014 or the assignment key object. The value of the list entry key may or may not be changed when it is updated. A list entry key is not updated by the move process if the target key is set equal to the list entry key object.

Similarly, a secondary list entry key is updated by the move process if the target secondary key is set to the value of the TSLEK request operand 1010, and is not updated by the move process if the target secondary key is set equal to the SLEK object. The value of the secondary list entry key may or may not be changed when it is updated.

When a keyed entry is moved to the same list 1106, the LEK object is not updated by the move process, and the MPKP operand is active, the TDIR operand is ignored and the designated primary key position is not changed.

When a keyed entry with secondary keys is moved to the same list 1106, the SLEK object is not updated by the move process, and the MSKP operand is active, the STDIR operand is ignored and the designated secondary key position is not changed.

When a keyed entry with secondary keys is moved to the same list 1106, neither the LEK nor the SLEK object are updated, and both the MPKP and MSKP operands are active, the TDIR and STDIR operands are ignored and no move operation occurs.

When a keyed entry with secondary keys is moved by a move list entries command, the SMELT operand specifies which key value the target secondary key is set to; inactive means the SLEK in the list entry 1208 and active means the TSLEK in the move block. When a list entry 1208 is moved by any other command, the SLEK is not changed. Assignment keys are not supported for secondary keys.

Deleting a List Entry

A list entry 1208 may be deleted on a delete list entry or read and delete list entry command and one or more list entries 1208 may be deleted on a delete list, delete list set or delete list entries command.

When a list entry 1208 is deleted, the list set entry count and when it exists, the list entry count are each decreased by one.

When a list entry 1208 is deleted, the list set element count and when it exists, the list element count are each decreased by the value of the data list entry size.

An entry is deleted at the first entry position relative to the designated position, and the relative position of all succeeding entries is decreased by one.

Notifying a Key Range Monitor

When a key range state transition occurs, one or more list notification commands are initiated for the key range.

When registration of a key range monitor is performed and the initial notification request type operand is active, one or more list notification commands are performed as primary processes for the user. When the specified key range is empty, a list notification command indicating a not-empty-to-empty key range state transition is performed; when the specified key range is not empty, a list notification command indicating an empty-to-not-empty key range state transition is performed.

Registration of a key range monitor may receive a list notification even if the initial notification request type operand is inactive and no key range state transition occurs. This is because the list notification command had been pending since before the last deregistration.

All commands capable of creating, deleting, or moving a list entry 1208 initiate list notification commands as secondary processes for the designated key range that changes state.

Updating the List Cursor

When the list cursor request type (LCURT) operand is active, the list cursor of the list 1106 in which the designated list entry 1208 resides is updated. When the list 1106 is keyed, the list order used in identifying the next and previous list entries 1208 is the primary key order.

When LCURT is inactive or not provided along with the command, no list cursor is updated with two exceptions. The two exceptions are: (1) when a list entry 1208 associated with a list cursor position is moved to another list 1106, and (2) when a list entry 1208 associated with a list cursor position is deleted. In these two cases, the list cursor of the list 1106 in which the designated list entry 1208 resides is reset to zero.

When the LCURT operand is active, the list cursor is updated. The updated value of the list cursor depends on the designated position or target position, the specified direction, and the specified list cursor update type (LCUT) operand.

List cursor updated to next entry: When a list cursor update type of update cursor to next entry is specified, the list cursor is updated to the list entry identifier of the next list entry 1208 as specified by the designated list entry 1208 and the direction subject to the following boundary conditions:
1. When the designated list entry 1208 is the leftmost entry on the list 11106 and a right-to-left direction is specified, the list cursor is reset to zero.
2. When the designated list entry 1208 is the rightmost entry on the list 1106 and a left-to-right direction is specified, the list cursor is reset to zero.

When a list entry 1208 is created by executing the write and move list entry command, the direction is specified by the TDIR operand; otherwise, the direction is specified by the DIR operand.

List cursor updated to current entry: When a list cursor update type of update cursor to current entry is specified, the list cursor is updated to the list entry identifier of the designated list entry 1208, provided the designated list entry 1208 is not being deleted or moved to another list 1106. When the designated list entry 1208 is being deleted or moved to another list 1106, the list cursor is set to zero.

List cursor maintained at next entry: When a list cursor update type of maintain cursor at next entry is specified and the list entry 1208 associated with the list cursor position is deleted or moved, the list cursor is updated to the list entry identifier of the next list entry 1208 as specified by the designated list entry 1208 and the cursor direction list control subject to the following boundary conditions:
1. When the designated list entry 1208 is the leftmost entry on the list 1106 and the cursor direction is right to left, the list cursor is reset to zero.
2. When the designated list entry 1208 is the rightmost entry on the list 1106 and the cursor direction is left to right, the list cursor is reset to zero.

When the list entry 1208 associated with the list cursor exists and is not being deleted or moved, the list cursor is not updated.

List cursor maintained at current entry: When a list cursor update type of maintain cursor at current entry is specified and the list cursor is zero, the list cursor is updated to the list entry identifier of the designated list entry 1208, provided the designated list entry 1208 is not being deleted or moved to another list 1106. When the designated list entry 1208 is being deleted or moved to another list 1106, the list cursor remains zero.

When the list entry 1208 associated with the list cursor exists and is not being deleted or moved to another list 1106, the list cursor is not updated. When the designated list entry 1208 is being deleted or moved to another list 1106, the list cursor is reset to zero.

Registering a Monitor

A monitor is registered by means of the register list monitor or register event monitors command. A list structure user may register as a monitor when the user is attached with a nonzero list notification token.

The register list monitor command can be used to register any of the following four types of monitors: list, event queue, event monitors, and key range. The monitor request type operand is provided to specify the monitor type. The register event monitors command is used to register a number of event monitors.

When the monitor request type operand specifies a list monitor, the list monitoring active flag is set, and the list notification request type and list notification entry number are updated in the list monitor table entry 1304 of the specified list 1106 and user.

When the monitor request type operand specifies an event queue monitor, the event queue 1116 of the specified key type is initialized. The event queue monitoring active flag is set, and the event notification request type and event notification entry number are updated in the event queue controls.

When the monitor request type operand specifies an event monitor or a register event monitors command is executed, the event monitor controls object 1306 of the specified key type of each specified subsidiary list and user is created if it does not exist, and is updated if it does exist.

When the monitor request type operand specifies a key range monitor, the key range monitoring active flag is set, and the key range notification request type and the key range notification entry number are updated in the key range monitor table entry of the specified list 1106 and user.

Deregistering a Monitor

A monitor is deregistered by means of the deregister list monitor or detach list structure user command. The monitor request type operand is provided by the deregister list monitor command to specify the monitor type to be deregistered.

When a list monitor is deregistered, the list monitoring active flag is reset in the list monitor table entry 1304 of the specified list 1106 and user.

When an event queue monitor is deregistered, the event queue monitoring active flag, the event notification request type, and event notification entry number are reset for the event queue controls of the specified key type.

When an event monitor is deregistered the event monitor controls object 1306 associated with the user and the key type and the subsidiary list of the specified key type are deleted.

When a key range monitor is deregistered, the key range monitoring active flag is reset in the list monitor table entry 1304 of the specified list 1106 and user.

Handling of Event Monitor Controls

This section describes processes of creating, updating, queueing, dequeueing, deleting, and withdrawing an event monitor controls object 1306.

Creating Event Monitor Controls: When a user registers interest in a subsidiary list by means of executing a register list monitor or register event monitors command, if the associated event monitor controls object 1306 does not exist, then an event monitor controls object 1306 is created for the user and the specified subsidiary list.

Updating Event Monitor Controls: When a user registers interest in a subsidiary list by means of executing a register list monitor or register event monitors command, if the associated event monitor controls object 1306 already exists, then the object is updated.

Queueing Event Monitor Controls: The event monitor controls queueing process may be a primary or secondary process, depending on its causing command. When an event monitor is registered by means of the register list monitor command, if the initial notification request type operand is active, the designated subsidiary list is not empty, and the designated event monitor controls object 1306 is not queued, then an event monitor controls queueing process is performed to queue the designated event monitor controls object 1306 to the event queue 1116 of the user as a primary process. When an event monitor is registered by means of the register event monitors command, if the initial notification request type operand is active, and the event monitor queue indicator control operand is inactive, the designated subsidiary list is not empty, and the designated event monitor controls object 1306 is not queued, then an event monitor controls queueing process is performed to queue the designated event monitor controls object 1306 to the event queue 1116 of the user as a primary process. When an event monitor is registered by means of the register event monitors command, if the initial notification request type operand is active, and the event monitor queue indicator control operand is active, the event monitor queue indicator operand is active, and the designated event monitor controls object 1306 is not queued, then an event monitor controls queueing process is performed to queue the designated event monitor controls object 1306 to the event queue 1116 of the user as a primary process.

When execution of a command causes an empty-to-not-empty or not-empty-to-not-empty subsidiary list state transition, an event monitor controls queueing process is initiated for the subsidiary list as a secondary process. All list structure commands capable of creating or moving a list entry 1208 may cause an empty-to-not-empty or not-empty-to-not-empty subsidiary list state transition. Execution of a pending event monitor controls queueing process queues every event monitor controls object 1306 that exists at that time and is associated with the designated subsidiary list to the event queue 1116 of the corresponding key type of the user specified in the event monitor controls object 1306. No action is taken for those designated event monitor controls objects 1306 that are already queued. If no designated event monitor controls object 1306 exists, no action is taken and the process execution is complete. If there are two or more pending queueing and withdrawal processes for the same subsidiary list, only the most recently initiated process needs to be performed, and all previous queueing or withdrawal processes may be purged. Execution of an event monitor controls queueing process is complete before execution of a subsequent withdrawal process targeted to the same event monitor controls object 1306 begins.

Dequeueing Event Monitor Controls: The event monitor controls objects 1306 of a user are dequeued from the event queue 1116 by means of the dequeue event monitor controls command.

Deleting Event Monitor Controls: When a user deregisters an event monitor, the associated event monitor controls object 1306 is deleted and the event monitor controls deletion process performed is a primary process.

Withdrawing Event Monitor Controls: The event monitor controls withdrawal process may be a primary or secondary process, depending on its causing command. When an event monitor is registered by means of the register list monitor command, if the initial notification request type operand is active, the designated subsidiary list is empty, and the designated event monitor controls object 1306 is queued, then an event monitor controls withdrawal process is performed to withdraw the designated event monitor controls object 1306 from the event queue 1116 of the user as a primary process. When an event monitor is registered by means of the register event monitors command, if the initial notification request type operand is active, the event monitor queue indicator control operand is inactive, the designated subsidiary list is empty, and the designated event monitor controls object 1306 is queued, then an event monitor controls withdrawal process is performed to withdraw the designated event monitor controls object 1306 from the event queue 1116 of the user as a primary process.

When an event monitor is registered by means of the register event monitors command, if the initial notification request type operand is active, the event monitor queue indicator control operand is active, the event monitor queue indicator operand is inactive, and the designated event monitor controls object 1306 is queued, then an event monitor controls withdrawal process is performed to withdraw the designated event monitor controls object 1306 from the event queue 1116 of the user as a primary process.

When execution of a command causes a not-empty-to-empty subsidiary list state transition, an event monitor controls withdrawal process is initiated for the subsidiary list as a secondary process. All list structure commands capable of deleting or moving a list entry 1208 may cause a not-empty-to-empty subsidiary list state transition.

Execution of a pending event monitor controls withdrawal process removes every event monitor controls object 1306 that is associated with the designated subsidiary list from the event queue 1116 of the user specified in the event monitor controls object 1306. No action is taken for those designated event monitor controls objects 1306 that are not queued. If no designated event monitor controls object 1306 is queued to any event queue 1116, no action is taken and the process execution is complete. If there are two or more pending queueing and withdrawal processes for the same subsidiary list, only the most recently initiated process needs to be performed, and all previous queueing or withdrawal processes may be purged. Execution of an event monitor controls withdrawing process is complete before execution of a subsequent queueing process targeted to the same event monitor controls object 1306 begins.

Notifying an Event Queue Monitor

When an event queue state transition occurs, one or more list notification commands are generated for the event queue 1116.

When registration of an event queue monitor is performed and the initial notification request type operand is active, one or more list notification commands are performed as primary processes for the user. When the specified event queue 1116 is empty, a list notification command indicating a not-empty-to-empty queue state transition is performed; when the specified event queue 1116 is not empty, a list notification command indicating an empty-to-not-empty queue state transition is performed.

Registration of an event queue monitor may receive an event queue notification even if the initial notification request type operand is inactive and no event queue state transition occurs. This is because the list notification command had been pending since before the last deregistration.

If performance of an event monitor controls queueing process or event monitor controls withdrawal process causes the designated event queue 1116 to change its state, and if the process is caused by executing a register list monitor or register event monitors command with the initial notification request type operand set to active, then one or more list notification commands are performed as primary processes. If the queueing or withdrawal process is caused by executing any other command, then one or more list notification commands are initiated as secondary processes.

If performance of an event monitor controls dequeueing process or event monitor controls deletion process causes the designated event queue 1116 to change its state, then one or more list notification commands are performed as primary processes. The only exception is that the event monitor controls deletion processes initiated by the detach list structure user command do not initiate any list notification command.

Notifying a List Monitor

When a list state transition occurs, one or more list notification commands are initiated for the list 1106.

When registration of a list monitor is performed and the initial notification request type operand is active, one or more list notification commands are performed as primary processes for the user. When the specified list 1106 is empty, a list notification command indicating a not-empty-to-empty list state transition is performed; when the specified list 1106 is not empty, a list notification command indicating an empty-to-not-empty list state transition is performed.

Registration of a list monitor may receive a list notification even if the initial notification request type operand is inactive and no list state transition occurs. This is because the list notification command had been pending since before the last deregistration.

All commands capable of creating, deleting, or moving a list entry 1208 initiate list notification commands as secondary processes for the designated list 1106 that changes state.

Notifying a Key Range Monitor

When a key range state transition occurs, one or more list notification commands are initiated for the key range. When registration of a key range monitor is performed and the initial notification request type operand is active, one or more list notification commands are performed as primary processes for the user. When the specified key range is empty, a list notification command indicating a not-empty-to-empty key range state transition is performed; when the specified key range is not empty, a list notification command indicating an empty-to-not-empty key range state transition is performed.

Registration of a key range monitor may receive a list notification even if the initial notification request type operand is inactive and no key range state transition occurs. This is because the list notification command had been pending since before the last deregistration.

All commands capable of creating, deleting, or moving a list entry 1208 initiate list notification commands as secondary processes for the designated key range that changes state.

List Command Operands

Adjunct List Entry (ALE): A value that is read from or written to an adjunct list entry 1216. This request operand 1010 is ignored unless the list structure 902 has adjunct list entries 1216 and (1) a create operation is requested, or (2) the list entry type specifies an adjunct list entry 1216 and a replace operation is requested.

Adjunct Format Control (AFC): A bit string consisting of adjunct format bits. Each bit is associated with a particular adjunct format. The adjunct format control bits include an adjunct secondary key indicator and adjunct lock entry indicator.

The bits are mutually exclusive; at most one bit is active. When all the bits are inactive, the adjunct is unformatted and contains the adjunct data list entry.

Allocation Type (AT): A four-bit value that indicates what action an allocate command should take. The first two bits are the ratio indicators (RI), the third bit is the structure size indicator (SSI), and the fourth bit is the user structure control indicator (USCI).

An allocation type of all inactive bits specifies that all list allocation processes are checkpointed and stopped.

The first bit of the ratio indicator is the monitor-to-entry storage ratio indicator (MTESRI), the second bit is the entry-to-element ratio indicator (ETELRI).

The monitor-to-entry storage ratio indicator is not meaningful at this granularity when inactive, but indicates when active to initiate or continue monitor-to-entry storage reapportionment as specified by the target monitor-to-entry storage ratio request operand, and, if ETELRI is inactive, resume entry-to-element reapportionment as specified by the pending entry-to-element ratio.

The entry-to-element ratio indicator is not meaningful at this granularity when inactive, but indicates when active to initiate or continue entry-to-element reapportionment as specified by the target entry-to-element ratio request operand, and, if MTESRI is inactive, resume monitor-to-entry storage reapportionment as specified by the pending monitor-to-entry storage ratio.

The structure size indicator in not meaningful at this granularity when inactive, but indicates when active to initiate or continue expansion or contraction as specified by the target structure size request operand, and resume each suspended reapportionment as specified by the associated pending ratio if the associated ratio indicator is zero.

The user structure control indicator indicates whether the user structure control is updated.

The structure authority is always compared and conditionally replaced. The allocation type is ignored unless the initial allocation process is complete. When the data indicator (DI) in the list structure type (LST) object is inactive, the entry-to-element ratio indicator (ETELRI) must be inactive; when the key indicator (KI) in the LST object is inactive, the monitor-to-entry storage ratio indicator (MTESRI) must be inactive.

Apportionment Priority Indicator (API): A flag directs the resolution of conflicts in the establishment of an accurate ratio in an expansion or contraction process or when the list 1106 is initially allocated. When active, it indicates that maintaining an accurate ratio is of higher priority than maximizing the amount of storage resources that are assigned to the structure. When inactive, it indicates that maximizing storage resources is of higher priority and a less accurate ratio will be tolerated.

This operand is ignored when a reapportionment process is specified and an expansion or contraction process is not specified, or when a list 1106 is initially allocated and the target counts priority indicator is active.

Assignment Key Increment (AKI): A four-byte unsigned binary integer that is added to the value of the assignment key when the assignment key is updated. This request operand 1010 is ignored unless the list entries 1208 are keyed, the assignment key request type indicates that the key is assigned, and the assignment key update type is increment.

Assignment Key Request Type (AKRT): A two-bit value that indicates when the list entry key is set to the value of the assignment key in the list controls 1202. It may indicate that the list entry key is (1) not assigned, (2) assigned on move, (3) assigned on create, or (4) assigned on create or move.

Assignment Key Update Type (AKUT): A one-bit value that indicates how the assignment key is updated. It may indicate that the assignment key is (1) not updated or (2) incremented.

Comparative Global Lock Manager (CGLM): A value that is compared to the global lock manager object. This request operand 1010 is ignored unless the lock request type is valid and specifies a comparison of the global lock managers.

Comparative List Authority (CLAU): A value that is compared to the list authority object.

Comparative Structure Authority (CSAU): A value that is compared to the structure authority object.

Current Data Index (CDX): A value that indexes to the current list entry name or list entry identifier in the data block 1006 for the delete list entries command.

Current Event Index (CTX): A value that indexes to the current event in the data block 1006 for the register event monitors command.

Cursor Direction (CDIR): Indicates how the list cursor is updated (left to right or right to left) when the list cursor is maintained or initialized by a write list controls command.

Cursor Direction Type (CDT): Determines how the cursor direction and location is set for the write list controls command. When the cursor direction type bit is inactive, the list cursor is initialized to the leftmost or rightmost list entry 1208 based on the CDIR operand. When the cursor direction type bit is active, the list cursor is initialized based on the LEID and the CDIR operand. This operand is ignored if the list cursor bit in the LCT operand is inactive.

Data Block Size (DBS): Specifies the size of the data block 1006 as an integral multiple of 4096-byte units. Valid values range from 1 to 16 if the command is not read list structure controls. If the command is read list structure controls, valid values range from 0 to 16.

Data Entries Locator Type (DAELT): Indicates how a list entry 1208 is located for the move list entries command.

When the list structure 902 does not have list entry names, the operand may indicate locate by list entry identifier.

When the list structure 902 has list entry names, the operand may indicate (1) locate by list entry identifier or (2) locate by list entry name.

Data List Entry (DLE): A value that is read from or written to a data list entry 1212.

Data List Entry Size (DLES): Specifies the size of the data list entry 1212 as an integral multiple of the list element size.

Delete Entries Locator Type (DELT): Indicates how a list entry 1208 is located for the delete list entries command.

When the list structure 902 does not have list entry names, the operand may indicate locate by list entry identifier.

When the list structure 902 has list entry names, the operand may indicate (1) locate by list entry identifier or (2) locate by list entry name.

Delete List Entries Count (DLEC): Specifies the number of deleted list entries 1208.

Direction (DIR): indicates whether the positions of the list entries 1208 are numbered left to right or right to left relative to a designated position.

Element Toleration Factor (ELTF): When divided by 100, specifies the minimum number of data list elements 1214 that may still be assigned to list entries 1208 or retry data blocks, or both, after any checkpoint of a contraction, expansion, entry-to-element reapportionment, or monitor-to-entry storage reapportionment process as a percentage of the total number of existing data list elements 1214.

Ending Data Index (EDX): Indexes to the last list entry name or list entry identifier in the data block 1006 for the delete list entries command.

Ending Event Index (ETX): Indexes to the last event in the data block 1006 for the register event monitors command.

Entry Locator Key Type (ELKT): Indicates the type of key (primary or secondary) that is used for locating a list entry 1208 when the entry locator type specifies locate by keyed position.

Event monitor queue indicator control (EMQIC): Controls EMC enqueueing or withdrawal. The EMQIC bit is ignored if the INRT bit is inactive. If the EMQIC bit is active and the INRT bit is active, the EMC is queued, not queued, withdrawn, or not withdrawn based on the EMQI bit. If the EMQIC bit is inactive and the INRT bit is active, the EMC is queued, not queued, withdrawn, or not withdrawn based on the state of the sublist.

Entry Locator Type (ELT): Indicates how a list entry 1208 is located for a read, replace, or delete operation, or as the source of a move operation.

When the list structure 902 does not have list entry names or list entry keys, the operand may indicate (1) locate by unkeyed position, (2) locate by list entry identifier, (3) locate by list cursor position.

When the list structure 902 has list entry names, the operand may indicate (1) locate by unkeyed position, (2) locate by list entry identifier, (3) locate by list entry name, or (4) locate by list cursor position.

When the list structure 902 has list entry keys, the operand may indicate (1) locate by unkeyed position, (2) locate by keyed position, (3) locate by list entry identifier, or (4) locate by list cursor position.

When a list entry 1208 is created, the entry locator type operand is ignored. Instead, for a create or move operation, the target list entry position is located by keyed position when the entries are keyed, or by unkeyed position when the entries are not keyed.

When a list set 1104 is not allocated, all ELTs are invalid.

Entry Toleration Factor (ETF): When divided by 100, specifies the minimum number of list entries 1208 that may still be created after any checkpoint of a contraction, expansion, entry-to-element reapportionment, or monitor-to-entry storage reapportionment process as a percentage of the total number of existing list entries 1208.

Event Monitor Controls Dequeued Count (EMCDC): Specifies the number of event monitor controls objects 1306 dequeued by means of the dequeue event monitor controls command.

Event Monitor Toleration Factor (EMTF): When divided by 100, specifies the minimum number of event monitor controls 1306 that may still be created after any checkpoint of a contraction, expansion, entry-to-element reapportionment, or monitor-to-entry storage reapportionment process as a percentage of the total number of existing event monitor controls 1306.

Event Notification Entry Number (ENEN): Specifies a list notification vector entry.

Event Notification Request Type (ENRT): Indicates whether the list notification vector summaries are to be updated when an empty to not-empty state transition occurs on a monitored event queue 1116.

Event Queue Monitoring Active Bit (EQMAB): Specifies whether the user associated with the event queue 1116 is monitoring the event queue 1116.

Failed Replacement Indicator (FRPI): When active, indicates that a replacement of the data list entry failed with a list set full condition and the size of the DLES operand is smaller than or equal to the size of the DLES object.

Granular Version Number Comparison (GVNC): indicates how the version number comparison is to be performed for move list entries and delete list entries commands. If the flag is active, the VCRT, VRT, CVN, and if applicable the VN in the data block 1006 are used to compare, and if applicable, replace, the version for the list entry 1208, with each list entry 1208 in the data block 1006 having its own set of values. If the flag is inactive, the VCRT, VRT, CVN, in the MCB are used to compare the version for all list entries 1208 processed.

Halt on miscompare (HOM): Determines if the move list entries or delete list entries command stops processing on a miscompare. If the flag is active, processing of the command stops when a miscompare occurs. If the flag is inactive, processing of the command continues when a miscompare occurs.

Halt register event monitors (HREMS): Controls if an EMC is not registered and skipped or the registration process is halted. When the AOC bit is active and the HREMS bit is inactive, the EMC is skipped and processing continues if an EMC specifies a UID that is not assigned. When the AOC bit is active and the HREMS bit is active, processing is halted when an EMC that specifies a UID that is not assigned is processed. When the AOC bit is inactive and the HREMS bit is inactive, the EMC is skipped and processing continues if an EMC specifies a UID that is not attached. When the AOC bit is inactive and the HREMS bit is active, processing is halted when an EMC that specifies a UID that is not attached is processed.

Initial Notification Request Type (INRT): Indicates whether to notify a monitor of the initial state of the monitored object, except that when the request monitor type specifies an event monitor and the EMQIC bit is active, the initial state of the monitored object is ignored and the EMQI bit in the REMS registration block is used.

When the monitor request type specifies a list monitor, the initial notification request type indicates whether the list monitor is notified.

When the monitor request type specifies an event queue monitor, the initial notification request type indicates whether the event queue monitor is notified.

When the monitor request type specifies an event monitor, the initial notification request type indicates whether the event monitor controls object is queued or withdrawn, or no action taken.

When the monitor request type specifies a key range, the initial notification request type indicates whether the key range monitor is notified.

Key Comparison Type (KCT): Indicates whether key comparison is requested.

Key Range Empty Notification Threshold (KRENT): Specifies a number which is one less than the number of list entries 1208 that must remain in the key range to suppress a not-empty-to-empty list notification.

Key Range List Entry Key (KRLEK): Specifies the lower value of the key range.

Key Range Maximum List Entry Key (KRMLEK): Specifies the upper value of the key range.

Key Range Monitoring Active Bit (KRMAB): Specifies whether the user associated with the key range monitor table entry 1302 is monitoring the key range.

Key Range Not-empty Notification Threshold (KRNENT): Specifies one less than the number of list entries 1208 required in the key range in order to generate an empty-to-not-empty list notification.

Key Range Notification Entry Number (KRNEN): Specifies a list notification vector entry.

Key Range Notification Request Type (KRNRT): Indicates whether the list notification vector summaries are to be updated when an empty to not-empty state transition occurs on a monitored key range for the specified user identifier.

Key Request Type (KRT): Indicates how a keyed list entry 1208 is located when an entry is replaced, moved, read or deleted. For the read list command, when the key comparison type operand is active, the key request type operand also specifies how keys are compared. A two-bit value that indicates how a list entry 1208 is located when the entry locator type indicates location by keyed position, the entry locator key type is primary, and an entry is replaced, moved, read or deleted. When the key comparison type operand is active, the key request type operand also specifies how keys are compared.

The KRT operand is a dual purpose operand. When KCT is active, the KRT operand is used to control the type of list entry key comparison to be performed on a command. When the KCT is inactive, no list entry key comparison is performed. When ELT designates that an entry is located by keyed position, and the ELKT operand is primary, the KRT operand is used to control the type of entry location performed. When the ELT designates an entry location by a means other than keyed position, or the ELKT operand is secondary, the KRT has no effect on entry location. The type determines the relationship between the list entry key object and the list entry key and maximum list entry key operands. It may indicate a comparison for (1) equal to the list entry key operand, (2) less than or equal to the list entry key operand, (3) greater than or equal to the list entry key operand, or (4) within the range of the list entry key to the maximum list entry key operands, inclusive.

For the delete list entry, move and read list entry, move list entry, read and delete list entry, read list entry, write and move list entry, and write list entry commands the value "within the range" is invalid. For the delete list entries, delete list set, read list set, read list, delete list, and move list entries commands the value "within the range" specifies that the keyed list entry satisfies the search criterion or the key comparison criteria if it is within the range of the list entry key to the maximum list entry key operands, inclusive.

The key request type operand is ignored unless an entry is replaced, moved, read or deleted, and (1) the key comparison type is active, or (2) the entry locator type is locate by keyed position and the entry locator key type is primary.

Key Type (KT): Indicates the type of key (primary or secondary) that is used for selecting an event queue 1116 or the event monitor controls 1306 for a subsidiary list.

List Authority (LAU): A value that is conditionally updated.

List Authority Comparison Type (LAUCT): Indicates the procedure for comparing the list authority. It may indicate (1) do not compare list authorities, (2) compare list authority object and CLAU operand for being equal, or (3) compare list authority object for being less than or equal to the CLAU operand.

List Authority Replacement Type (LAURT): Indicates the procedure for updating the list authority. It may indicate (1) do not replace the list authority or (2) replace the list authority object with the LAU operand.

List Control Type (LCT): A bit string consisting of 16 consecutive list control update bits. Each bit is associated with a particular list control 1202, and when active, causes the list control 1202 to be updated to a specified value. When the bit is inactive, the associated list control 1202 is not updated. The association of list control update bits to list controls 1202 is as follows:

| Bit | List control |
|---|---|
| 0–3 | Invalid. |
| 4 | List state transition count |
| 5 | List empty notification threshold and List not-empty notification threshold |
| 6 | Key range empty notification threshold and Key range not-empty notification threshold |
| 7 | Key range maximum list entry key and Key range list entry key |
| 8–10 | Invalid |
| 11 | Assignment key. |
| 12 | Assignment key threshold. |
| 13 | List cursor and cursor direction. |
| 14 | User list control. |
| 15 | List element count limit or list entry count limit. |

Bits 6, 7, 11 and 12 are ignored unless the list entries 1208 are keyed.

List Count (LC): Specifies the number of lists 1106 to be allocated.

List Cursor Request Type (LCURT): Indicates whether the list cursor is to be updated.

List Cursor Update Type (LCUT): Indicates how a list cursor is updated when list cursor update is requested. It may indicate (1) update cursor to next entry, (2) update cursor to current entry, (3) maintain cursor at next entry, or (4) maintain cursor at current entry.

List Element Characteristic (LELX): Specifies the number of bytes in each list element 1214.

List Element Count Limit (LELCL): Specifies the maximum number of list elements 1214 in a list 1106.

List Empty Notification Threshold (LENT): Specifies a number which is one less than the number of list entries 1208 that must remain on the list 1106 to suppress a not-empty-to-empty list notification.

List Not-empty Notification Threshold (LNENT): Specifies one less than the number of list entries 1208 required on the list 1106 in order to generate an empty-to-not-empty list notification.

List Entry Count Limit (LECL): Specifies the maximum number of list entries 1208 in a list 1106.

List Entry Identifier (LEID): An integer that designates the list entry 1208. The LEID is written into the LEID object when the entry is created and into the list cursor object when a write list controls command updates the list cursor and the cursor direction type is active.

For LEIDs when the program list entry identifier indicator is inactive and a list entry 1208 is being created, a nonzero list entry identifier that is unique to a list set 1104 for at least 100 years is assigned by the coupling facility.

For LEIDs when the program list entry identifier indicator is active and a list entry 1208 is being created, the LEID value in the MCB is written into the LEID object for the list entry 1208. The LEID value is checked to ensure that it is unique in the structure. There is no requirement for the LEID value to be unique for any specific length of time and may be reused once the entry which has that LEID assigned to it is deleted.

For LEIDs when the program list entry identifier indicator is active and a list entry 1208 is being created, the LEID value may be any value except zero, which is invalid.

When the command is write list controls, the LEID operand may be zero or must designate a list entry 1208 that exists on the list 1106 specified by the LN operand. The LEID operand is ignored on write list controls unless the list cursor bit and the cursor direction type are both active.

List Entry Key (LEK): Partially specifies a list entry position or an event monitor controls object 1306.

List Entry Name (LEN): Fully specifies a list entry position.

List Entry Type (LET): Indicates which list entries 1208 are read or replaced upon normal completion of the command execution. The first bit is a data indicator (DI) that indicates whether or not a data list entry is read or written, and the second is an adjunct indicator (AI) that indicates whether or not an adjunct list entry is read or written.

List Monitoring Active Bit (LMAB): Specifies whether the user associated with the list monitor table entry 1304 is monitoring the list 1106.

List Notification Entry Number (LNEN): Specifies a list notification vector entry.

List Notification Request Type (LNRT): Indicates whether the list notification vector summaries are to be updated when an empty to not-empty state transition occurs on a monitored list 1106.

List Notification Token (LNT): Specifies a list notification vector to the system.

List Number (LN): An integer that designates a list 1106 in a list set 1104.

List Number Comparison Type (LNCT): Indicates whether list number comparison is requested.

List Scan Key Type (LSKT): Indicates the key order (primary or secondary) used by a list scan process in a delete list or read list command.

Lock Request Type (LRT): A value that indicates the type of lock request. When a single list entry command is issued, the lock request type may be: (1) no lock process requested; (2) compare the global lock managers; (3) replace the global lock manager; (4) replace a local lock manager; or (5) replace the global lock and local lock managers.

When a multiple list entry command is issued, the lock request type may be: (1) no lock manager comparison; (2) compare the local lock managers; (3) compare the global lock or local lock managers; or (4) compare the global lock managers.

Lock Table Entry (LTE): A value that is read from a lock table entry 1112.

Lock Table Entry Characteristic (LTEX): Specifies the number of bytes in each lock table entry 1112.

Lock Table Entry Count (LTEC): Specifies the number of lock table entries 1112 to be allocated.

Lock Table Entry Number (LTEN): Specifies an entry in a lock table.

Maintain Primary Key Position (MPKP): Indicates whether the list entry 1208 is moved from its current position on a primary subsidiary list when the target list number specifies the list 1106 that contains the list entry 1208, and the list entry 1208 key is not changed by the move operation.

Maintain Secondary Key Position (MSKP): Indicates whether the list entry 1208 is moved from its current position on a secondary subsidiary list when the target list number specifies the list 1106 that contains the list entry 1208, and the secondary list entry key is not changed by the move operation.

Maximum Data List Entry Size (MDLES): Specifies the maximum size of the data list entry 1212 as an integral multiple of the list element size.

Maximum List Entry Key (MLEK): Partially specifies the maximum value the list entry key can have when the key compare type indicates key comparison and the key request type compares the key within range, or entry location by key range is specified and the ELKT operand is primary.

Maximum Secondary List Entry Key (MSLEK): Partially specifies the maximum value the secondary list entry key can have when the secondary key comparison type indicates key comparison, the secondary key request type compares the key within range, or entry location by key range is specified and the entry locator key type is secondary.

Maximum Structure Size (MXSS): Specifies the maximum number of 4,096-byte units allocated.

Minimum Required Control Storage (MRCS): Specifies the minimum number of 4K-byte units that must be allocated from control storage.

Monitor Request Type (MRT): Indicates what type of monitor to register or deregister. It may indicate (1) a list monitor, (2) an event queue monitor, (3) an event monitor, or (4) a key range monitor.

Monitored Object State (MOS): Indicates the state of the monitored object: empty (0) or not empty (1).

Monitored Object State Vector (MOSV): A bit string where the bit positions start at 0 and increase sequentially to 1K−1. The bit at position (i) in the string is set to one when the corresponding event monitor as specified in the data block 1006 of the register event monitors command is registered as a result of the command execution and the corresponding subsidiary list is not empty (i equals the event index minus one). Bit positions CTX−1 to ETX−1, and, when STX is greater than one, bit positions 0 to STX−2 are zero regardless of the state of the corresponding subsidiary list. Bit positions ETX to 1K−1 are reserved.

Move Entry Locator Type (MELT): A value that specifies which key value the target key is set to when (1) a list entry is created or moved by executing a move list entry, move and read list entry, move list entries, or write and move list entry command and (2) the AKRT operand indicates that the key is not assigned or the conditions of setting the target key to the assignment key as specified by the AKRT operand with a nonzero value are not satisfied.

For a list entry creation process, the operand indicates (when inactive) set to the list entry key in the MCB or (when active) set to the target list entry key in the MCB.

For a list entry movement process, the operand indicates (when inactive) set to the list entry key in the list entry or (when active) set to the target list entry key in the MCB.

This request operand 1010 is ignored when the list entries 1208 are not keyed and the command is not MLES or when AKRT takes precedence over MELT in one of the following conditions:

1. A list entry creation process is performed and the AKRT operand is assigned on create or assigned on create or move, or
2. A list entry movement process is performed and the AKRT operand is assigned on move or assigned or create or move.

The operand must be zero if (1) the command is MLES, (2) the list entries 1208 are not keyed, and (3) AKRT does not take precedence.

For the move list entry, move and read list entry, move list entries, and write and move list entry commands, both MELT and AKRT are provided as input operands. However, AKRT takes precedence over MELT, and MELT takes effect only if AKRT indicates that the key is not assigned or the conditions specified by an AKRT that indicates that the key is assigned are not satisfied.

For a list entry creation process, the following table summarizes the target key assignment scenarios.

Target Key Assignment for Creating a List Entry

| AKRT | Write and Move List Entry | | |
|---|---|---|---|
| | MELT = LEK | MELT = TLEK | Write List Entry |
| Not assigned | LEK in MCB | TLEK in MCB | LEK in MCB |
| Assigned on move | LEK in MCB | TLEK in MCB | LEK in MCB |
| Assigned on create | Assignment Key | Assignment Key | Assignment Key |
| Ass'd on create/move | Assignment Key | Assignment Key | Assignment Key |

For a list entry move process, the following table summarizes the target key assignment scenarios.

Target Key Assignment for Moving a List Entry

| AKRT | Move List Entry, Move and Read List Entry, Write and Move List Entry | |
|---|---|---|
| | MELT = LEK | MELT = TLEK |
| Not assigned | LEK in the list entry | TLEK in MCB |
| Assigned on move | Assignment Key | Assignment Key |
| Assigned on create | LEK in the list entry | TLEK in MCB |
| Assigned on create or move | Assignment Key | Assignment Key |

Target Key Assignment for Moving List Entries

| AKRT | Move List Entries | |
|---|---|---|
| | MELT = LEK | MELT = TLEK |
| Not assigned | LEK in the list entry | TLEK in the Data Block |
| Assigned on move | Assignment Key | Assignment Key |
| Assigned on create | LEK in the list entry | TLEK in the Data Block |
| Assigned on create or move | Assignment Key | Assignment Key |

Move List Entries Count (MLEC): Specifies the number of moved list entries 1208.

Read List Entries Count (RLEC): Specifies the number of list entries 1208 read.

Read List Type (RLT): Indicates what values are read upon normal completion of the command execution. The first bit is a control indicator (CI) that indicates whether list entry controls are read, the second is a data indicator (DI) that indicates whether data list entries are read, and the third is an adjunct indicator (AI) that indicates whether adjunct list entries are read.

Restart Token (RT): Controls the reading or deleting of list entries on the read list set and delete list set commands.

Retry Index (RX): Designates a retry buffer.

Retry Version Number (RVN): Specifies the version number stored in the retry buffer.

Secondary Key Comparison Type (SKCT): Indicates whether secondary key comparison is requested.

Secondary Key Request Type (SKRT): A value that indicates how a list entry 1208 is located when the entry locator type indicates location by keyed position, the entry locator key type is secondary and an entry is replaced, moved, read or deleted. When the secondary key comparison type operand is active, the secondary key request type operand also specifies how secondary keys are compared.

The SKRT operand is a dual purpose operand. When SKCT is active, the SKRT operand is used to control the type of secondary list entry key comparison to be performed on a command. When the SKCT is inactive, no secondary list entry key comparison is performed. When ELT designates that an entry is located by keyed position, and the ELKT operand is secondary, the SKRT operand is used to control the type of entry location performed. When the ELT designates an entry location by a means other than keyed position, or the ELKT operand is primary, the SKRT has no effect on entry location.

The secondary key request type determines the relationship between the secondary list entry key object and the secondary list entry key operand. It may indicate a comparison for (1) equal to the secondary list entry key operand, (2) less than or equal to the secondary list entry key operand, (3) greater than or equal to the secondary list entry key operand, or (4) within the range of the secondary list entry key to the maximum secondary list entry key operands, inclusive.

For the delete list entry, move and read list entry, move list entry, read and delete list entry, read list entry, write and move list entry, and write list entry commands the value "within the range" is invalid. For the delete list entries, delete list set, read list set, read list, delete list, and move list entries commands the value "within the range" specifies that the secondary keyed list entry satisfies the search criterion or the secondary key comparison criterion if it is within the range of the secondary list entry key to the maximum secondary list entry key operands, inclusive.

The secondary key request type operand is ignored unless an entry is replaced, moved, read or deleted, and (1) the secondary key comparison type is active, or (2) the entry locator type is locate by keyed position and the entry locator key type is secondary.

Secondary List Entry Key (SLEK): Partially specifies a list entry position by secondary key or an event monitor controls object 1306.

Secondary Move Entry Locator Type (SMELT): Specifies which key value the target secondary key is set to when a move list entries command is executed. When inactive it indicates do not change the SLEK; when active it indicates set to TSLEK in the move block.

Secondary Target Direction (STDIR): Indicates how the positions of the list entries 1208 are numbered relative to a designated target position in secondary key order for an entry moved by a move and read list entry, move list entries, move list entry, or write and move list entry command, or created by a write and move list entry or write list entry command.

Starting Data Index (SDX): Indexes to the first list entry name or list entry identifier in the data block 1006 for the delete list entries command.

Starting Event Index (STX): Indexes to the first event in the data block 1006 for the register event monitors command.

Structure Authority (SAU): A value that is conditionally updated.

Suppress List Count Comparison Control (SLCCC): When active, suppresses the comparison of the list entry count and the list element count with the list entry and list element count limit when a list entry 1208 is written or moved.

Target Direction (TDIR): Indicates how the positions of the list entries 1208 are numbered relative to a designated target position for a moved list entry 1208.

Target List Entry Key (TLEK): Partially specifies the targeted position, in primary key order, to which a list entry 1208 is moved.

Target List Number (TLN): Designates the list 1106 to which a list entry is moved.

Target Secondary List Entry Key (TSLEK): Partially specifies the targeted position, in secondary key order, to which a list entry 1208 is moved by a move list entries command.

User Identifier (UID): An integer that identifies a user. When the lock request type specifies global lock manager and local lock managers replacement, the user identifier specifies a global lock manager. When the lock request type specifies global lock manager replacement, the user identifier specifies a global lock manager and, when local lock managers exist, it also specifies a local lock manager. When the lock request type specifies local lock manager replacement or local lock manager comparison, the user identifier specifies a local lock manager.

The UID must be assigned for a register event monitors command or register list monitor command when the attachment override control is active, the UID must be attached for a register event monitors command or register list monitor command when the attachment override control is zero, and must be attached for all other commands.

User List Control (ULC): A field per list 1106 defined by the user.

User Notification Control (UNC): A field per event monitor controls 1306 defined by the user.

User Structure Control (USC): A field per structure defined by the user.

Write event queue transition count (WEQTC): Controls if the EQTC object is written by the RLM command. When the WEQTC bit has a value of active and the monitor request type specifies register event queue monitor, the EQTC object is written. Otherwise, the EQTC object is not written.

Write Request Type (WRT): Indicates the type of write request. It may indicate (I) replace a list entry, (2) create a list entry, or (3) replace or create a list entry.

Write Result (WRES): A value that indicates whether a write completed by creating a new list entry 1208 or replacing an existing list entry 1208.

List Commands

Delete List (DL)

Conditionally deletes all entries on a specified list 1106 that match the criteria of the version number comparison and/or key comparison requests starting from a designated position. Processing continues until the end of the list 1106 is reached or a designated time period has elapsed.

Description: When requested, the list authorities, the list numbers, global lock managers, local lock managers, or any combination, are compared before the first list entry 1208 is scanned. The list entries 1208 are scanned starting at the designated position and proceeding in the direction specified until a model dependent time period elapses or the last list entry 1208 is scanned. Each list entry 1208 is located and, when requested, the version numbers are compared, or the keys are compared, or any combination of the preceding processes is performed. In order for any list entries 1208 to be deleted, 1) the list authority comparison, 2) the list number comparison, and 3) the global lock manager or local lock manager comparison, when requested, must succeed. In order for a particular list entry 1208 to be deleted, the version number comparison and key comparison, when requested, must succeed.

When the list structure 902 supports secondary keys, the list order that is followed by the scan process is determined by the list scan key type operand. When the list scan key type is primary, the scan follows primary key order. When the list scan key type is secondary, the scan follows secondary key order.

When a list entry 1208 is deleted and a monitored list state transition results, the list monitors are notified. The generated list notification commands are secondary processes.

When a list entry 1208 is deleted and a monitored subsidiary list state transition results, the associated event monitor controls objects 1306 are withdrawn. If this causes event queue transitions, the event queue monitors are notified. The withdrawal of the event monitor controls objects 1306 and the generated list notification commands are secondary processes.

When a list entry 1208 is deleted and a monitored key range state transition results, the key range monitors are notified. The generated list notification commands are secondary processes.

When the last list entry 1208 is scanned, the delete list entries count equaling the number of list entries 1208 deleted during the final redrive of the DL command and an appropriate response code are returned in the response operands 1014.

When a model dependent time period has elapsed, then the delete list entries count equaling the number of list entries 1208 deleted, the list entry controls 1210 of the next list entry 1208 in the sequence to be scanned, and an appropriate response code are returned in the response operands 1014.

When the list authority comparison, the global lock manager comparison, or the local lock manager comparison fails during the processing of a list entry 1208 other than the designated list entry 1208, then the delete list entries count equaling the number of list entries 1208 deleted, the list entry controls 1210 of the list entry 1208 that caused the mismatch and an appropriate response code are returned in the response operands 1014.

When the designated list entry 1208 exists but the requested version number comparison fails, the located entry is not deleted and command execution continues to process the next list entry 1208.

When the LRT operand indicates to compare the local lock managers and the local lock manager comparison fails during the processing of the designated list entry 1208, the lock table entry value and an appropriate response code are returned in the response operands 1014.

When the LRT operand indicates to compare the global lock managers and the global lock manager comparison fails during the processing of the designated list entry 1208, the lock table entry value and an appropriate response code are returned in the response operands 1014.

When the LRT operand indicates to compare the global lock or local lock managers, and both the global lock manager comparison and local lock manager comparison fail during the processing of the designated list entry 1208, the lock table entry value and an appropriate response code are returned in the response operands 1014.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When the list authority comparison fails during the processing of the designated list entry 1208, the list authority, the user list control, and an appropriate response code are returned in the response operands 1014.

When the designated list entry 1208 exists but the requested key comparison fails, the located entry is not deleted and command execution continues to process the next list entry 1208.

Delete List Entries (DLES)

Conditionally deletes a set of list entries 1208 specified in an input list 11106 that match the criteria of the version number comparison and/or key comparison requests. Processing continues until the end of the input list 1106 is reached or a designated time period has elapsed.

Description: The list entries 1208 within the list set 1104 are processed starting with the list entry 1208 specified by the starting data index and continuing in the order as specified in the data block 1006.

As part of processing each list entry 1208, the list authority comparison, and the global lock manager comparison or the local lock manager comparison, if requested, are performed before the entry is located. If any of these comparisons fails, command execution concludes with an appropriate response code. If all of these comparisons are successful, command execution proceeds.

The entry is then located. To determine if the located entry is to be deleted, the version number comparison, the list number comparison, the key comparison, and the secondary key comparison, if requested, are performed. If any of these comparisons fails, then the located entry is not deleted and command execution continues to process the next list entry 1208. In order for the located list entry 1208 to be deleted, all of these comparisons must succeed.

When the granular version number comparison flag is active, the VCRT, VRT, and CVN in the data block 1006 are used to do a version number comparison for each entry, the comparison values in the data block 1006 for the entry is used only for that list entry 1208. When the granular version number comparison flag is inactive, the VCRT, VRT, and CVN in the MCB is tested for the list entries 1208 to be deleted, the comparison values in the MCB are used for all list entries 1208.

When the halt on miscompare flag is active, the designated list entry 1208 exists but the requested version number comparison fails, then the processing stops, and the designated list entry controls and an appropriate response code are returned in the response operands 1014.

When the halt on miscompare flag is active, the designated list entry 1208 exists but the requested list number comparison fails, then the processing stops, and the designated list entry controls and an appropriate response code are returned in the response operands 1014.

When the halt on miscompare flag is active, the designated list entry 1208 exists but the requested key comparison fails, then the processing stops, and the designated list entry controls and an appropriate response code are returned in the response operands 1014.

When a list entry 1208 is deleted and a monitored list state transition results, the list monitors are notified. The generated list notification commands are secondary processes.

When a list entry 1208 is deleted and a monitored subsidiary list state transition results, the associated event monitor controls objects 1306 are withdrawn. If this causes event queue transitions, the event queue monitors are notified. The withdrawal of the event monitor controls objects 1306 and the generated list notification commands are secondary processes.

When a list entry 1208 is deleted and a monitored key range state transition results, the key range monitors are notified. The generated list notification commands are secondary processes.

When the last list entry 1208 specified by the ending data index is processed, the delete list entries count equaling the number of list entries 1208 deleted and an appropriate response code are returned in the response operands 1014.

When a model dependent time period has elapsed, the delete list entries count equaling the number of list entries 1208 deleted, the current data index of the next list entry 1208 to be processed, and an appropriate response code are returned in the response operands 1014. When the list authority comparison, the global lock manager comparison, or the local lock manager comparison fails during the processing of a list entry 1208 other than the one specified by the starting data index, the delete list entries count equaling the number of list entries 1208 deleted, the current data index of the entry that caused the mismatch, and an appropriate response code are returned in the response operands 1014.

When the LRT operand indicates to compare the local lock managers and the local lock manager comparison fails during the processing of the entry specified by the starting data index, the lock table entry value and an appropriate response code are returned in the response operands 1014.

When the LRT operand indicates to compare the global lock managers and the global lock manager comparison fails during the processing of the entry specified by the starting data index, the lock table entry value and an appropriate response code are returned in the response operands 1014.

When the LRT operand indicates to compare the global lock or local lock managers, and both the global lock manager comparison and local lock manager comparison fail during the processing of the entry specified by the starting data index, the lock table entry value and an appropriate response code are returned in the response operands 1014.

When the designated list entry 1208 does not exist, the delete list entries count equaling the number of list entries 1208 deleted, the current data index of the nonexistent list entry 1208, and an appropriate response code are returned in the response operands 1014.

When the list authority comparison fails during the processing of the entry specified by the starting data index, the list authority, the user list control, and an appropriate response code are returned in the response operands 1014.

Delete List Entry (DLE)

Conditionally deletes a specified list entry 1208 that matches the criteria of the version number comparison and/or key comparison requests.

Description: The list entry 1208 is located and, when requested, the list authorities are compared, the list numbers are compared, the version numbers are compared, the keys are compared, or the global lock managers are compared, or any combination of the preceding processes is performed. When the global lock managers are compared, the local lock managers may be compared. In order for a lock table entry 1112 to be written, all of these processes except for local lock manager comparison, when requested, must succeed. In order for the list authority to be replaced, all of these processes, when requested, must succeed. In order for a list cursor to be updated, all of these processes, when requested, must succeed. In order for a list entry 1208 to be deleted, all of these processes, when requested, must succeed.

When a list entry 1208 is deleted and a monitored list state transition results, the list monitors are notified. The generated list notification commands are secondary processes.

When a list entry 1208 is deleted and a monitored subsidiary list state transition results, the associated event monitor controls objects 1306 are withdrawn. If this causes event queue transitions, the event queue monitors are notified. The withdrawal of the event monitor controls objects 1306 and the generated list notification commands are secondary processes.

When a list entry 1208 is deleted and a monitored key range state transition results, the key range monitors are notified. The generated list notification commands are secondary processes.

When a list entry 1208 is deleted, the designated list entry controls, the list set entry count, the list set element count, the list entry count or list element count, and an appropriate response code are returned in the response operands 1014.

When a global lock manager is replaced and there are no other local lock managers, when a local lock manager is replaced with the opposite value, or when the global lock and the local lock managers are replaced, an response code is returned in the response operand 1014.

When the list authority comparison fails, the list authority, the user list control, and an appropriate response code are returned in the response operands 1014.

When a global lock manager is replaced and there are one or more other local lock managers, or when a local lock manager is replaced with the same value, then the lock table entry value and an appropriate response code are returned in the response operands 1014.

When global lock manager comparison fails, the lock table entry value and an appropriate response code are returned in the response operands 1014.

When the designated list entry 1208 exists but the requested version number comparison fails, the designated list entry controls 1210 and an appropriate response code are returned in the response operands 1014.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When the designated list entry 1208 exists but the requested key comparison fails, the designated list entry controls 1210 and an appropriate response code are returned in the response operands 1014.

Delete List Set (DLS)

Conditionally deletes all entries in the list structure 902 that match the criteria of the version number comparison and/or key comparison requests starting from a designated position specified by a restart token. Processing continues until all lists 11106 in the list structure 902 have been scanned, or a designated time period has elapsed.

Description: The list entries 1208 within the list set 1104 are processed starting at the entry specified by the restart token until a model dependent time period elapses or the last list entry 1208 is processed, or until an unsuccessful list authority comparison, global lock manager comparison, or local lock manager comparison occurs. A zero restart token specifies that processing starts at the beginning of the list set 1104, and a nonzero token designates the entry for restarting the processing.

As part of processing each list entry 1208, the list authority comparison, and the global lock manager comparison or the local lock manager comparison, if requested, are performed before the entry is located. If any of these comparisons fails, command execution concludes with an appropriate response code. If all of these comparisons are successful, command execution proceeds.

The entry is then located. To determine if the located entry is to be deleted, the version number comparison, the list number comparison, or the key comparison, or the secondary key comparison, if requested, are performed. If any of these comparisons fails, then the located entry is not deleted and command execution continues to process the next list entry 1208. In order for the located list entry 1208 to be deleted, all of these comparisons must succeed.

When a list entry 1208 is deleted and a monitored list state transition results, the list monitors are notified. The generated list notification commands are secondary processes.

When a list entry 1208 is deleted and a monitored subsidiary list state transition results, the associated event monitor controls objects 1306 are withdrawn. If this causes event queue transitions, the event queue monitors are notified. The withdrawal of the event monitor controls objects 1306 and the generated list notification commands are secondary processes.

When a list entry 1208 is deleted and a monitored key range state transition results, the key range monitors are notified. The generated list notification commands are secondary processes.

When the last list entry 1208 is scanned, the delete list entries count equaling the number of list entries 1208 deleted and an appropriate response code are returned in the response operands 1014.

When a model dependent time period has elapsed, the delete list entries count equaling the number of list entries 1208 deleted, the restart token designating the next list entry 1208 to be processed, and an appropriate response code are returned in the response operands 1014.

When the list authority comparison, the global lock manager comparison, or the local lock manager comparison fails during the processing of a list entry 1208 other than the one specified by the restart token, the delete list entries count equaling the number of list entries 1208 deleted, the restart token designating the list entry 1208 that caused the mismatch, and an appropriate response code are returned in the response operands 1014.

When the restart token operand is invalid, an appropriate response code is returned in the response operand 1014.

When the LRT operand indicates to compare the local lock managers ad the local lock manager comparison fails during the processing of the entry specified by the restart token, the lock table entry value and an appropriate response code are returned in the response operands 1014.

When the LRT operand indicates to compare the global lock managers and the global lock manager comparison fails during the processing of the entry specified by the restart token, the lock table entry value and an appropriate response code are returned in the response operands 1014.

When the LRT operand indicates to compare the global lock or local lock managers, and both the global lock manager comparison and local lock manager comparison fail during the processing of the entry specified by the restart token, the lock table entry value and an appropriate response code are returned in the response operands 1014.

When the list authority comparison fails during the processing of the entry specified by the restart token, the list authority, the user list control, and an appropriate response code are returned in the response operands 1014.

Dequeue Event Monitor Controls (DEMC)

Dequeues event monitor controls 1306 for a specified user from the event queue 1116 for a model dependent time period.

Description: The event monitor controls objects 1306 are dequeued from the event queue 1116 associated with the specified user and of the specified key type starting at the leftmost position and proceeding to the right until the model dependent time period elapses, the data area is filled, or the last event monitor controls object 1306 is dequeued.

The returned event monitor queued indicators are always active.

When an event monitor controls object 1306 is dequeued and an event queue state transition results, the event queue monitor is notified.

The dequeue of the event monitor controls objects 1306 and the generated list notification commands are primary processes.

When the last event monitor controls object 1306 is dequeued, the event monitor controls queued count is set to zero, the event monitor controls dequeued count is set to the number of event monitor controls objects 1306 dequeued and returned, and an appropriate response code are returned in the response operands 1014.

When the data area is filled or a model dependent time period has elapsed, the event monitor controls queued count is set to the number of event monitor controls objects 1306 still queued, the event monitor controls dequeued count is set to the number of event monitor controls objects 1306 dequeued and returned, the dequeued event monitor controls, and an appropriate response code are returned in the response operands 1014.

When the list structure 902 does not support keyed entries, the list structure type object is invalid and a request exception is recognized.

Deregister List Monitor (DLM)

Deregisters the specified list monitor.

Description: The deregister list monitor command deregisters the designated monitor. When an event monitor is deregistered, the designated event monitor controls object 1306 is deleted. If this causes an event queue transition, the event queue monitor is notified. The deletion of the event monitor controls object 1306 and the generated list notification commands are primary processes.

When the monitor is deregistered, an appropriate response code is returned in the response operand 1014.

Move and Read List Entry (MRLE)

Reads a specified list entry 1208 that matches the input criteria and moves the entry to a target position.

Description: The list entry 1208 and the designated target position are located, the list entry counts or list element counts are compared, and, when requested, the list numbers are compared, the version numbers are compared, the list authorities are compared, the assignment key is updated, the keys are compared or the global lock managers are compared, or any combination of the preceding processes is performed. When the global lock managers are compared, the local lock managers may be compared. In order for a lock table entry 1112 to be written, all of these processes except for local lock manager comparison, when requested, must succeed. In order for the list authority to be replaced, all of these processes, when requested, must succeed. In order for the list cursor, version number, or assignment key to be updated, or any combination thereof, all of these processes, when requested, must succeed. In order for a list entry 1208 to be moved and read, these processes, when requested, must succeed.

When a list entry 1208 is moved and monitored list state transitions result, the list monitors are notified. The generated list notification commands are secondary processes.

When a list entry 1208 is moved and monitored subsidiary list state transitions result, the associated event monitor controls objects 1306 are withdrawn, queued, or both. If this causes event queue transitions, the event queue monitors are notified. The withdrawal or queueing of the event monitor controls objects 1306 and the generated list notification commands are secondary processes.

When a list entry 1208 is moved and monitored key range state transitions result, the key range monitors are notified. The generated list notification commands are secondary processes.

When a list entry 1208 is moved, the designated list entry controls, the list set entry count, the list set element count, the target list entry count or list element count, and an appropriate response code are returned in the response operands 1014.

When a global lock manager is replaced and there are no other local lock managers, when a local lock manager is replaced with the opposite value, or when the global lock and the local lock managers are replaced, an appropriate response code is returned in the response operand 1014.

When the list authority comparison fails, the list authority, the user list control, and an appropriate response code are returned in the response operands 1014.

When a global lock manager is replaced and there are one or more other local lock managers, or when a local lock manager is replaced with the same value, then the lock table entry value and an appropriate response code are returned in the response operands 1014.

When global lock manager comparison fails, the lock table entry value and an appropriate response code are returned in the response operands 1014.

When the designated list entry 1208 exists but the requested version number comparison fails, the designated list entry controls 1210 and an appropriate response code are returned in the response operands 1014.

When the list entry count matches or exceeds the list entry count limit or the list element count matches or exceeds the list element count limit, an appropriate response code is returned in the response operand 1014.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When updating the assignment key fails, an appropriate response code is returned in the response operand 1014.

When the designated list entry 1208 exists but the requested key comparison fails, the designated list entry controls 1210 and an appropriate response code 12 are returned in the response operands 1014.

Move List Entries (MLES)

Moves a set of list entries 1208 between source and target positions based on criteria in a set of move blocks.

| Move Condition | SMELT | GVNC | MELT |
|---|---|---|---|
| Condition 1 | Inactive | Inactive | B'0' or AKRT presides over MELT |
| Condition 2 | Inactive | Active | any value |
| Condition 3 | Inactive | any value | B'1' and AKRT does not preside |
| Condition 4 | Inactive | any value | any value |

Notes:
1. SMELT is the secondary move entry locator type
2. GVNC is the granular version number control
3. MELT is the move entry locator type
4. AKRT is the assignment key request type Description: When requested, the list authorities, the global lock managers, local lock managers, or any combination, are compared before the first list entry 1208 is processed. The list entries 1208 within the list set 1104 are processed starting with the list entry 1208 specified by the starting data index and continuing in the order as specified in the data block 1006. Each list entry 1208 is located and, when requested, the version numbers are compared, the list numbers are compared, or the keys are compared, or any combination of the preceding processes is performed. In order for any list entries 1208 to be moved, the list authority comparison, and the global lock manager or local lock manager comparison, when requested, must succeed. In order for a particular list entry 1208 to be moved, the version number comparison, list number comparison, and key comparison, when requested, must succeed.

When the granular version number comparison flag is active, the VCRT, VRT, and CVN in the data block 1006 is used to do a version number comparison for each entry, the comparison values in the data block 1006 for the entry is used only for that list entry 1208. When the granular version number comparison flag is active, the VN in the data block 1006 is used when the version number is replaced. When the granular version number comparison flag is inactive, the VCRT, VRT, and CVN in the MCB is tested for the list entries 1208 to be moved, and the comparison values in the MCB are used for all list entries 1208.

If the halt on miscompare flag is active, the designated list entry 1208 exists but the requested version number comparison fails, the processing is stopped, the move list entries count equaling the number of list entries 1208 moved, the current data index, list entry keys if the structure is keyed and keys are assigned to the entries using assignment keys, for entries between SDX and CDX minus one, the designated list entry controls 1210 and an appropriate response code are returned in the response operands 1014.

If the halt on miscompare flag is active, the designated list entry 1208 exists but the requested list number comparison fails, the processing is stopped, the move list entries count equaling the number of list entries 1208 moved, the current data index, list entry keys if the structure is keyed and keys are assigned to the entries using assignment keys, for entries between SDX and CDX minus one, the designated list entry controls 1210 and an appropriate response code are returned in the response operands 1014.

If the halt on miscompare flag is active, the designated list entry 1208 exists but the requested key comparison fails, the processing is stopped, the move list entries count equaling the number of list entries 1208 moved, the current data index, list entry keys if keys are assigned to the entries using assignment keys, for entries between SDX and CDX minus one, the designated list entry controls 1210 and an appropriate response code are returned in the response operands 1014. When an entry is moved, the TLN value in the data block 1006 is used as the target list number to which the entry is moved. If the structure is keyed, the LEK of the list entry 1208 being moved, the TLEK in the data block 1006, or the assignment key value are used as the primary key value in the target entry based on the MELT value and the AKRT value. When an entry is moved, the TDIR in the data block 1006 is used as the direction for the entry to be placed in the target list 1106 in primary key order. If the structure supports secondary keys, the SLEK of the list entry 1208 being moved and the TSLEK in the data block 1006 are used as the secondary key value in the target entry based on the SMELT value. When an entry is moved, the STDIR in the data block 1106 is used as the direction for the entry to be placed in the target list 1106 in secondary key order.

If the structure is keyed, list entry key values are returned in the MRB when assignment keys are assigned. Otherwise, the list entry key values in the MRB are reserved and have a value of zeros.

When a list entry 1208 is moved and a monitored list state transition results, the list monitors are notified. The generated list notification commands are secondary processes.

When a list entry 1208 is moved and a monitored subsidiary list state transition results for either the source location or the target location, the associated event monitor controls objects 1306 may be withdrawn or the event monitor controls objects 1306 notified that a monitored event has occurred. If this causes event queue transitions, the event queue monitors are notified. The withdrawal or notification of the event monitor controls objects 1306 and the generated list notification commands are secondary processes.

When a list entry 1208 is moved and monitored key range state transitions results, the key range monitors are notified. The generated list notification commands are secondary processes.

When the last list entry 1208 specified by the ending data index is processed the move list entries count, MLEC, equaling the number of list entries 1208 moved, list entry keys if the structure is keyed and keys are assigned to the entries using assignment keys, and an appropriate response code are returned in the response operands 1014.

When a model dependent time period has elapsed or the LEK field in the MRB is full, the move list entries count equaling the number of list entries 1208 moved, the current data index of the next list entry 1208 to be processed, list entry keys if the structure is keyed and keys are assigned to the entries using assignment keys, for entries between SDX and CDX minus one, and an appropriate response code are returned in the response operands 1014.

When the list authority comparison, the global lock manager comparison, or the local lock manager comparison fails during the processing of a list entry 1208 other than the one specified by the starting data index, the move list entries count equaling the number of list entries 1208 moved, the current data index of the entry that caused the mismatch, list entry keys if the structure is keyed and keys are assigned to the entries using assignment keys, for entries between SDX and CDX minus one, and an appropriate response code are returned in the response operands 1014.

When the LRT operand indicates to compare the local lock managers and the local lock manager comparison fails during the processing of the entry specified by the starting data index, the lock table entry value and an appropriate response code are returned in the response operands 1014.

When the LRT operand indicates to compare the global lock managers and the global lock manager comparison fails during the processing of the entry specified by the starting data index, the lock table entry value and an appropriate response code are returned in the response operands 1014.

When the LRT operand indicates to compare the global lock or local lock managers, and both the global lock manager comparison and local lock manager comparison fail during the processing of the entry specified by the starting data index, the lock table entry value and an appropriate response code are returned in the response operands 1014.

When an invalid target list number is specified, the processing is stopped, the move list entries count equaling the number of list entries 1208 moved, the current data index, list entry keys if the structure is keyed and keys are assigned to the entries using assignment keys, for entries between SDX and CDX minus one, and an appropriate response code are returned in the response operands 1014.

When the designated list entry 1208 does not exist, then the move list entries count equaling the number of list entries 1208 moved, the current data index, list entry keys if the structure is keyed and keys are assigned to the entries using assignment keys, for entries between SDX and CDX minus one, and an appropriate response code are returned in the response operands 1014.

When the list authority comparison fails during the processing of the entry specified by the starting data index, the list authority, the user list control, and an appropriate response code are returned in the response operands 1014.

When updating the assignment key fails, then the move list entries count equaling the number of list entries 1208 moved, the current data index, list entry keys for entries between SDX and CDX minus one, the assignment key, the assignment key threshold, and an appropriate response code is returned in the response operand 1014.

When the list entry count matches or exceeds the list entry count limit, or the list element count matches or exceeds the list element count limit, then the move list entries count equaling the number of list entries 1208 moved, the current data index, list entry keys if the structure is keyed and keys are assigned to the entries using assignment keys, for entries between SDX and CDX minus one, and an appropriate response code is returned in the response operand 1014.

Move List Entry (MLE)

Moves a specified list entry 1208 that matches the input criteria to a target position.

Description: The list entry 1208 and the designated target position are located, the list entry counts or list element counts are compared, and, when requested, the list numbers are compared, the version numbers are compared, the list authorities are compared, the assignment key is updated, the keys are compared, or the global lock managers are compared, or any combination of the preceding processes is performed. When the global lock managers are compared, the local lock managers may be compared. In order for a lock table entry 1112 to be written, all of these processes except for local lock manager comparison, when requested, must succeed. In order for the list authority to be replaced, all of these processes, when requested, must succeed. In order for the list cursor, version number, or assignment key to be updated, or any combination thereof, all of these processes, when requested, must succeed. In order for a list entry 1208 to be moved, all of these processes, when requested, must succeed.

When a list entry 1208 is moved and monitored list state transitions result, the list monitors are notified. The generated list notification commands are secondary processes.

When a list entry 1208 is moved and monitored subsidiary list state transitions result, the associated event monitor controls objects 1306 are withdrawn, queued, or both. If this causes event queue transitions, the event queue monitors are notified. The withdrawal or queueing of the event monitor controls objects 1306 and the generated list notification commands are secondary processes.

When a list entry 1208 is moved and monitored key range state transitions result, the key range monitors are notified. The generated list notification commands are secondary processes.

When a list entry 1208 is moved, the designated list entry controls, the list set entry count, the list set element count, the target list entry count or list element count, and an appropriate response code are returned in the response operands 1014.

When a global lock manager is replaced and there are no other local lock managers, when a local lock manager is replaced with the opposite value, or when the global lock and the local lock managers are replaced, an appropriate response code is returned in the response operand 1014.

When the list authority comparison fails, the list authority, the user list control, and an appropriate response code are returned in the response operands 1014.

When a global lock manager is replaced and there are one or more other local lock managers, or when a local lock manager is replaced with the same value, then the lock table entry value and an appropriate response code are returned in the response operands 1014.

When global lock manager comparison fails, the lock table entry value and an appropriate response code are returned in the response operands 1014.

When the designated list entry 1208 exists but the requested version number comparison fails, the designated list entry controls 1210 and an appropriate response code are returned in the response operands 1014.

When the list entry count matches or exceeds the list entry count limit, or the list element count matches or exceeds the list element count limit, an appropriate response code is returned in the response operand 1014.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When updating the assignment key fails, an appropriate response code is returned in the response operand 1014.

When the designated list entry 1208 exists but the requested key comparison fails, the designated list entry controls 1210 and an appropriate response code are returned in the response operands 1014.

Read and Delete List Entry (RDLE)

Reads and deletes a specified list entry 1208 that matches the input criteria.

Description: The list entry 1208 is located and, when requested, the list authorities are compared, the list number is compared, the version numbers are compared, the keys are compared, or the global lock managers are compared, or any combination of the preceding processes is performed. When the global lock managers are compared, the local lock managers may be compared. In order for a lock table entry 1112 to be written, all of these processes except for local lock manager comparison, when requested, must succeed. In order for the list authority to be replaced, all of these processes, when requested, must succeed. In order for a list cursor to be updated, all of these processes, when requested, must succeed. In order for a list entry 1208 to be read and deleted, all of these processes, when requested, must succeed.

When a list entry 1208 is deleted and a monitored list state transition results, the list monitors are notified. The generated list notification commands are secondary processes.

When a list entry 1208 is deleted and a monitored subsidiary list state transition results, the associated event monitor controls objects 1306 are withdrawn. If this causes event queue transitions, the event queue monitors are notified. The withdrawal of the event monitor controls objects 1306 and the generated list notification commands are secondary processes.

When a list entry 1208 is deleted and a monitored key range state transition results, the key range monitors are notified. The generated list notification commands are secondary processes.

When a list entry 1208 is read and deleted, the designated list entry controls, the list set entry count the list set element count, the list entry count or list element count, and an appropriate response code are return ed in the response operands 1014.

When a global lock manager is replaced and there are no other local lock managers, when a local lock manager is replaced with the opposite value, or when the global lock and the local lock managers are replaced, an appropriate response code is returned in the response operand 1014.

When the list authority comparison fails, the list authority, the user list control, and an appropriate response code are returned in the response operands 1014.

When a global lock manager is replaced and there are one or more other local lock managers, or when a local lock manager is replaced with the same value, then the lock table entry value and an appropriate response code are returned in the response operands 1014.

When global lock manager comparison fails, the lock table entry value and an appropriate response code are returned in the response operands 1014.

When the designated list entry 1208 exists but the requested version number comparison fails, the designated list entry controls 1210 and an appropriate response code are returned in the response operands 1014.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When the designated list entry 1208 exists but the requested key comparison fails, the designated list entry controls 1210 and an appropriate response code are returned in the response operands 1014.

Read List Entry (RLE)

Reads a specified list entry 1208 that matches the input criteria.

Description: The list entry 1208 is located and, when requested, the list authorities are compared, the list numbers are compared, the version numbers are compared, the keys are compared, or the global lock managers are compared, or any combination of the preceding processes is performed. When the global lock managers are compared, the local lock managers may be compared. In order for a lock table entry 1112 to be written, all of these processes except for local lock manager comparison, when requested, must succeed. In order for the list authority to be replaced, all of these processes, when requested, must succeed. In order for a list cursor or version number to be updated, or any combination thereof, all of these processes, when requested, must succeed. In order for a list entry 1208 to be read, all of these processes, when requested, must succeed.

When a list entry 1208 is read, the designated list entry controls, the list set entry count, the list set element count, the list entry count or list element count, and an appropriate response code are returned in the response operands 1014.

When a global lock manager is replaced and there are no other local lock managers, when a local lock manager is replaced with the opposite value, or when the global lock and the local lock managers are replaced, an appropriate response code is returned in the response operand 1014.

When the list authority comparison fails, the list authority, the user list control, and an appropriate response code are returned in the response operands 1014.

When a global lock manager is replaced and there are one or more other local lock managers, or when a local lock manager is replaced with the same value, then the lock table entry value and an appropriate response code are returned in the response operands 1014.

When global lock manager comparison fails, the lock table entry value and an appropriate response code are returned in the response operands 1014.

When the designated list entry 1208 exists but the requested version number comparison fails, the designated list entry controls and an appropriate response code are returned in the response operands 1014.

When the designated list entry 1208 exists but the requested list number comparison fails, the designated list entry controls and an appropriate response code are returned in the response operands 1014.

When the designated list entry 1208 does not exist, an appropriate response code is returned in the response operand 1014.

When the designated list entry 1208 exists but the requested key comparison fails, the designated list entry controls and an appropriate response code are returned in the response operands 1014.

Read Event Monitor Controls (REMC)

Reads the event monitor controls 1306 for a specified user and subsidiary list.

Description: The event monitor controls of the specified key type and an appropriate response code are returned in the response operands 1014.

When the specified event monitor controls 1306 do not exist, an appropriate response code is returned in the response operand 1014.

When the list structure 902 does not support keyed entries and the key type is primary, or the list structure 902 does not support secondary keys and the key type is secondary, the list structure type object is invalid and a request exception is recognized.

Read Event Monitor Controls List (REMCL)

Reads a range of event monitor controls 1306 into a data block 1106 for a model dependent time interval.

Description: The event monitor controls 1306 of the specified key type with list numbers within the range of values starting at the starting list number up to and including the ending list number are read. The event monitor controls 1306 within the list set 1104 are scanned starting with the starting list number or the EMC restart token until a model dependent time period elapses, the data block 1106 is full of event monitor controls 1306, or the last event monitor control 1306 is scanned. A zero restart token causes the entire list 1106 to be processed starting at the starting list number operand. A valid nonzero EMC restart token starts the processing at the event monitor control object 1306 designated by the EMC restart token.

The EMCs are scanned starting with the starting list number, then in ascending order by LN up to the ending list number. The EMCs in a list number are scanned in an unpredictable ordering for keys, and an unpredictable ordering for UIDs within a key value.

When the last EMC within the list number range is processed, the EMC processed count and an appropriate response code are returned.

When the command times out or the data block 1006 is full, the EMC processed count, EMC restart token, and an appropriate response code is returned.

When the EMC restart token operand is invalid, an appropriate response code is returned in the response code operand.

When the product of the value of the DBS operand and 4096 is larger than the message buffer size, there is insufficient message buffer space to contain the data block 1006. In this case, the command is completed and an appropriate response code is returned.

When the list structure 902 does not support keyed entries and the key type is primary, or the list structure 902 does not support secondary keys and the key type is secondary, the list structure type object is invalid and a request exception is recognized.

Read Event Queue Controls (REQC)

Reads the event queue 1116 controls for a specified user and key type.

Description: The event queue controls of the specified key type and an appropriate response code returned in the response operands 1014.

When the list structure 902 does not support keyed entries and the key type is primary, or the list structure 902 does not support secondary keys and the key type is secondary, the list structure type object is invalid and a request exception is recognized.

Read List (RL)

Reads the list entry controls 1210, adjunct list entry 1216, and data list entry 1212 for each list entry 1208 in a specified list 1106 that matches the input criteria for a model dependent time interval.

Description: The list entries 1208 are processed starting at the designated position and proceeding in the direction specified until a model dependent time period elapses, the data area is filled, or the last list entry 1208 is processed, or until an unsuccessful list authority comparison, global lock manager comparison, or local lock manager comparison occurs.

The size of the message buffer is compared to the data block size before the designated list entry 1208 is processed. When requested, the list number comparison is performed as part of processing the designated list entry 1208. If any of these comparisons fails, command execution concludes with an appropriate response code. If all of these comparisons are successful, command execution proceeds.

As part of processing each list entry 1208, the list authority comparison, and the global lock manager comparison or the local lock manager comparison, if requested, are performed before the entry is located. If any of these comparisons fails, command execution concludes with an appropriate response code. If all of these comparisons are successful, command execution proceeds.

When the list structure 902 supports secondary keys, the list order that is followed by the scan process is determined by the list scan key type operand. When the list scan key type is primary, the scan follows primary key order. When the list scan key type is secondary, the scan follows secondary key order.

The entry is then located. To determine if the located entry or list entry controls 1210 is to be read, the version number comparison and key comparison, if requested, and the list entry key comparison, if requested, are performed. If any of these comparisons fails, then the located entry or list entry controls 1210 is not read and command execution continues to process the next list entry 1208. In order for the located list entry 1208 or list entry controls 1210 to be read, all of these comparisons must succeed.

The list entry controls 1210 and adjunct list entry 1216 for the first list entry 1208 that is read by the command execution are placed in the message response block 1004. The data list entry 1212 for the first list entry 1208 that is read, and all subsequent list entry controls 1210, adjunct list entries 1216 and data list entries that are read are placed in the data block 1006.

When the last list entry 1208 is scanned, the read list entries count equaling the number of data or adjunct list entries or list entry controls 1210 stored and an appropriate response code are returned in the response operands 1014.

When a model dependent time period has elapsed, then the read list entries count equaling the number of data or adjunct list entries or list entry controls 1210 stored in the message response block 1004 and data block 1006, the list entry controls 1210 of the next list entry 1208 in the sequence to be scanned and an appropriate response code are returned in the response operands 1014. When the list authority comparison, the global lock manager comparison, or the local lock manager comparison fails during the processing of a list entry 1208 other than the designated list entry 1208, then the read list entries count equaling the number of data or adjunct list entries or list entry controls 1210 stored in the message response block 1004 and data block 1006, the list entry controls 1210 of the list entry 1208 that caused the mismatch and an appropriate response code are returned in the response operands 1014.

When the specified data block size is not large enough to contain the information specified by the read list type for at least one list entry 1208, an appropriate response code is returned in the response operand 1014.

When the data block 1006 does not have enough space for the next entry, then the read list entries count equaling the number of data or adjunct list entries or list entry controls 1210 stored in the message response block 1004 and data block 1006, the list entry controls 1210 of the next list entry 1208 in the sequence to be scanned and an appropriate response code are returned in the response operands 1014. When the LRT operand indicates to compare the local lock managers and the local lock manager comparison fails during the processing of the designated list entry 1208, the lock table entry value and an appropriate response code are returned in the response operands 1014.

When the LRT operand indicates to compare the global lock managers and the global lock manager comparison fails during the processing of the designated list entry 1208, the lock table entry value and an appropriate response code are returned in the response operands 1014.

When the LRT operand indicates to compare the global lock or local lock managers, and both the global lock manager comparison and local lock manager comparison fail during the processing of the designated list entry 1208, the lock table entry value and an appropriate response code are returned in the response operands 1014.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When the list authority comparison fails during the processing of the designated list entry 1208, the list authority, the user list control, and an appropriate response code are returned in the response operands 1014.

When the designated list entry 1208 exists but the requested key comparison fails, the located entry is not deleted and command execution continues to process the next list entry 1208.

Read List Set (RLS)

Reads the list entry controls 1210, adjunct list entry 1216, and data list entry 1212 for each list entry 1208 in a list structure 902 that matches the input criteria for a model dependent time interval.

Description: The list entries 1208 within the list set 1104 are processed starting at the entry specified by the restart token until a model dependent time period elapses, the data area is filled, or the last list entry 1208 is processed, or until an unsuccessful list authority comparison, global lock manager comparison, or local lock manager comparison occurs. A zero restart token specifies that processing starts at the beginning of the list set 1104, and a nonzero token designates the entry for restarting the processing.

As part of processing each list entry 1208, the list authority comparison, and the global lock manager comparison or the local lock manager comparison, if requested, are performed before the entry is located. If any of these comparisons fails, command execution concludes with an appropriate response code. If all of these comparisons are successful, command execution proceeds.

The entry is then located. To determine if the located entry or list entry controls 1210 is to be read, the version number comparison, the list number comparison, and the key comparison, if requested, are performed. If any of these comparisons fails, then the located entry or list entry controls 1210 is not read and command execution continues to process the next list entry 1208. In order for the located list entry 1208 or list entry controls 1210 to be read, all of these comparisons must succeed.

The list entry controls 1210 and adjunct list entry 1216 for the first list entry 1208 that is read by the command execution are placed in the message response block 1004. The data list entry 1212 for the first list entry 1208 that is read and all subsequent list entry controls 1210, adjunct list entries 1216 and data list entries that are read are placed in the data block 1006.

When the last list entry 1208 is processed, the read list entries count equaling the number of data or adjunct list entries or list entry controls 1210 stored and an appropriate response code are returned in the response operands 1014.

When a model dependent time period has elapsed, then the read list entries count equaling the number of data or adjunct list entries or list entry controls 1210 stored in the message response block 1004 and data block 1006, the restart token designating the next list entry 1208 to be processed, and an appropriate response code are returned in the response operands 1014.

When the list authority comparison, the global lock manager comparison, or the local lock manager comparison fails during the processing of a list entry 1208 other than the one specified by the restart token, then the read list entries count equaling the number of data or adjunct list entries or list entry controls 1210 stored in the message response block 1004 and data block 1006, the restart token designating the list entry 1208 that caused the mismatch, and an appropriate response code are returned in the response operands 1014.

When the specified data block size is not large enough to contain the information specified by the read list type for at least one list entry 1208, an appropriate response code is returned in the response operand.

When the restart token is invalid, an appropriate response code is returned in the response operand.

When the data block 1006 does not have enough space for the next entry, then the read list entries count equaling the number of data or adjunct list entries or list entry controls 1210 stored in the message response block 1004 and data block 1006, the restart token, and an appropriate response code are returned in the response operands 1014.

When the LRT operand indicates to compare the local lock managers and the local lock manager comparison fails during the processing of the entry specified by the restart token, the lock table entry value and an appropriate response code are returned in the response operands 1014.

When the LRT operand indicates to compare the global lock managers and the global lock manager comparison fails during the processing of the entry specified by the restart token, the lock table entry value and an appropriate response code are returned in the response operands 1014.

When the LRT operand indicates to compare the global lock or local lock managers, and both the global lock manager comparison and local lock manager comparison fail during the processing of the entry specified by the restart token, the lock table entry value and an appropriate response code are returned in the response operands 1014.

When the list authority comparison fails during the processing of the entry specified by the restart token, the list authority, the user list control, and an appropriate response code are returned in the response operands 1014.

Register Event Monitors (REMS)

Registers a set of event monitors based on an input list of event monitor controls 1306 for a model dependent time interval.

Description: The registration requests are processed starting with the event monitor controls object 1306 specified by the user identifier and starting event index and continuing in the order as specified in the data block 1006. Each requested event monitor is registered. The user identifier that processes the event monitor control object 1306 is either the UID in the MCB if the UID location bit is B'0' or the user identifier in the event monitor control operand from the data block 1006 if the UID location bit is B'1'.

If (1) the halt register event monitors bit is active, (2) the UID location is one, (3) the attachment override control bit is active, and (4) the user identifier is not assigned or (1) the halt register event monitors bit is active, (2) the UID location is one, (3) the attachment override control bit is inactive, and (4) the user identifier is not attached, or (1) the halt register event monitors bit is active, (2) the UID location is one, (3) the user identifier is attached, and (4) the list notification token is invalid, then the processing is stopped, the current event index of the EMC that failed, the event monitor controls count, the maximum event monitor controls count, the monitored object state vector, and an appropriate response code are returned in the response operands 1014.

When the attachment override control bit is active and the halt register event monitors bit is inactive, the EMC is skipped and processing continues if an EMC specifies a UID that is not assigned. When the attachment override control bit is inactive and the halt register event monitors bit is inactive, the EMC is skipped and processing continues if an EMC specifies a UID that is not attached.

The EMC is queued, not queued, withdrawn, or not withdrawn based on the INRT bit, EMQIC bit, and the EMQI bit.

When the initial notification request type operand is active, a withdrawal or queueing of the event monitor controls object 1306 associated with each request event monitor may be performed. If this causes an event queue transition, the event queue monitor is notified. The withdrawal or queueing process and the generated list notification commands are primary processes.

When the last event monitor specified by the ending event index is processed, the event monitor controls count, the maximum event monitor controls count, the monitored object state vector, and an appropriate response code are returned in the response operands 1014.

When a model dependent time period has elapsed, the current event index of the next event to be processed, the event monitor controls count, the maximum event monitor controls count, the monitored object state vector, and an appropriate response code are returned in the response operands 1014.

When event monitor registration requiring event monitor controls creation is requested and the event monitor controls object space is full, the current event index of the event currently being processed, the event monitor controls count, the maximum event monitor controls count, the monitored object state vector, and an appropriate response code are returned in the response operands 1014.

When the specified list structure user is attached with a zero list notification token and the UID locator bit is zero, an appropriate response code is returned in the response operand.

When the list number is invalid, the current event index of the event currently being processed, the event monitor controls count, the maximum event monitor controls count, the monitored object state vector, and an appropriate response code are returned in the response operand.

When the key type specified in the EMC is secondary and secondary keys are not supported in the structure, the current event index of the event currently being processed, the event monitor controls count, the maximum event monitor controls count, the monitored object state vector, and an appropriate response code are returned in the response operand.

When the list structure 902 does not support keyed entries, the list structure type object is invalid and a request exception is recognized.

Register List Monitor (RLM)

Registers a specified monitor: list, event queue, subsidiary list, or key range.

Description: The register list monitor command registers the designated monitor, as specified by the monitor request type and the key type.

When a list monitor is registered, the list entry count or the list element count, the monitored object state, and an appropriate response code are returned in the response operands 1014. If the initial notification request type operand is active, the list monitor is notified. The generated list notification commands are primary processes.

When an event queue monitor is registered, the event monitor controls queued count, the monitored object state, and an appropriate response code are returned in the response operands 1014. If the initial notification request type operand is active, the event queue monitor is notified. The generated list notification commands are primary processes.

When an event monitor is registered, the event monitor controls count, the maximum event monitor controls count, the monitored object state, and an appropriate response code are returned in the response operands 1014. If the initial notification request type operand is active, a withdrawal or queueing of the designated event monitor controls object 1306 may be performed. If this causes an event queue transition, the event queue monitor is notified. The withdrawal or queueing process and the generated list notification commands are primary processes.

When a key range monitor is registered, the list entry count or the list element count, the monitored object state, and an appropriate response code are returned in the response operands 1014. If the initial notification request type operand is active, the key range monitor is notified. The generated list notification commands are primary processes. When the write event queue transition count bit is active and the monitor register type specifies register event queue monitor, The event queue transition count object is written. Otherwise, the event queue transition count object is not written.

When the specified list structure user is attached with a zero list notification token, an appropriate response code is returned in the response operand 1014.

When event monitor registration requiring event monitor controls creation is requested and the event monitor controls object space is full, the event monitor controls count, the maximum event monitor controls count, and an appropriate response code are returned in the response operands 1014.

When the monitor request type specifies a key range monitor and key range initialization is in progress, the key range monitor is not registered and an appropriate response code is returned in the response operands 1014.

Write and Move List Entry (WMLE)

Write and moves a specified list entry 1208 that matches the input criteria to a target position.

Description: The designated list entry 1208 or position is located, and, when requested, the list authorities are compared, the assignment key is updated, the keys are compared, the global lock managers are compared, or the list entry 1208 is replaced or created, or any combination of the preceding processes is performed. When the global lock managers are compared, the local lock managers may be compared. When list entry creation is requested, the list set entry counts, the list set element counts, and the list entry counts or list element counts are compared. When list entry replacement is requested, the list number, the key, and version number comparisons, if requested, are compared, the list set element counts are compared, and, if the element count indicator is active, the list element counts are compared. When the global lock managers are compared, the lock table entry 1112 may be written. In order for a lock table entry 1112 to be written, all of these processes except for local lock manager comparison, when requested, must succeed. In order for the list authority to be replaced, all of these processes, when requested, must succeed. In order for a list cursor, version number, or assignment key to be updated, or any combination thereof, all of these processes, when requested, must succeed. In order for a list entry 1208 to be written and moved, all of these processes, when requested, must succeed.

When a list entry 1208 is written and moved and monitored list state transitions result, the list monitors are notified. The generated list notification commands are secondary processes.

When a list entry 1208 is written and moved and monitored subsidiary list state transitions result, the associated event monitor controls objects 1306 are withdrawn, queued, or both. If this causes event queue transitions, the event queue monitors are notified. The withdrawal or queueing of the event monitor controls objects 1306 and the generated list notification commands are secondary processes.

When a list entry 1208 is created or moved and a monitored key range state transition results, the key range monitors are notified. The generated list notification commands are secondary processes.

When a list entry 1208 is written and moved, the list entry controls 1210, the list set entry count, the list set element count, the target list entry count or list element count, the write result, and an appropriate response code are returned in the response operands 1014.

When a global lock manager is replaced and there are no other local lock managers, when a local lock manager is replaced with the opposite value, or when the global lock and the local lock managers are replaced, an appropriate response code is returned in the response operand 1014.

When the list authority comparison fails, the list authority, the user list control, and an appropriate response code are returned in the response operands 1014.

When a global lock manager is replaced and there are one or more other local lock managers, or when a local lock manager is replaced with the same value, then the lock table entry value and an appropriate response code are returned in the response operands 1014.

When global lock manager comparison fails, the lock table entry value and an appropriate response code are returned in the response operands 1014.

When the designated list entry 1208 exists but the requested version number comparison fails, the designated list entry controls 1210 and an appropriate response code are returned in the response operands 1014.

When the list entry count matches or exceeds the list entry count limit, or the list element count matches or exceeds the list element count limit, an appropriate response code is returned in the response operand 1014.

When the list set 1104 is full, and list entry creation or replacement is requested, an appropriate response code is returned in the response operand 1014. If the requested operation is a replacement of an existing list entry 1208 and the value of the DLES request operand 1010 is smaller than or equal to the value of the DLES object in the list entry controls 1210, the failed replacement indicator is set to active. Otherwise, the failed replacement indicator is set to inactive.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When the list entry name already exists and list entry creation is requested, the designated list entry controls 1210 and an appropriate response code are returned in the response operands 1014.

When updating the assignment key fails, an appropriate response code is returned in the response operands 1014.

When the designated list entry 1208 exists but the requested key comparison fails, the designated list entry controls 1210 and an appropriate response code are returned in the response operands 1014.

When the program list entry identifier indicator is active, the list entry identifier in the MCB has already been assigned for the list structure 902, and list entry creation is requested, the designated list entry controls 1210 and an appropriate response code are returned in the response operands 1014.

Write List Controls (WLC)

Updates a subset of the list control objects for a specified list 1106, where the subset of controls is determined by the value of the list control type.

Description: The list authority is compared to the value of the CLAU operand and replaced with the value of the LAU operand when they are equal. When the list authority comparison and replacement is successful, the write list controls command writes the list controls 1202, controls and initializes the key range, depending on the list control type.

When the list empty and the list not-empty notification thresholds are updated, the resulting state of the list 1106 is determined and the list monitors are notified. The list notification commands are primary processes.

When the key range empty and not-empty notification thresholds are updated and key range is not being initialized, the resulting state of the key range is determined and the key range monitors are notified. The list notification commands are primary processes.

If the list cursor bit is active and the cursor direction type bit is inactive, the list cursor is initialized to the LEID of the leftmost list entry 1208 when the value of the CDIR operand is left to right and is initialized to the LEID of the rightmost list entry 1208 when the value of the CDIR operand is right to left, and the CDIR object is set equal to the CDIR operand.

If the list cursor bit is active and the cursor direction type bit is active, the LEID operand is nonzero, and the entry designated by the LEID request operand 1010 exists on the list 1106 designated by the LN operand, the list cursor object is initialized to the LEID operand value and the CDIR object is set equal to the CDIR operand.

If the list cursor bit is active and the cursor direction type bit is active, the LEID operand is nonzero, but the entry designated by the LEID request operand 1010 does not exist on the list 1106 designated by the LN operand, the LEID operand is invalid and an appropriate response code is returned in the response operand 1014.

If the list cursor bit is active, the cursor direction type bit is active and the LEID operand is zero, the list cursor object is initialized to zero and the CDIR object is set equal to the CDIR operand.

When the list controls 1202 are written, an appropriate response code is returned in the response operand 1014.

The key range is initialized when the key range list entry key and the key range maximum list entry key are updated.

When the list controls 1202 are written and the key range is initialized, an appropriate response code is returned in the response operand 1014.

When the list authority comparison fails, the list authority, the user list control, and an appropriate response code are returned in the response operands 1014.

When key range initialization is not complete, and the key range list entry key and the key range maximum list entry key are updated, an appropriate response code is returned in the response operands 1014.

Write List Entry (WLE)

Writes a specified list entry 1208 that matches the input criteria.

Description: The designated list entry 1208 or position is located and, when requested, the list authorities are compared, the assignment key is updated, the keys are compared, the global lock managers are compared, or the list entry 1208 is replaced or created, or any combination of the preceding processes is performed. When the global lock managers are compared, the local lock managers may be compared. When list entry creation is requested, the list set entry counts, the list set element counts, and the list entry counts or list element counts are compared. When list entry replacement is requested, the list number and version number comparisons, the key is compared, if requested, are compared, the list set element counts are compared, and, if the element count indicator is active, the list element counts are compared. When the global lock managers are compared, the lock table entry 1112 may be written. In order for a lock table entry 11112 to be written, all of these processes except for local lock manager comparison, when requested, must succeed. In order for the list authority to be replaced, all of these processes, when requested, must succeed. In order for a list cursor, version number, or assignment key to be updated, or any combination thereof, all of these processes, when requested, must succeed. In order for a list entry 1208 to be written, all of these processes, when requested, must succeed.

When a list entry 1208 is created and a monitored list state transition results, the list monitors are notified. The generated list notification commands are secondary processes.

When a list entry 1208 is created and a monitored subsidiary list state transition results, the associated event monitor controls objects 1306 are queued. If this causes event queue transitions, the event queue monitors are notified. The queueing of event monitor controls objects 1306 and the generated list notification commands are secondary processes.

When a list entry 1208 is created and a monitored key range state transition results, the key range monitors are notified. The generated list notification commands are secondary processes.

When a list entry 1208 is written, the list entry controls 1210, the list set entry count, the list set element count, the list entry count or list element count, the write result, and an appropriate response code are returned in the response operands 1014.

When a global lock manager is replaced and there are no other local lock managers, when a local lock manager is replaced with the opposite value, or when the global lock and the local lock managers are replaced, an appropriate response code is returned in the response operand 1014.

When the list authority comparison fails, the list authority, the user list control, and an appropriate response code are returned in the response operands 1014.

When a global lock manager is replaced and there are one or more other local lock managers, or when a local lock manager is replaced with the same value, then the lock table entry value and an appropriate response code are returned in the response operands 1014.

When global lock manager comparison fails, the lock table entry value and an appropriate response code are returned in the response operands 1014.

When the designated list entry 1208 exists but the requested version number comparison fails, the designated list entry controls 1210 and an appropriate response code are returned in the response operands 1014.

When the list entry count matches or exceeds the list entry count limit, or the list element count matches or exceeds the list element count limit, an indcative response code is returned in the response operand 1014.

When the list set 1104 is full, and list entry creation or replacement is requested, an appropriate response code is returned in the response operand 1014.

If the requested operation is a replacement of an existing list entry 1208 and the value of the DLES request operand 1010 is smaller than or equal to the value of the DLES object in the list entry controls 1210, the failed replacement indicator is set to active. Otherwise, the failed replacement indicator is set to inactive.

When the designated list entry 1208 exists but the requested list number comparison fails, the designated list entry controls 1210 and an appropriate response code are returned in the response operands 1014.

When the designated list entry 1208 does not exist, an appropriate response code is returned in the response operand 1014.

When the list entry name already exists and list entry creation is requested, the designated list entry controls 1210 and an appropriate response code are returned in the response operand 1014.

When updating the assignment key fails, an appropriate response code is returned in the response operands 1014.

When the designated list entry 1208 exists but the requested key comparison fails, the designated list entry controls 1210 and an appropriate response code are returned in the response operands 1014.

When the program list entry identifier indicator is active, the list entry identifier in the MCB has already been assigned for the list structure 902, and list entry creation is requested, the designated list entry controls 1210 and an appropriate response code are returned in the response operands 1014.

MQSeries Shared Queue List Structure

Each list structure 902 created to support an MQSeries shared queue 106 is allocated with a list set 1104 where each list entry 1208 contains both an adjunct list entry 1216 and a data list entry 1212 and each list 1106 has a specified list entry count limit. In addition, a one-byte wide lock table 1110 is created where the number of lock table entries 1112 matches the number of list headers 202 (or, equivalently, lists 1106), making a one-to-one association between lock table entries 1112 and list headers 202. The list entry-related commands use a single global lock manager value and global lock manager comparison and replacement rules to govern their operations. This provides basic fetch and hold/store and release serializaton primitives on each list 1106. List authority values are used to provide state controls for each list 1106, such as the put inhibited state for a list authority value of 1. List authority comparison operations are used to enforce the states.

The lists 1106 are also created with both primary and secondary keys and key range monitoring is supported with one key range for each list 1106. In addition, list monitoring and sublist monitoring is supported and user controls 1108 are established to support notification operations.

MQSeries Put Processing

A new message 204 is put to the uncommitted portion 210 of the list header 202 assigned to the shared queue 106 by invocation of the following OS/390 service:

```
?IXLLIST  Entry type (New)
          ASSIGNENTRYID (pleid = Priority|STCK(8)|LN|MgrID)
          LISTNUMBER (LN)
          LOCKOPER (Not Held)
          LOCKINDEX (LN)
          CONTOKEN (Strb_Connect_Token)
          ADJUNCTAREA (=SLEK|SADE)
          ELEMNUM (parm_buffer_length/CSQE_element_size)
          Buffer (parm_buffer)
          BuffSize (buffer_size)
          Assign (key)
               ENTRYKEY (entry_key =
                  X'F6'|MgrID|Priority|UOW ID|LN|zeros)
          AuthCompare (Yes)
          AuthCompareType (Equal)
          AUTHCOMP (SCB_LHQC_List_Authority)
          AnsArea
          AnsLen
          RetCode
          RsnCode
          VersionUpdate (Set)
               NEWVERS (version_number = UOW ID
                                       = MgrID|STCK(7))
Mode (SyncSuspend)
```

The OS/390 service routine converts this to a Write List Entry (WLE) command with the following request operands:

| Acronym | Operand | Contents |
|---|---|---|
| CC | Command code | Command Code for WLE |
| SID | Structure identifier | List Structure ID for ConToken |
| DLES | Data list entry size | ELEMNUM |
| LRT | Lock request type | Compare global lock managers |
| CGLM | Comparative global lock manager | =B'00' |
| LTEN | Lock table entry number | =X'0000'\|LISTNUMBER |
| KCT | Key comparison type | ignored |
| KRT | Key request type | ignored |
| LEK | List entry key | ENTRYKEY |
| VRT | Version request type | Set version number on create |

-continued

| Acronym | Operand | Contents |
|---|---|---|
| VCRT | Version comparison request type | ignored |
| VN | Version number | NEWVERS |
| CVN | Comparative version number | ignored |
| DIR | Direction | Left to right |
| ELT | Entry locator type | Ignored - locate by keyed position is default for create operations |
| ELKT | Entry locator key type | Locate by primary key |
| LNCT | List number comparison type | ignored |
| LCURT | List cursor request type | Do not update the list cursor |
| LET | List entry type | Write data and adjunct |
| WRT | Write request type | Create a new list entry |
| LN | List number | LISTNUMBER |
| LEID | List entry | ASSIGNENTRYID |
| AKRT | Assignment key request type | List entry key not assigned |
| AKUT | Assignment key update type | ignored |
| LAUCT | List authority comparison type | Compare for equal |
| LAURT | List authority replacement type | Do not replace list authority |
| LCUT | List cursor update type | ignored |
| STDIR | Secondary target direction | Left to right |
| SKCT | Secondary key comparison type | Ignored |
| SKRT | Secondary key request type | ignored |
| UID | User identifier | ignored |
| LAU | List authority | ignored |
| CLAU | Comparative list authority | AUTHCOMP |
| AKI | Assignment key increment | ignored |
| ALE | Adjunct list entry | ADJAREA with first 32 bytes set to 0 |

The message buffer address (Buffer) and length (Buffsize) are used to create a message buffer address list (MBAL) which accompanies the message command block 1002 for the Write List Entry (WLE) command to the selected coupling facility structure 902. The coupling facility and structure identifier for the list structure 902 are obtained through controls associated with the ConToken.

When the coupling facility 104 receives the message command block 1002 and message address list for the Write List Entry (WLE) command, the following actions are taken.

1. The value of AUTHCOMP is compared against the list authority object to ensure that the list 1106 is not put-inhibited. If the comparison shows the values are not equal, the command ends without creating a list entry 1208 and an appropriate response code is returned. If the comparison shows the values are equal, the command continues.
2. The value of the global lock manager field in the lock table entry 1112 associated with the list 1106 (i.e. Lock table entry number=LISTNUM) is compared against a value of zero. If the global lock manager field is not zero, the list 1106 is locked and cannot be changed. In this case the command ends without creating a list entry 1208 and an appropriate response code is returned. If the global lock manager field is zero, the command continues.
3. The list entry (or element) count limit is checked against the current list entry (or element) count to ensure that creation of a new list entry 1208 will not cause the count of list entries 1208 to exceed the limit. If this is the case, the command ends without creating a list entry 1208 and an appropriate response code is returned. If the list entry (or element) count limit is not exceeded by the creation of a list entry 1208, the command continues.
4. Creation of a new list entry 1208 is attempted by obtaining free storage resources for the list entry controls 1210, adjunct list entry 1216 and data list entry 1212. The data list entry size is the value of ELEMNUM. If insufficient resources are available, the command ends without creating a list entry 1208 and an appropriate response code is returned. If storage resources are available, the list entry 1208 is created.
5. The list entry 1208 is created by writing the buffer contents (actual message) to the data list entry 1212, setting the adjunct list entry 1216 equal to the ADJAREA, and setting the list entry controls 1210 to the input values. The list entry controls 1210 are set as follows:

Adjunct format control is set to adjunct secondary key indicator

Data list entry size is set to the value of ELEMNUM

List entry identifier is set to the value of ASSIGNENTRYID

List entry key is set to the value of ENTRYKEY

List number is set to the value of LISTNUMBER

Version number is set to the value of NEWVERS

Secondary list entry key is set to zero.
6. The list entry 1208 is inserted in the target position for the primary key ordering based on the value of the list entry key.
7. The list entry 1208 is inserted in the target position for the secondary key ordering based on the value of zero. (Note that the OS/390 service sets the first 32 bytes of the adjunct area, which represents the secondary key, equal to zero.)
8. The list entry count or list element is incremented.
9. The command is completed and an appropriate response code is returned.

MQSeries Get Processing

A message 204 is read from a nonindexed shared queue 106 by invocation of the following OS/390 service. This invocation will move the highest priority message 204 from the put queue 202 to the requesting shared queue manager 108's uncommitted get queue 206 and read the contents into the requester's buffer.

| | |
|---|---|
| ?IXLLSTE | Request (MOVE) |
| | LISTNUM (Scb_Put_List_Number) |
| | LOCKOPER (Not Held) |
| | MOVETOLIST (STRB_SQM_Uncommitted_Get_List_Header) |
| | MOVETOKEY (TARGETENTRYKEY) |
| | TARGETKEY (uncommitted_getq_key) |
| | ENTRYTYPE (OLD) |
| | LOCATOR (UNKEYPOS) |
| | DIRECTION (HEADTOTAIL) |
| | KEYCOMPARE (YES) |
| | ENTRYKEY (Key_of_Message_to_MOVE = X'0A0000 ... 000') |
| | KEYREQTYPE (LESSOREQUAL) |

-continued

```
AUTHCOMPARE (YES)
AUTHCOMP (Scb_LHQC_List_Authority)
AUTHCOMPTYPE (EQUAL)
ADJAREA (Adjunct)
ACTION (READ)
Buffer (parm_buffer)
BufSize (buffer_length)
CONTOKEN (Strb_Connect_Token)
Ansarea
AnsLen
Retcode
RsnCode
Mode (SyncSuspend)
```

The OS/390 service routine converts this to a Move and Read List Entry (MRLE) command with the following request operands:

| Acronym | Operand | Contents |
|---|---|---|
| CC | Command code | Command Code for MRLE |
| SID | Structure identifier | List Structure ID for ConToken |
| LRT | Lock request type | Compare global lock managers |
| CGLM | Comparative global lock manager | =B'00' |
| LTEN | Lock table entry number | =X'0000'\| LISTNUMBER |
| KCT | Key comparison type | Compare list entry keys |
| KRT | Key request type | Compare for less than or equal |
| LEK | List entry key | ENTRYKEY |
| VRT | Version request type | No action |
| VCRT | Version comparison request type | ignored |
| VN | Version number | ignored |
| CVN | Comparative version number | ignored |
| DIR | Direction | Right to left |
| ELT | Entry locator type | Locate entry by unkeyed position |
| ELKT | Entry locator key type | ignored |
| LNCT | List number comparison type | Don't compare list numbers |
| LCURT | List cursor request type | Do not update the list cursor |
| TDIR | Target direction | Left to right |
| MELT | Move entry locator type | Set key to target list entry key |
| TLEK | Target list entry key | TARGETKEY |
| TLN | Target list number | MOVETOLIST |
| LET | List entry type | Read data and adjunct |
| LN | List number | LISTNUMBER |
| LEID | List entry | ignored |
| SLCCC | Suppress list count comparison control | Check list entry count limit |
| AKRT | Assignment key request type | List entry key not assigned |
| AKUT | Assignment key update type | ignored |
| LAUCT | List authority comparison type | Compare for equal |
| LAURT | List authority replacement type | Do not replace list authority |
| LCUT | List cursor update type | ignored |
| STDIR | Secondary target direction | Left to right |
| SKCT | Secondary key comparison type | ignored |
| SKRT | Secondary key request type | ignored |
| MPKP | Maintain primary key position | Ignored |
| MSKP | Maintain secondary key position | ignored |
| UID | User identifier | ignored |
| LAU | List authority | ignored |
| CLAU | Comparative list authority | AUTHCOMP |
| AKI | Assignment key increment | ignored |
| SLEK | Secondary list entry key | zero |

The message buffer address (Buffer) and length (Buffsize) are used to create a message buffer address list (MBAL) which accompanies the message command block 1002 for the Move and Read List Entry (MRLE) command to the selected coupling facility structure 902. The coupling facility and structure identifier for the list structure 902 are obtained through controls associated with the ConToken.

When the coupling facility 104 receives the message command block 1002 for the Move and Read List Entry (MRLE) comma nd, the following actions are taken.

1. The value of AUTHCOMP is compared against the list authority object with the last known value of the list authority. If the comparison shows the values are not equal, the command ends without moving or reading a list entry 1208 and an appropriate response code is returned. If the comparison shows the values are equal, the command continues.

2. The value of the global lock manager field in the lock table entry 11112 associated with the list 1106 (i.e. Lock table entry number=LISTNUM) is compared against a value of zero. If the global lock manager field is not zero, the list 1106 is locked and cannot be changed. In this case the command ends without moving or reading a list entry 1208 and an appropriate response code is returned. If the global lock manager field is zero, the command continues.

3. The topmost list entry 1208 on the designated list 1106 is located and the list entry key is compared with the ENTRYKEY=X'0A000 ... 0'. If the list entry key is less than or equal to the ENTRYKEY value, then the list entry 1208 represents a committed message and the command continues. If the list entry key is greater than the ENTRYKEY value, then the list entry 1208 represents an uncommitted message (List entry key=X'F6xxxxx') and the command completes without moving or reading the list entry 1208 and an appropriate response code is returned.

4. The list entry (or element) count limit is checked against the current list entry (or element) count to ensure that moving the list entry 1208 to the target list 1106 will not cause the count of list entries 1208 to exceed the limit. If this is the case, the command ends without moving or reading the list entry 1208 and an appropriate response code is returned. If the list entry (or element) count limit is not exceeded by the movement of the list entry 1208, the command continues 5. The list entry 1208 is removed from the source list 1106 and the list entry (or element) count for the source list 1106 is decremented.
6. The list entry 1208 is inserted in the target position for the primary key ordering for the specified target list 1106 based on the value of the target list entry key and the target direction.
7. The list entry 1208 is inserted in the target position for the secondary key ordering based on the value of zero. (Note that the OS/390 service sets the first 32 bytes of the adjunct area equal to zero.)
8. The list entry (or element) count for the target list 1106 is incremented.
9. The adjunct data is returned in the message response block 1004 and the data list entry 1212 is returned to the user's buffer.
10. The command is completed and an appropriate response code is returned.

GetWait Request

When no committed messages 204 exist on the put list 202, the CF Manager (a component of shared queue manager 108 as described in the referenced related application) is instructed to monitor the committed range 208 of the put list for transitions from the empty to the nonempty state by invocation of the following OS/390 service:

```
?IXLLSTC    Request (MONITOR_KEYRANGE)
            CONTOKEN (Strb_Connect_Token)
            LISTNUM (List_Number_to_Process)
            ACTION (Start)
            VECTORINDEX (Scb_Put_List_Number)
            DRIVEEXIT (Yes)
            RETCODE
            RSNCODE
            ANSAREA
            ANSLEN
            MODE (SyncSuspend)
```

The OS/390 service establishes an internal bind between the CF Manager routine and the list notification vector index value equal to LISTNUM and then issues a Register List Monitor (RLM) command to the coupling facility 104 to register the CF Manager as a key range monitor for the key range associated with the put list 202. The RLM command is issued with the following request operands:

| Acronym | Operand | Contents |
|---|---|---|
| CC | Command code | Command Code for RLM |
| SID | Structure identifier | List Structure ID for ConToken |
| KT | Key type | ignored |

-continued

| Acronym | Operand | Contents |
|---|---|---|
| MRT | Monitor request type | Register key range monitor |
| INRT | Initial notification request type | ACTION = Start |
| ANENI | Aggressive not-empty notification indicator | =Inactive |
| WEQTC | Write event queue transition count | ignored |
| AOC | Attachment override control | Check for attachment |
| KRNRT | Key range notification request type | Update the vector summaries |
| KRNEN | Key range notification entry number | VECTORINDEX |
| UID | User identifier | User ID for ConToken |
| LN | List number | LISTNUM |
| LEK | List entry key | ignored |
| SLEK | Secondary list entry key | ignored |
| UNC | User notification control | ignored |
| EQTC | Event queue transition count | ignored |

When the coupling facility 104 receives the message command block 1002 for the Register List Monitor (RLM) command, the following actions are taken.

1. The attachment status of the specified user identifier is checked. The user must be attached with a nonzero list notification in the user controls 1108. If the user is not attached the command ends in error. If the user is attached, but the list notification token is zero, the user is not registered and the command completes with an appropriate response code. If the user is validly attached, the command continues.
2. The monitor request type is decoded and indicates that the requested function is key range monitoring. If the key range for the list 1106 is in the process of being initialized, the user is not registered and the command completes with an appropriate response code. If the key range is not being initialized, then the command continues.
3. The user is registered as a key range monitor by setting the key range monitor active bit (KRMAB) to active in the entry 1302 of the key range monitor table 1204 for the specified list 1106 indexed by the UID. The entry 1302 is further initialized by storing the key range notification request type (KRNT) and the key range notification entry number (KRNEN) request operands into the table entry.
4. If the key range is not empty, a notification signal is sent to the user, specifying the list notification token in the user controls 1108, and setting the LNEN and LNRT controls to the values of the KRNT and KRNEN objects respectively.
5. The command is completed and an appropriate response code is returned.

The key range for the put list 202 had been previously established by the CF Manager when the structure 902 was allocated by invocation of the following OS/390 service:

```
?IXLLSTC    Request (WRITE_LCONTROLS)
            CONTOKEN (parm_Connect_Token)
            LISTNUM (parm_List_Header)
            AUTHCOMP (Current_List_Authority)
            NEWAUTH (New_Authority_Value)
            KEYRANGE (SET)
            KEYRANGESTART (csqe_key_all_zeros = X'000000......0000')
            KEYRANGEEND (Key_Range_End = X'09FFFFFFFF....FFFFF')
            KEYRANGESTATE (Define)
```

-continued

```
KREMPTY (TrigDepth = 0)
KRNOTEMPTY (TrigDepth = 0)
DRIVEEXIT (Yes)
RETCODE
RSNCODE
ANSAREA
ANSLEN
MODE (SyncSuspend)
```

| Acronym | Operand | Contents |
|---------|---------|----------|
| CC | Command code | Command Code for WLC |
| SID | Structure identifier | List Structure ID for ConToken |
| LCT | List control type | Update key range/thresholds |
| CDIR | Cursor direction | ignored |
| CDT | Cursor direction type | ignored |
| LN | List number | LISTNUM |
| LECL | List entry count limit | ignored |
| LEID | List entry identifier | ignored |
| CLAU | Comparative list authority | AUTHCOMP |
| LAU | List authority | NEWAUTH |
| ULC | User list control | ignored |
| AKT | Assignment key threshold | ignored |
| AK | Assignment key | ignored |
| LSTC | List state transition count | ignored |
| KRLEK | Key range list entry key | KEYRANGESTART |
| KRMLEK | Key range maximum list entry key | KEYRANGEEND |
| KRENT | Key range empty notification threshold | KREMPTY = '0' |
| KRNENT | Key range not-empty not. threshold | KRNOTEMPTY = '0' |
| LENT | List empty notification threshold | ignored |
| LNENT | List not-empty notification threshold | Ignored |

When the coupling facility 104 receives the message command block 1002 for the Write List Controls (WLC) command, the following actions are taken.

1. The value of AUTHCOMP is compared against the list authority object with the last known value of the list authority. If the comparison shows the values are not equal, the command ends without updating the list controls 1202 and an appropriate response code is returned. If the comparison shows the values are equal, the value of NEWAUTH is placed in the list authority object and the command continues.

2. The list control type is decoded and it is determined that the key range and key range thresholds are to be updated and no other controls are changed.

3. The key range and key range thresholds are updated by storing the values of the KRLEK, KRMLEK, KRENT, and KRNENT operands into the list controls 1202 and initializing the key range.

4. If key range initialization completes the resulting key range state is set and the key range monitors are notified of the resulting state. The command completes after the notifications have completed and an appropriate response code is returned.

5. If key range initialization does not complete within a model dependent time period, an appropriate response code is returned. Key range initialization remains active.

SMQ Recovery—Deletion of Uncommitted Messages

A two-phase recovery protocol is executed for any shared queue manager (SMQ) 108 that fails. A step in the second phase a recovery process deletes all uncommitted list entries 1208 written by the shared queue manager 108 that is being recovered. This is accomplished by using the new Delete List (DL) command with key range processing. The start of the range is the begin key, which is set to X'F6'.QMID.(14 bytes of zeros) and the end key is set to X'F6'.QMID.(14 bytes of ones). The QMID is the identifier of the failed SMQ 108 and the range identifies all possible puts to the uncommitted put queue portion 210 by the failed SMQ 108. Specifying the range ensures that all the uncommitted message will be deleted without the recovering process needing to know the number or exact key values of list entries 1208 being deleted.

This function is accomplished by issuing the following OS/390 service.

```
?IXLLSTM   Request (DELETE_LIST)
           CONTOKEN (Strb_Connect_Token)
           LOCATOR (KEYPOS)
           LISTNUM (List_Number_to_Process)
           KEYTYPE (ENTRY)
           ENTRYKEY (begin_key = X'F6'|QMID|0000000000...0000)
           KEYREQTYPE (Range)
           KEYCOMPARE (YES)
           KEYRANGEEND (end_key = X'F6'|QMID|FFFFFFFF...FFFF)
           RETCODE
           RSNCODE
           ANSAREA
           ANSLEN
```

The OS/390 service converts this to a Delete List (DL) command with the following request operands:

| Acronym | Operand | Contents |
|---|---|---|
| CC | Command code | Command Code for DL |
| SID | Structure identifier | List Structure ID for ConToken |
| LRT | Lock request type | No lock comparison |
| CGLM | Comparative global lock manager | ignored |
| LTEN | Lock table entry number | ignored |
| KCT | Key comparison type | Compare list entry keys |
| KRT | Key request type | Compare within key range |
| LEK | List entry key | ENTRYKEY = X'F6\|QMID\|00..00' |
| VRT | Version request type | No action |
| VCRT | Version comparison request type | ignored |
| VN | Version number | ignored |
| CVN | Comparative version number | ignored |
| DIR | Direction | Right to right |
| ELT | Entry locator type | Locate entry by keyed position |
| ELKT | Entry locator key type | Locate by list entry key |
| LNCT | List number comparison type | Don't compare list numbers |
| LN | List number | LISTNUMBER |
| LEID | List entry | ignored |
| LAUCT | List authority comparison type | Compare for equal |
| LSKT | List scan key type | Left to right |
| SKCT | Secondary key comparison type | ignored |
| SKRT | Secondary key request type | ignored |
| UID | User identifier | ignored |
| MLEK | Maximum list entry key | KEYRANGEEND = X'F6\|QMID\|FF....FF' |
| CLAU | Comparative list authority | AUTHCOMP |
| MSLEK | Maximum secondary list entry key | ignored |
| SLEK | Secondary list entry key | ignored |

When the coupling facility 106 receives the message command block 1002 for the Delete List (DL) command, the following actions are taken.

1. The value of AUTHCOMP is compared against the list authority object with the last known value of the list authority. If the comparison shows the values are not equal, the command ends without deleting a list entry 1208 and an appropriate response code is returned. If the comparison shows the values are equal, the command continues.
2. The list 1106 is searched in primary key order. The leftmost list entry 1208 within the specified key range is located and deleted from the list 1106. The list entry count is also decremented.
3. Step 2 is repeated until either a model-dependent timeout is exceeded or all the list entries 1208 in the specified range are deleted. If a model-dependent timeout is exceeded, the command is completed and an appropriate response code is returned. If all the list entries 1208 in the specified range are deleted, an appropriate response code is returned.

While a particular embodiment has been shown and described, various modifications will be apparent to those skilled in the art. While the invention has particular application in a message queuing environment, it is not limited to such an environment and may be used in other environments as well.

What is claimed is:

1. In an information handling system in which operations are performed on a list structure by a list structure processor in response to requests received from a requester, a method of processing a list structure, comprising the steps of:

defining as a part of said list structure a list comprising a sequence of list entries, each of said list entries being uniquely identified by an associated list entry identifier;

defining a list entry identifier indicator for said list, said list entry identifier indicator indicating whether said list entry identifiers are generated by said list structure processor or supplied by said requester;

creating list entries having said list entry identifiers generated by said list structure processor if said list entry identifier indicator indicates that said list entry identifiers are generated by said list structure processor; and creating list entries having said list entry identifiers supplied by said requester if said list entry identifier indicator indicates that said list entry identifiers are supplied by said requester.

2. In an information handling system in which operations are performed on a list structure by a list structure processor in response to requests received from a requester, a method of processing a list structure, comprising the steps of:

defining as a part of said list structure a list comprising a sequence of list entries, each of said list entries having an associated list entry key;

specifying for each of one or more source list entries in said list a target list entry key and a target list;

changing the list entry key of each of said source list entries to the target list entry key specified for the source list entry; and moving each of said source list entries to the target list specified for the source list entry.

3. In an information handling system in which operations are performed on a list structure by a list structure processor in response to requests received from a requester, a method of processing a list structure, comprising the steps of:

defining as a part of said list structure a list comprising a sequence of list entries, each of said list entries having an associated list entry key;

defining one or more comparison list entry keys;

receiving a user input defining a type of comparison operation between a list entry key associated with one of said list entries and said one or more comparison list entry keys; and performing a comparison operation of the defined type on said associated list entry key and said one or more comparison list entry keys.

4. The method of claim 3 in which said type of comparison operation is defined as being equal, less than or equal, or greater than or equal to a single specified key value.

5. The method of claim 3 in which a pair of comparison list entry keys are defined specifying a key range and in which said type of comparison operation is a key range comparison to a pair of specified key values.

6. The method of claim 3 in which said comparison operation is performed for a single list entry in said list.

7. The method of claim 3 in which said comparison operation is performed for multiple list entries in said list.

8. The method of claim 3, comprising the further step of:

performing a further operation on said list entry in accordance with the results of said comparison operation.

9. The method of claim 8 in which said further operation is a delete operation.

10. The method of claim 8 in which said further operation is a move operation.

11. The method of claim 8 in which said further operation is a read operation.

12. The method of claim 8 in which said further operation is a write operation.

13. In an information handling system in which operations are performed on a list structure by a list structure processor in response to requests received from a requester, a method of processing a list structure, comprising the steps of:

defining as a part of said list structure a list comprising a sequence of list entries, each of said list entries having an associated list entry key;

defining a subset of said list having list entry keys falling within a predetermined range of values extending between a minimum key range value and a maximum key range value that may differ from said minimum key range value; and notifying said requester of the transition of said subset of said list between an empty state and a not-empty state.

14. In an information handling system in which operations are performed on a list structure by a list structure processor in response to requests received from a requester, a method of processing a list structure, comprising the steps of:

defining as a part of said list structure a list comprising a sequence of list entries;

selecting in accordance with a user-provided value a threshold defining the transition of a subset of said list between an empty state and a not-empty state; and notifying said requester of the transition of said subset of said list between one of said states and the other of said states as defined by said threshold.

15. The method of claim 14 in which said transition is from said not-empty state to said empty state.

16. The method of claim 14 in which said transition is from said empty state to said not-empty state.

17. The method of claim 14 in which said step of selecting said threshold comprises the steps of:

selecting a first threshold defining the transition of said subset of said list from an empty state to a not-empty state; and selecting a second threshold defining the transition of said subset of said list from a not-empty state to an empty state.

18. The method of claim 14 in which said subset of said list is the entire list.

19. The method of claim 14 in which each of said list entries has an associated list entry key and in which said subset of said list comprises a subset having list entry keys falling within a predetermined key range.

20. In an information handling system in which operations are performed on a list structure by a list structure processor in response to requests received from a requester, a method of processing a list structure, comprising the steps of:

defining as a part of said list structure a list comprising a sequence of list entries;

defining a first mode of operation in which said requester is notified of the addition of each entry to a subset of said list; and defining a second mode of operation in which said requester is notified only of the addition of a first entry to said subset of said list.

21. In an information handling system in which operations are performed on a list structure by a list structure processor in response to requests received from a requester, a method of processing a list structure, comprising the steps of:

defining as a part of said list structure a list comprising a sequence of list entries, each of said list entries having an associated primary list entry key;

defining a secondary key indicator for said list, said secondary key indicator indicating whether each of said list entries only has said associated primary list entry key or also has an associated secondary list entry key;

creating list entries having only said primary list entry keys if said secondary key indicator indicates that said list entries only have said associated primary list entry keys; and creating list entries having said primary list entry keys and said secondary list entry keys if said secondary key indicator indicates that said list entries also have said associated secondary list entry keys.

22. A program storage device readable by a machine, tangibly embodying a program of instructions executable by the machine to perform the method steps of any one of claims 1–3, 13–14, and 20–21.

23. The method of claim 21, comprising the further step of locating said list entries by said secondary list entry keys.

24. The method of claim 21, comprising the further step of conditionally processing said list entries based upon a comparison of said secondary list entry keys.

25. In an information handling system in which opera ons are performed on a list structure by a list structure processor in response to requests received from a requester, apparatus for processing a list structure, comprising:

means for defining as a part of said list structure a list comprising a sequence of list entries, each of said list entries being uniquely identified by an associated list entry identifier;

means for defining a list entry identifier indicator for said list, said list entry identifier indicator indicating whether said list entry identifiers are generated by said list structure processor or supplied by said requester;

means for creating list entries having said list entry identifiers generated by said list structure processor if said list entry identifier indicator indicates that said list entry identifiers are generated by said list structure processor; and means for creating list entries having said list entry identifiers supplied by said requester if said list entry identifier indicator indicates that said list entry identifiers are supplied by said requester.

26. In an information handling system in which operations are performed on a list structure by a list structure processor in response to requests received from a requester, apparatus for processing a list structure, comprising:

means for defining as a part of said list structure a list comprising a sequence of list entries, each of said list entries having an associated list entry key;

means for specifying for each of one or more source list entries in said list a target list entry key and a target list;

means for changing the list entry key of each of said source list entries to the target list entry key specified for the source list entry; and means for moving each of said source list entries to the target list specified for the source list entry.

27. In an information handling system in which operations are performed on a list structure by a list structure processor in response to requests received from a requester, apparatus for processing a list structure, comprising:

means for defining as a part of said list structure a list comprising a sequence of list entries, each of said list entries having an associated list entry key;

means for defining one or more comparison list entry keys;

means for receiving a user input defining a type of comparison operation between a list entry key associated with one of said list entries and said one or more comparison list entry keys; and performing a comparison operation of the defined type on said associated list entry key and said one or more comparison list entry keys.

28. The apparatus of claim 27, further comprising:

means for performing a further operation on said list entry in accordance with the results of said comparison operation.

29. In an information handing system in which operations are performed on a list structure by a list structure processor in response to requests received from a requester, apparatus for processing a list structure, comprising:

means for defining as a part of said list structure a list comprising a sequence of list entries, each of said list entries having an associated list entry key;

means for defining a subset of said list having list entry keys falling within a predetermined range of values extending between a minimum key range value and a maximum key range value that may differ from said minimum key range value; and means for notifying said requester of the transition of said subset of said list between an empty state and a not-empty state.

30. In an information handing system in which operations are performed on a list structure by a list structure processor in response to requests received from a requester, apparatus for processing a list structure, comprising:

means for defining as a part of said list structure a list comprising a sequence of list entries;

means for selecting in accordance with a user-provided value a threshold defining the transition of a subset of said list between an empty state and a not-empty state; and means for notifying said requester of the transition of said subset of said list between one of said states and the other of said states as defined by said threshold.

31. The apparatus of claim 30 in which said means for selecting said threshold comprises:

means for selecting a first threshold defining the transition of said subset of said list from an empty state to a not-empty state; and means for selecting a second threshold defining the transition of said subset of said list from a not-empty state to an empty state.

32. In an information handing system in which operations are performed on a list structure by a list structure processor in response to requests received from a requester, apparatus for processing a list structure, comprising:

means for defining as a part of said list structure a list comprising a sequence of list entries;

means for defining a first mode of operation in which said requester is notified of the addition of each entry to a subset of said list; and means for defining a second mode of operation in which said requester is notified only of the addition of a first entry to said subset of said list.

33. In an information handing system in which operations are performed on a list structure by a list structure processor in response to requests received from a requester, apparatus for processing a list structure, comprising:

means for defining as a part of said list structure a list comprising a sequence of list entries, each of said list entries having an associated primary list entry key;

means for defining a secondary key indicator for said list, said secondary key indicator indicating whether each of said list entries only has said associated primary list entry key or also has an associated secondary list entry key;

means for creating list entries having only said primary list entry keys if said secondary key indicator indicates that said list entries only have said associated primary list entry keys; and means for creating list entries having said primary list entry keys and said secondary list entry keys if said secondary key indicator indicates that said list entries also have said associated secondary list entry keys.

34. The apparatus of claim 33, further comprising means for locating said list entries by said secondary list entry keys.

35. The apparatus of claim 33, further comprising means for conditionally processing said list entries based upon a comparison of said secondary list entry keys.

* * * * *